US011775607B2

(12) United States Patent
Denninghoff

(10) Patent No.: US 11,775,607 B2
(45) Date of Patent: Oct. 3, 2023

(54) TRANSITORY SALIENT ATTENTION CAPTURE TO DRAW ATTENTION TO DIGITAL DOCUMENT PARTS

(71) Applicant: Karl Louis Denninghoff, Snohomish, WA (US)

(72) Inventor: Karl Louis Denninghoff, Snohomish, WA (US)

( * ) Notice: Subject to any disclaimer, the term of this patent is extended or adjusted under 35 U.S.C. 154(b) by 0 days.

(21) Appl. No.: 17/687,588

(22) Filed: Mar. 4, 2022

(65) Prior Publication Data

US 2022/0284071 A1    Sep. 8, 2022

Related U.S. Application Data

(63) Continuation-in-part of application No. PCT/US2021/020967, filed on Mar. 4, 2021.

(51) Int. Cl.
    *G06F 16/95*     (2019.01)
    *G06F 16/957*    (2019.01)
    *G06F 16/9538*   (2019.01)

(52) U.S. Cl.
    CPC ...... *G06F 16/9577* (2019.01); *G06F 16/9538* (2019.01)

(58) Field of Classification Search
    CPC .................. G06F 16/9577; G06F 16/9538
    See application file for complete search history.

(56) References Cited

U.S. PATENT DOCUMENTS

| 11,438,672 | B2* | 9/2022 | Wilczynski | G06F 16/489 |
| 2010/0115001 | A1* | 5/2010 | Soules | G06F 16/1734 |
| | | | | 707/804 |
| 2014/0164352 | A1* | 6/2014 | Denninghoff | H03H 9/25 |
| | | | | 707/711 |
| 2015/0116283 | A1* | 4/2015 | Black | G06V 30/1423 |
| | | | | 345/179 |
| 2019/0220487 | A1* | 7/2019 | Denninghoff | H03H 9/1092 |
| 2022/0121715 | A1* | 4/2022 | Denninghoff | H03H 9/1092 |

* cited by examiner

*Primary Examiner* — Mohammad S Rostami

(57) ABSTRACT

A computer-implemented system for engaging automatic attention capture functionality of human neuronal structures by added transitory salient stimuli that draw user attention to parts of displayed documents, which stimulates involuntary neuronal interference with other image processing at no more than user-tolerable levels. After user initiated finding or displaying of document parts, when added visual salience is transitory and as presented, added motions are at the speeds presented, and when otherwise used in contexts presented in the disclosure, even extremely salient motion stimuli that involuntarily engage neuronal motion detection circuitry and thereby involuntarily capture attention in unique ways nevertheless stimulate interference with other visual processing at no more than user tolerable levels. Non-motion transitory visually salient ways of engaging automatic attention capture are also used in some circumstances.

20 Claims, 20 Drawing Sheets

TRANSITORY SALIENT ATTENTION CAPTURE TO DRAW ATTENTION TO DIGITAL DOCUMENT PARTS

CROSS-REFERENCE TO RELATED APPLICATION

This application is a continuation-in-part of International Patent Application No. PCT/US21/20967, filed on Mar. 4, 2021, which is incorporated by reference herein in its entirety.

BACKGROUND

The design of hyperlinks, search engines, and browsers as well as many documents found in the Internet centers around first finding and then displaying desired content. This is what those components mainly do. Efficiently, conveniently, and reliably finding information and displaying it are core guiding design goals of the whole of the Internet and its components. Improvements in any aspect of these core processes are earnestly sought.

Individual documents found on the Internet can be large, and user agents (typically Internet browsers) provide users with functionality similar to document editors for finding content. Typically, a user can type an arbitrary string, or copy an arbitrary string, into a "find" box of a browser and then search for that string. Often, a user will copy text from the document itself into a "find" box, and search for additional instances in that same document. Also, he will copy content from the document and paste it into a search query to be sent to a search engine, in order to find instances of that content in other documents. A user may also open other documents and search for content that he found elsewhere in those documents.

When searching on the Internet using a search engine service, a user might enter the query string "brown cow"; in response the search engine service will typically return a document with several hyperlinks to web pages that the search engine service deems relevant to the query string. A search engine service also typically presents evidence of the relevance of the document represented by at least some of the hyperlinks, in the form of snippets constructed from the document's contents presented in proximity to the hyperlink for that document. According to U.S. Pat. No. 10,430,474 and related patents that it cross-references, a search result document could have an associated snippet, e.g. one that reads "how now brown cow." The user can read and click on the snippet—which results in automated opening of the search result document, distinguishing the snippet in the document, and scrolling to it so as to display it quickly to the user in context of a display of the search result document.

The description of U.S. Pat. No. 10,430,474 and related patents include definitions of "distinguish" and "partially distinguish," which enumerate many ways and combinations of ways for distinguishing and partially distinguishing textual content of content of electronically displayed documents to cover, by way of definition, what it means to distinguish and partially distinguish such content. Those enumerated ways include highlighting, boxing, highlighting or changing color of alternating parts, flashing backgrounds, floating images with pointers, etc. However, those disclosures do not describe any use of simulated motion in distinguishing and do not describe any form of in-place transitory distinguishing, thus here the definition of distinguishing and partially distinguishing is expanded to include transitory distinguishing and distinguishing by simulated motions.

Searching within a document via familiar 'find' and 'search' functionalities, which are provided e.g. by browsers for locating content, are among the most essential and common actions taken by users when examining documents.

Improvements in the speed, ease, clarity, or relevancy with which users can perform such locations of content, which bring desired content to attention so that it can be examined, are earnestly sought by numerous practitioners of the art including engineers, software developers, and information scientists.

BRIEF DESCRIPTION OF THE DRAWINGS

Exemplary embodiments are illustrated in referenced figures of the drawings. It is intended that the embodiments and figures disclosed herein be considered illustrative rather than limiting.

DETAILED DESCRIPTION

Figure 1:
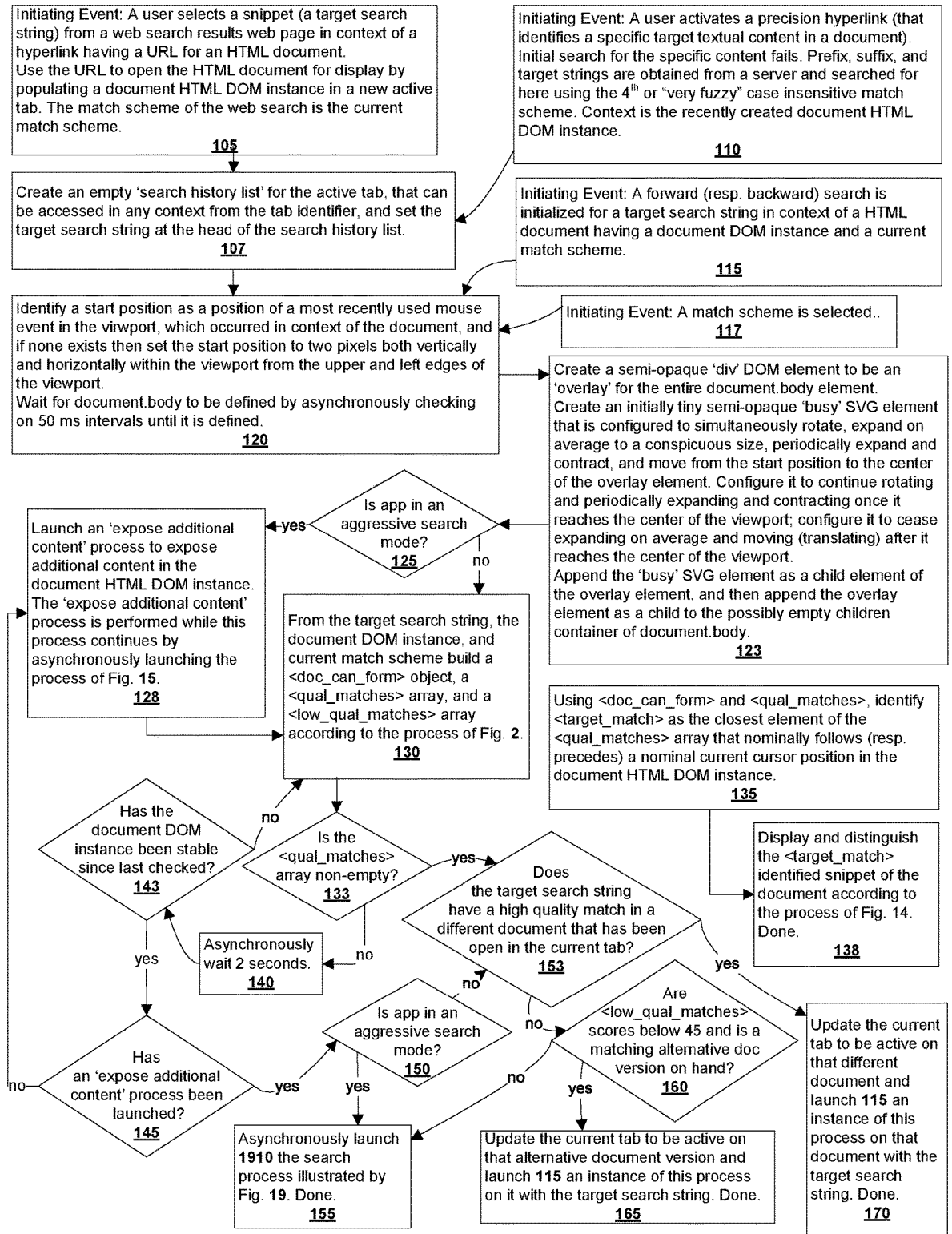
FIG. 1 illustrates simultaneous application of high-quality search, fuzzy match scheme search, cross-document search within a tab, application of a targeted busy indicator, and retrieval of additional content to support search.

From the perspective of a web browser user, internal web-page search functionality ought to show the user any and all matching content that can be accessed from the current web page. Stated differently, an end-user ought to be reasonably confident that there is no matching content accessible from a web page except for content that is rapidly shown to him via his browser search/find functionality. Unfortunately, searching in documents displayed by web browsers can fail to fulfill such expectations when documents are not fully downloaded or when content is hidden or obscured. Increasing complexity of web accessed documents has caused such circumstances to be increasingly commonplace over the last several years.

Typical browser web-page search functionality works by first finding relevant content, selecting or highlighting the relevant content, and scrolling the relevant content into view; however, available web page content can be programmatically inaccessible to such a process in various circumstances; by way of showing examples, the relevant content:

1. can still be at the server and therefore not programmatically findable because it isn't at the client;

2. may be present and programmatically findable but nevertheless explicitly hidden by having an applicable CSS property value of 'hidden';

3. may be findable on the page, rendered visually, selectable, and apparently viewable but scrolling alone may be insufficient to view it because it is obscured by something else that is rendered visually over the relevant content, and often that something else cannot be escaped by scrolling.

For many instances where accessible content cannot be selected and scrolled into view, web page designers have provided user-clickable buttons that activate scripts that in turn cause additional content to be visually presented to the user. However, pressing buttons is not the only way this happens; for example, scripts are in many web pages activated by scrolling to the bottom of currently viewable content, and the thus activated scripts download and append additional viewable content to the bottom of the page.

After these script activities complete, in some instances matching content can be programmatically found, selected, and scrolled into view by pre-existing in-page search functionality. Some end users are aware of these limitations and mechanisms exist for a determined user to in part alleviate the problem by pressing buttons and scrolling to the bottom manually. However, knowledgeable end users may nevertheless be unwilling to scroll to the bottom of pages to get more content, then press some 'more' buttons, and then perform the search again, and then repeat because maybe he missed a 'more' button or perhaps pressing a 'more' button caused new 'more' buttons to appear. This is frustrating for users because there is no definitive end to the process if matching content is not found; moreover, there may never be a satisfying end to such a process if the end user wants to know definitively that he saw all matching instances of the relevant content that can be accessed from within such a document.

In search processes described in detail in U.S. Pat. No. 10,430,474, a snippet returned from a web-based search engine is automatically converted to a hyperlink. When such a hyperlink is activated by a user, a current version of the original document from which the snippet was taken is automatically opened in the browser; and then a matching snippet is automatically found in a document display, selected, and scrolled into view in the document display. Unlike a search process whereby users enter text in a find box, this process is initiated by end users before any part of the to-be-displayed document is downloaded. Therefore, users thereby make requests for specific content to be identified in a document before the document download begins. As a result, activity to find specific content occurs before containing documents are fully downloaded and before their display is stable in a browser.

Such a search process is subject to the above-mentioned example problems, and in addition there is first a wait for the document to download in the first place, which as noted for search/find functionality in general is not guaranteed to make matching content available without further action.

In some embodiments the DOM (Document Object Model) instance for the document in the browser is watched for change events until it stabilizes. In some embodiments matching content is simultaneously searched for in the DOM instance, even before the DOM instance becomes stable. The actual time taken is highly variable and dependent on many factors including the speed of internet connections, originating server speed, and CPU utilization on the user's machine. In some embodiments, waiting until such a target document is stable is done by watching for browser-based DOM instance mutation (change) events, which is achieved via Javascript APIs that are known to those skilled in the art. Again however, accessible relevant content of the document may not have been downloaded when the DOM instance becomes stable.

In addition to difficulties with respect to accessing, downloading and displaying content, find functionality of web browsers as well as word processors have limited capability for inexact searches. I.e., browser-based mechanisms to identify imperfectly matching content from a search string are primitive or nonexistent. In typical modern browsers, inexact search capability extends only to case insensitivity, i.e. search can be configured to be oblivious to the case of characters. A user can typically request more exactness by selecting for whole-word matches only. However, all such searches are essentially exact searches; for example, the search string "backup is never a" matches in a document with the phrase "backup is never a bad plan", but in the typical case the search strings "backup is never an", and even "backup" (i.e. "backup" followed by two spaces) fail entirely—regardless of case sensitivity or whole word user selections. Thus, in popular browsers, case insensitivity is the only effective aid to avoid false negatives (too few results) and matching only whole words is the only effective aid to avoid false positives (too many results). If either of those do not work the user is essentially left with guessing a better search string. The above problematic examples can all be characterized as false negatives, which is a difficulty with present solutions because inexact searching is both computationally costly and difficult for end users to learn to use. In some embodiments, inexact document searches are effective, easy to use, and computationally feasible. See the discussion below of current Microsoft Word and Adobe Acrobat capabilities, which are more capable than browsers but still suffer from limitations.

While on the one hand users usefully enter arbitrary phrases for initial web-wide (e.g. Google and Bing) searches, where searches are generally fuzzy to an extent; when users navigate from the web-wide search results to a search-identified document they are forced to make a transition to a browser's very limited fuzziness search environment and typically such a user starts searching for only one or two word sequences because, from experience, they otherwise expect to find nothing. While users adapt as necessary to this transition, it is nevertheless a source of confusion. In some embodiments users need not make such an unnatural transition and instead, in some embodiments, the local search capabilities provided go beyond those provided by web searches—which makes the user transition to searching within a document relatively seamless.

Some embodiments provide such relatively seamless transitions between searching on the web to searching within a document downloaded from the web. In some embodiments the unification goes farther by using simplified common interface elements having common semantics to searching any kind of document corpus, including the world wide web or Internet of documents, and any kind of individual document within the corpus with easy transitions in both directions between corpus searches and individual document searches.

Word processor applications, such as Mocrosoft Word and Adobe Acrobat, provide inexact search capabilities that go beyond those of typical browsers; however, such capabilities are quirky, difficult to learn, difficult to use, and do not provide the benefits of what is defined in this disclosure as a "fuzzy match scheme". When using current word processor search capabilities in typical documents, it is in particular easy for a user to unwittingly arrive at a false negative—which is to say a circumstance whereby the user concludes, based on search results, that sought-for content is not present in a document when in fact such content is present. False positives are also possible, which are problematical for users usually by presenting them with too many matches that are tedious for users to manually examine. Some embodiments significantly reduce such quirkiness and frustration in document searches and in particular significantly reduce the prevalence of search results leading to false negatives. When a user needs to reduce the number of false positives, i.e. reduce matches to a current search that are not of interest, it is important to have mechanisms to reduce the noise without causing desired matches to be unintuitively and unexpectedly lost. This disclosure achieves that in part by providing easy to understand ways to quickly both expand and contract search results for the same search string, i.e., a user need not become a "search string programmer", which is a tedious and error prone activity.

In Microsoft Word (Microsoft Word 2019 Professional Plus), the advanced find dialog presents users with an edit box for a search string and nine checkboxes to affect how the search string is interpreted and matched to contents of a document. Many of them cannot be used simultaneously and how best to use them requires concerted effort. To an extent Microsoft Word and to a lesser extent Adobe Acrobat provide regular-expression based searches. Provided that a user has specialized skills with respect to the language of regular expressions, the "Use wildcards" checkbox in Microsoft Word provides users with a way to, in-effect, replace a simple search string with a regular expression, which is a kind of programming language in which errors are easy to unwittingly make. A typical scenario for a person skilled with regular expressions comprises repeated loops in the following sequence:

1. create (program) an initial regular expression designed so that search results will match within every part of the document that would be of interest—i.e., so that there are no false negatives;
2. run the regular-expression against the document;
3. If the desired content is apparent in the results (i.e., most of the results are desired matches), then stop with a positive result (and presumably examine the results in context of the rest of the document context);
4. if the results are few enough to examine them all, no desired matches are present, and it is judged sufficiently unlikely that the current regular expression is producing a false negative, then stop with a negative result.
5. if the results are few enough to examine them all and no desired content is present, then edit (reprogram) the regular expression such that it is more likely to find desired matches and loop back to step 2.
6. examine some of the false positives in the results;
7. edit (reprogram) the regular expression so that it eliminates at least some of the examined false positives from step 4. while being careful to not eliminate desired matches—i.e. hopefully without creating false negatives;
8. loop back to step 2.

This regular expression use sequence generally requires skill and even for the skilled is error prone; note that the above scenario leaves out loops from typical errors whereby a user creates a regular expression that is not well-formed and worse, where it is well-formed but does not have the meaning intended—which can be difficult to discover. Regular expressions are the most powerful of the tools provided by Microsoft Word and Adobe Acrobat, but even if a user were to make no errors at all it would remain tedious to use because typically false positives cannot be eliminated effectively until they are seen in search results, knowledgeably analyzed, and specifically adjusted for in subsequent iterations; such adjustments in general require skills that are possessed by only a small subset of users.

Like MS Word and Adobe Acrobat, regular expression search tools, with variations, are provided by many edit and display applications for documents. However, perhaps because of the small number of qualified users, applications also attempt to provide easier to use search options in check boxes; however, no combination of the choices in Microsoft Word can cause "backup is never an" to be presented to a user as a match in a document that nevertheless has the string "backup is never a bad plan". In adobe Acrobat, by making the choice "match any of the words", a match occurs but only hidden within matches to every instance of the word "is" and every other word in the search string, which leaves a user in an iterative loop somewhat like those above for regular expressions—even though the two strings match almost exactly! The better match is possible but it requires some kind of fuzziness to present a user with such a slightly-off match. Certainly, for close matches such as this, it would be a benefit if a user would not have to manually experiment with search strings or regular expressions to figure out whether there may be a useful match.

In both of Microsoft Word and Adobe Acrobat, searching for the string "backup is never an" does not ever match in "backup is never a bad plan" without resorting to regular expressions or, in Acrobat, asking for a match of any of the words, which results in very many false positives because of the words "is" and "an". Thus, even though a user almost has it exact (a Levenshtein distance of 1), the user must play around knowledgeably with the search string and possibly resort to what is, in effect, programming. While stemming is available in both Word and Acrobat, it only works in one direction, so a search for "a" with stemming could in principal match "an", but it does not work the other way around.

Adobe Acrobat is a full snippet eximious application (see the definition of full snippet eximious application) that provides a measure of uniformity of user experience for searching between a pre-indexed (by Adobe Acrobat) corpus of pdf documents and searching within a single pdf document; in fact, both kinds of searches can be performed simultaneously, resulting in a list of results showing multiple documents with search results within the matching documents. However, ordering results by "relevancy ranking" only orders the documents as a whole, similar to how it is done for web searches, and does not order results within a document; i.e., snippets within a document are displayed only in order-of-appearance. Thus, searches within a single document produce binary results, even though comparison between documents is many-valued; moreover, algorithms used for document relevance do not depend on any notion of relative snippet relevancy, even between documents that have only one match each. For example, there are several variations of tf-idf (Term Frequency—Inverse Document Frequency) algorithms for establishing relevancy scores for documents in a corpus, which map frequencies of terms within documents together with frequencies of documents having the terms to relevancy scores for documents having matches to the search string. Even if there is a kind of fuzziness as to what an individual term matches, e.g. to correct for misspellings of a term in the search string and/or the documents, matching a word remains a binary determination and document relevancy scores do not depend on between-snippet "relevancy" scores. Thus, Adobe Acrobat (as well as Microsoft Word) do not have visibly realized fuzzy match schemes.

This limitation extends to general Internet searches whereby better individual snippet matches to a search string can often be found in lower scoring documents, and therefore lower down in a presentation of search results, because the document score does not depend on scores for the snippets presented even though the snippets are typically what users use to determine which documents to view.

In some embodiments, searches at a search engine select documents conventionally based on a tf-idf algorithm using the search string and a pre-computed index of a corpus of documents. (See https://en.wikipedia.org/wiki/Tf%E2%80%93idf for an overview of tf-idf algorithms.) The selected documents are then processed at the server just as they are processed at a user agent using match schemes presented here. Note that the match schemes presented here efficiently perform identification and scoring of matching snippets that in some embodiments, e.g. in open-source Solr implementations, replaces conventional fragmentation (document analysis) followed sequentially by scoring of snippets. Solr is designed to allow externally implemented plug-ins to replace fragmentation and scoring operations (See page 292 of "Solr In Action" by T. Grainger and T. Potter 2014). This fragmentation operation followed by a scoring operation amounts to a fuzzy match intra-document search for each previously identified document. In some embodiments, by using these same algorithms in both search services and user agents (e.g. word processors and browsers), users obtain the benefits of identical match schemes for such intra-document searches and similar user interfaces for searching document corpora, e.g. the world wide web or a corporate proprietary document set, and searching within individual documents on their own computation devices.

Please observe that identifying a matching document for a search string for a corpus-wide search is separate from finding the best matching snippet for the search string within such an identified document. As seen in the "Solr In Action" referenced earlier, the Solr corpus wide search tool is designed to support replacement of the intra-document search tool with different software modules so that implementations can choose between multiple choices that are provided with the Solr tool. These intra-document search modules are necessary to identify snippets to present to users along with the previously identified document results.

In some embodiments, at the service only a match scheme identifier and the search string are needed to launch a query to perform searches of such document corpora that use the identified match scheme for the intra-document search as described in the previous paragraph. In some embodiments, switching to searching the web from searching a single document, using any one of already selected match schemes for an existing search string, requires a single mouse click.

In some embodiments, when a search service performs an inter-document search phase (based typically on a pre-computed index of a corpus of documents), the term match rules are made as close as possible to the term match rules of the match scheme chosen by a user and that will be used later in the intra-document search on each document selected in the inter-document search phase. For example, if a chosen intra-document match scheme (which again identifies snippets within documents identified in an inter-document phase) is case-sensitive, requires whole words to match, and does not correct for misspellings in terms, then these rules are dynamically matched as closely as possible for term matches in the inter-document phase. Some search service inter-document search software does not support dynamic switching between case sensitive and case insensitive searches because case sensitivity vs case insensitivity is determined for that software at the time of indexing. For such software, best practice is to use a case insensitive index and deal with the case sensitive aspect only in the intra-document search phase at the service. If the match scheme allows misspellings between terms, which is typically a Levenshtein distance-based term matching, and the search service supports this as well (e.g. Solr supports this on a per-term basis), then the query is modified on the fly at the service to match the chosen match scheme in this manner. In some embodiments, if an exact equivalence between term matching rules for a particular term cannot be achieved, then more liberal (fuzzier) term matching rules are chosen if possible for the inter-document search phase for that term.

Otherwise, in some embodiments, the most liberal (fuzziest) term match rules are used that are supported by the search service instance for that term for that particular inter-document search.

A search service can be oblivious to the match schemes of a user agent but nevertheless have capabilities e.g. with respect to stemming or misspelling of terms. In some embodiments, a user agent modifies the search performed at such a service by matching, as closely as possible, the term matching of the match scheme and that of the service. Thus, a Solr search implementation as in the previous paragraph has the search modified, in some cases by inclusion of search string metadata, to perform Levenshtein distance searches on strings to match as closely as possible the selected match scheme where such modifications are allowed. There is considerable documentation on how to include search metadata on a per-term basis to allow misspellings of terms in Solr, and in some embodiments using Solr the modification of search strings comprises determining the Levenshtein distance allowed for a match for each term in the search string according to the selected match scheme, and then appending the metadata for that distance to the term in the search string.

More capable search service software than Solr (out of the box) exists in this regard, and some embodiments use such search services (e.g. the CompleteSearch Engine, which supports stemming and Levenshtein distance misspellings simultaneously). In such embodiments a closer correspondence between individual term matching for inter-document searches and intra-document searches is achieved by similarly modifying searches on the fly at the user agent according to the search metadata syntax documented for the particular search service software. While better performance and results are achieved by some embodiments where a panoply of capabilities are incorporated at a search service, significant improvements over current practice are nevertheless achieved with user-agent only embodiments in conjunction with entirely oblivious search services. In some embodiments this enhances use of oblivious search services that may have, for example, more of desired information indexed.

Inter-document search software has widely varying capabilities and widely varying defaults for things that are chosen at indexing time and others that are chosen at query time. For some, like Google search, users have no control whatever over defaults chosen at indexing time and there is limited ability to affect how individual terms are matched at query time. In some embodiments, e.g. where a search service cannot be modified to select at query time from a multiplicity of match schemes for intra-document snippet identification, the selected match scheme is nevertheless applied to retrieved results by applying it at the user agent to the snippets retrieved, scoring them according to the selected match scheme, and re-ordering match results according to these scores. In some embodiments this is done on a per-page of results basis.

In some embodiments, inter-document term matching capabilities of stemming, Levenshtein distance (spelling corrections), and both simultaneously, are used to perform inter-document term matching that is as close as possible to the term matching of the selected match scheme. In some embodiments, after the intra-document search is performed over a multiplicity of documents, e.g. at a search service, according to the selected match scheme, then the document results are re-ordered according to the highest resulting snippet score for each document. In some embodiments, the document score from the inter-document search is combined in an average with the highest snippet score by linearly normalizing the highest scoring document and lowest scoring document range to the range between the highest scoring snippet and lowest scoring snippet (of the best snippets for each result document), and then re-ordering result documents by the average of the normalized document score and the best snippet score. In some embodiments a weighted average is used; e.g. in some embodiments the snippet scores are weighted two thirds and the document scores one third of the final score for each document.

In some embodiments, when search results come from a service that does not send document scores, then relative document scores are assigned at the user agent from the position of documents in the sequence of document results as presented by the search service (highest first) for a particular page of results, which are then normalized and used as described above in the previous paragraph. In some embodiments, these techniques are used to arrive at document scores separately for results from multiple public search engines, such as Google and Bing, and then re-ordering the results together to arrive at merged results from the two sources.

In some embodiments, if a document appears in results from more than one search engine, then the snippets from the two search engines are combined (without repetition) and the snippets ordered according to their individual snippet scores, according to the selected match scheme, at the user agent. In some embodiments, when document snippet sets are merged in this way, two or more normalized document scores are first averaged from the multiple sources to arrive at a resulting document score, which is then combined in some embodiments as described above with the best snippet score to arrive at a final document score that is used to re-order the combined results.

In some embodiments, when results are combined from two sources for display, which in some embodiments is performed on a per-page basis whereby, for example, 10 document results starting at result n from the first source are requested and 10 document results starting at the same n from the second source are requested, and these result sets are then combined to create a page of up to 20 results from the two sources as described above.

In some embodiments the combination from multiple result sets as described in the previous paragraph first establishes the overall snippet score normalization range as the narrowest range that covers the ranges of best snippet scores from every source; then the document scores from each source separately are normalized to that range. In some embodiments, if a source provides only one document, then its normalized document value is the middle of the range. Then, for documents appearing in multiple result sets (e.g. from different services), their normalized document scores from the multiple result sets are averaged to arrive at a combined normalized document score. The resulting normalized document scores are then combined with the best snippet score for each document (e.g. as described above) to arrive at final document scores that are used to re-order the combined document results with their snippets.

Note that, especially from public search services, some highly ranked results will be presented with no snippet, which can occur e.g. because content owners may forbid snippets of copyrighted content to be redistributed by search engines; nevertheless, based on indexed content, a search engine ranks the result higher than others on a page; in such circumstances and in some embodiments, a nonzero snippet score is used for that result if in the result sequence it has adjacent snippet scores; for example, in some embodiments half of the average snippet score of up to two adjacent snippet scores is used.

As described above, some user agent embodiments employ multiple remote or public search services, which provide inter-document and intra-document searches having differing levels of utility with respect to a particular set of match schemes. Some user agent embodiments directly provide inter-document searches as well as intra-document searches. For example, documents stored on a local machine are usefully indexed on some local machine embodiments. In some embodiments a user can have all documents on all of the user's machines indexed in a local service embodiment that runs on one of the user's machines or by a public service embodiment that provides private search indexing and search services that are under the control of the user and may be restricted to use by only that user or a set of users.

Some embodiments that are local to a user agent machine or that are restricted to private use nevertheless index publicly accessible and publicly indexed documents, which can be particularly useful when a small-enough corpus of public documents is of particular interest to a user who desires enhanced search capabilities over that corpus. Some embodiments support such use by allowing a user to locally index and un-index specific public domains, specific documents in a domain having URIs that match string specifications such as regular expressions, or individual public documents. In this context, small-enough is a relative term that changes over time and some embodiments can usefully index more than a terabyte of documents on individual local machines. Some distributed embodiments, which can be local or privately hosted, can be of any needed size but of course may be limited by cost.

In addition to the enhanced search capabilities over non-embodiment public search engines, some local or private embodiments may not be affected by copyright limitations that prevent snippet re-distribution by public search engines.

In some embodiments, a user can request intra-document processing (or re-processing) according to a currently selected match scheme and search string, without leaving a search results page. In some embodiments this downloads the document solely for indexing, i.e. potentially without downloading CSS, scripts, etc., then searches for the best matching snippets to the search string according to the current match scheme, and then replaces the snippets for that document in the results. This is useful where the search engine or engines used do not perform their intra-document snippet identification according to the currently selected match scheme, or in cases where public search engines are restricted from presenting snippets from a document that nevertheless is, according to the inter-document search performed at the search engine, of potential interest to a user. In some embodiments this is performed for a range of search result documents and in particular for a whole page of search results, which in some embodiments is performed by simultaneous requests to the sources across a communication network such as the Internet.

In some embodiments, when a user requests intra-document processing of a document as described in the previous paragraph, the document is automatically indexed temporarily in one or more local or private search engines; where the one or more local or private search engines' indexes are located physically is configurable and, in some embodiments, it is on the local machine. This can usefully be viewed as a high-performance and high-capability (i.e. effectively supports a useful set of match schemes in inter-document and intra-document searches) cached search engine that in some embodiments is always searched in addition to any public search engines. In some embodiments, whenever a document is opened and conventionally cached by the browser, it is indexed temporarily (i.e. cached) in the one or more local or private search engines. In some embodiments, cached indexing of documents are retained longer and independently of any retention of corresponding document caches. Note that document caches for display can occupy more space than indexes for the same documents.

In some embodiments, subject to user configuration or request, some document indexes are retained indefinitely in a local or private search engine. In some such embodiments, a background process accesses such indefinitely cached documents and re-indexes them if they have changed. In some such embodiments, when the size of an index exceeds a threshold, a least recently used (LRU) policy for documents is applied to recover space in the cache; to enable the LRU policy, a document index time stamp is updated whenever an intra-document search is performed using the index for that document, whether or not the document itself is ever opened for display.

In some embodiments, when a user clicks on a general link to a document provided in a search engine search results display (as opposed e.g. to clicking on a snippet hyperlink), the document is opened and a search, which is for the search string that generated the search result, is initiated in the document using the currently selected match scheme. In some such embodiments, this search is terminated by a mouse click in the context of the document display. In some embodiments, it is user configurable whether to never do this, whether to do this only where the intra-document search at the search engine is not the same as the selected match scheme, or to always do this.

In some embodiments, whenever a document is opened from a search results page, the search string used for that page is in a history of search list for that document even if no search is automatically initiated or if a search for a snippet on that page is initiated. This allows a user to conveniently, e.g. without leaving the document and without re-typing such a search string, to search using the original search string with the original match scheme or with any other provided match scheme.

Some embodiments provide many-valued scores that support discrimination between match quality for snippets that match search strings with various levels of quality. In some embodiments this simplifies and at the same time enhances the expressive power of search criteria by some mechanisms enumerated below, different combinations of which are used in various embodiments:

1) eliminating the search criteria "whole words", "stemming", "proximity", "ignore punctuation", "ignore spaces", "match diacritics", and related criteria and fold them into a single dimension of different levels of fuzziness, wherein a user easily and quickly switches between levels of fuzziness by selecting one of multiple match schemes, wherein typically most are many-valued. In some embodiments all levels of fuzzy match schemes are a kind of "proximity" search. In some embodiments fuzzy match schemes range from low fuzziness searches that require whole word matching with no spelling errors to high fuzzyness searches that ignore word boundaries and allow misspellings. In some embodiments, all of the fuzzy match schemes (as opposed to less fuzzy binary match schemes, which are also included in some embodiments) ignore punctuation, combining characters (e.g. diacritics), and white space except to the extent that they determine word boundaries;

2) complimenting barely fuzzy match schemes with non-fuzzy match schemes or exact match schemes that are binary, i.e. strings either match or do not match; in some embodiments a non-fuzzy match scheme does not ignore punctuation, combining characters, or white space; however, even here sequences of white space are matched in some embodiments by any other sequence of white space; in some embodiments, in order to match a sequence of white space exactly and only exactly a binary match scheme with even lower fuzziness is selected;

3) using new algorithms that efficiently perform fuzzy match scheme searches; while high performance is always beneficial, it is in particular beneficial when documents can change at any time, which is increasingly common for web pages; it is also particularly beneficial when partially retrieved documents can be displayed, which is possible for both pdf and html files downloaded across the web; in such circumstances, a search can be performed multiple times and potentially displayed and distinguished for a user before a document is completely downloaded or completely processed into a display;

4) provide only three user selections that establish the match scheme to use for a search, which are:
   a. treat intra-word misspellings as full matches, which is binary;
   b. case sensitivity, which is binary; and
   c. fuzziness level, which may be a sequence of 3 levels or more where the levels include a no-fuzzy level that provides binary (i.e. match or no-match) outputs; and provides the lowest level of fuzziness, which is not a fuzzy match scheme (i.e. it does not map snippets to more than two quality-of-match values—see the definition of "fuzzy match scheme") and is used mainly to restrict to exact word order with punctuation and diacritics. The other fuzziness levels are fuzzy match schemes wherein the match scheme selected, by virtue of selecting the next fuzziness level, has a higher or increased fuzziness level relative to the match scheme selected with the previous fuzziness level. In some embodiments, not only is there an increase in fuzziness, but there is a beneficial relationship whereby changing only the fuzziness level, amongst the fuzzy match schemes, results in a fuzzy match scheme that is a contraction (resp. expansion) of the previously selected fuzzier (resp. less fuzzy) match scheme. To fully understand the benefits that such relationships between match schemes provide, see in particular the definitions (with explanatory paragraphs accompanying the definitions) of fuzziness, fuzzy match scheme, and match scheme expansion. As noted above, the search string "backup is never an" (without resorting to regular expressions or "match all words") can fail to be matched by Microsoft Word and Adobe Acrobat in a document with the phrase "backup is never a bad plan"; in contrast however, in some embodiments only match schemes corresponding to the no-fuzzy level of fuzziness will also give no matches, and even there if word misspellings are allowed such embodiments will beneficially present users with the nearly perfect match. Please see the definitions, including explanations, of "fuzziness", "match scheme", "fuzzy match scheme", and "match scheme expansion".

5) arranging for fuzziness to have a simple and intuitive meaning to users; which for many users means that their understanding need go no farther than to understand that with increased fussiness there will likely be more matches to consider, and for the most part things that match at lower fuzziness levels will also match at higher fuzziness levels; this goes farther in some embodiments whereby fuzziness is expressed to users with phrases like "show me more" and "show me less" or even a single term of "more" and "less"; and thus in some embodiments there is a pair of buttons with one that increases fuzziness and another that decreases fuzziness without requiring users to have any level of understanding of match schemes or even a term like fuzziness.

Mechanisms are given for inexact searching in U.S. Pat. No. 10,430,474, and e.g. Levenshtein distance (edit distance) measures are presented there that can be used; a custom mechanism for inexact search is also presented there; however, that patent does not describe: providing distinct fuzziness levels that are user-selectable; fuzzy match scheme capabilities for user modified or created search strings for search within a document; supporting modification of web-search provided snippets to obtain new search strings; maintaining a similar search experience or interface for corpus searches and individual document searches; a simplified search criteria for document searches based on fuzziness, and the clarity and ease of use benefits to end users that such uniformity across different search activities provides.

Some embodiments use a new high-performance algorithm for a very fuzzy match scheme and its extension to less fuzzy match schemes. This new algorithm is both efficient and useful for a seamless user experience transition from web based fuzzy search (as in a Google search with snippet results) to (from a user's perspective beneficially similar) fuzzy search for specifically identifying content within documents, which includes searching for relevant content based on web search-engine generated snippets. The same algorithm for a very fuzzy match scheme also performs high-quality searching and produces such results simultaneously with quality of match scores. When high quality matches do not exist for a particular search string, then in some embodiments users are presented automatically and rapidly with lower quality search results in the form of snippets, which they can activate similarly to hyperlinks to be taken to the relevant content. In some embodiments and circumstances, even if there are high quality matches, users can choose to examine lower quality matches as well.

Some embodiments use a fuzzy match scheme for web search-engine generated snippets in a target document and user generated search strings in the target document, which also provides users with a unified fuzzy search experience and an ability to modify web search-engine snippets (after clicking on such snippets initially presented as hyperlinks as in U.S. Pat. No. 10,430,474) and then to continue looking for matching content in the target document based on user modified or created search strings starting with the search-engine provided snippets. See FIG. 22 below to see how this is presented to users in some embodiments.

To present matching content to a user, an existing in-page search process typically selects matching content. I.e., matching content is programmatically selected whereby the matching content enters a visual state similar or identical to a state that would have occurred if it were manually selected for a cut and paste operation. While this alters the appearance of matched content, in many such circumstances end users are not able to visually pick-out the programmatically selected text. This occurs for various reasons, including: selections or highlighting may not be obvious on a particular displayed page, which e.g. may be sufficiently cluttered with similar information in appearance; the selection itself may be very short and moreover, for user created maglinks as described in U.S. Pat. No. 10,430,474, matching content can be a single character in length or comprise only an image; the selection may be in the small type of a document or on a sidebar, where a user might not be expecting a match; and users may have less than perfect eyesight and therefore have additional or exacerbated difficulties.

Some embodiments simultaneously alleviate all of the above issues; however, such alleviation can take time for computation and/or communication. The usual way to indicate to a user that time is being taken, but that progress is nevertheless being made, is to present the user with a busy or progress indicator that visually engages the user e.g. by spinning or sliding a progress bar while work takes place in the user's behalf. While such visual engagements placate end-users for longer periods than e.g. presenting a screen with no motion, their use in this context would tend to distract users and increase the probability that users would in the end fail, in a timely manner, to visually pick out resulting selections. I.e., a typical busy or progress indicator might solve the time-usage problem but exacerbate problems with identifying targeted content.

In some embodiments some of the above discussed problems are addressed. In some embodiments all of the above discussed problems are simultaneously addressed.

Across the Internet, document content can be customized for a particular user who is identified by keystroke patterns that are specific to particular users of a particular machine, which in turn may be identified by machine fingerprinting. Users may be unaware that they have been identified and that they are being tracked and presented with personalized information. While advertising targeting often uses such techniques, content in general can be customized for specific individuals in this manner. Such arbitrary content is not predictable in advance of search activity, so this kind of personalization can destroy the ability of a search engine to provide comprehensive indexing. On such pages only local search can be comprehensive and it is beneficial if it can be provided in real-time. Some embodiments are better than others in such situations. Some embodiments give users a choice of whether to be in an aggressive mode with respect to searches. In some such embodiments, when in aggressive mode an attempt to expand a document to its fullest extent is made when and if searching operations commence, which means displaying all content that can be provided in the document (regardless of the search strings in use) e.g. by programmatically scrolling and pressing of buttons.

In some embodiments, a busy indicator is used that simultaneously rotates, expands and contracts over short periods, expands and contracts on average over longer periods of traversals, and traverses (i.e. moves) across the viewport. Its final position, before shrinking and disappearing out if sight, is directly over the first character of the selected relevant content. In this way, while it provides a useful busy indicator, it also draws the user's eyes directly to the beginning of the relevant content. Thus, if users watch (and thus might be distracted by a busy indicator), their eyes are beneficially drawn by motion of the busy indicator itself directly to the relevant content.

As noted in the Background Section, the description of U.S. Pat. No. 10,430,474 and related patents include definitions of what it means to "distinguish" and "partially distinguish;" those definitions are expanded here to include visually apparent motion of a floating image that eventually distinguishes or partially distinguishes a part of a document. Because a moving floating image first draws attention to the moving image itself, obscures the document underneath it, and if lateral motion is involved then it is likely located away from the target text and initially may not distinguish or partially distinguish the target text, it is unintuitive that such a moving image would provide a benefit over e.g. dynamically flashing the background of the target text. This is especially so since both motion and flicker are perceived in the periphery of human vision; for example, most vision evaluations use flicker to test a person's peripheral vision. Nevertheless, there are benefits to using a moving image in this circumstance that captures attention based on technical characteristics of animal neuronal systems in general and human neuronal systems in particular.

It turns out that there are profound differences anatomically and functionally between perception of motion and perception of other dynamic changes such as flashing or flickering. A functional reason for this is that motion requires analysis of velocity (i.e. speed and direction), whereas flicker and flashing do not. Specialized circuitry for automatic analysis of speed and direction need not have applicability to flicker and flashing. While these differences remain an active area of research, distinct regions of the brain and unique neuronal arrangements are involved in motion detection. For example, persons experiencing gross akinetopsia (inability to perceive motion—at all) can have entirely normal spatial acuity, flicker detection, stereo and color vision, space perception, and visual identification of shapes, objects, and faces (see an overview of this subject at https://en.wikipedia.org/wiki/Akinetopsia). Thus, flicker detection is, even at the level of large anatomical features of the brain, distinct from motion detection. Some essential automatic motion detection functionality has been anatomically localized to the 'dorsal stream' of the human brain. Scientific theories behind differences at the cellular level, such as the Hassenstein-Reichardt and Barlow-Levick models of motion detection, are models of neural connectivity and functionality that have been supported by experimental evidence. In accordance with observations both models postulate neural structures that are capable of sensitive directional motion detection and at the same time, at the low-level cellular level, are relatively insensitive to flicker or flashing. At the cellular level there is even specialization of cellular structures to detection of motion in particular directions. A short overview of this subject can be read at: https://en.wikipedia.org/wiki/Motion_perception. The speed and reliability of motion detection and its ability to filter-out changes that do not involve motion, especially in the periphery, has been described as a significant evolutionary ability that promotes survival; besides advantages to rapid detection e.g. either of predator or food source motion, very fast and reliable automatic motion detection in the periphery helps protect the eyes themselves from moving objects that could damage them—in such situations speed is of the essence and the ability of motion detectors to alert and force involuntary responses can be crucial. While the eye detects flicker/flashing in the periphery also, as pointed out above flicker detection uses macro-anatomically separate parts of the brain and is functionally somewhat slower. While flicker detection is a way to test peripheral capabilities of the retina in humans, motion in the periphery is a faster and even more reliable way to force automatic neuronal reactions.

Thus, while unintuitive that there would be a benefit over flicker/flashing techniques, it is an aim of the present disclosure to beneficially provide for the engagement of low-level neuronal structures for motion detection and through them parts of the human brain that are functionally essential to the perception of motion per-se and thereby more reliably draw a user's attention to specific parts of documents. It is also an aim of the present disclosure to beneficially provide similar attention-attracting motions across a wide range of documents, so that a user's automatic and involuntary sensory processing modification processes will over time even further enhance the reliability of such automatic drawing of a user's attention to specific parts of documents.

Some users may be more sensitive to motion and experience unbearable involuntary interference with other visual processing. Also, because motion is processed so uniquely, as noted earlier some humans have impaired or rarely even non-existent motion detection while everything else is functioning normally. Therefore, in some embodiments, whether to use salient transitory motion is user configurable, whether to use salient transitory flashing is also user configurable, and in some embodiments if neither are chosen then the default is to create a large object that temporarily covers, in a transitory distinguishing, any part of the visible part of a document display that is within 2 h of any part of a target snippet, where h is the height of an average character of the target snippet. In some embodiments the color of the large object is also configurable to accommodate various kinds of color-blindness and other unusual eye-sensitivity issues.

In what follows are phrases like "capturing a user's attention" or "catch a user's eyes"; in all cases where movement is involved such phrases stand in place of describing the deliberate engagement of the low-level human neuronal circuitry for motion detection by providing a computer-generated illusion of actual motion on a computer screen that is sufficient to achieve such engagement.

Visually apparent motions beneficially catch a user's eyes and can also for a time placate a user until further action takes place. In some embodiments a floating image presents and visually moves over the screen display, it also moves over the document display by scrolling the content under it, and it may do both simultaneously to arrive at relevant content. In some embodiments this is done with only the initial display of the image and its motion to capture the eyes of a user and draw them to the relevant content. While placement of such a relatively static image as early as possible can be beneficial (even though it may for a time not exhibit translational motion), in some embodiments the initial image is placed only after the relevant content is visible on the screen and then it moves across the screen to capture the attention of the user before it arrives at a location of the relevant content. In some embodiments, when the starting and ending locations are the same or nearly the same, the image is moved away and then toward the final destination in order to capture the user's attention by translational motion.

Because of the limitations of human perception and reaction times, it is beneficial for the computation device to make such motions at a speed that is slower than typical computation speeds so that the neuronal automatic motion detection circuitry can function as expected and stimulate high performance involuntary saccades that change the user's point of eye focus on a display screen. If a floating image moves too far between screen refreshes, then it would tend to only draw the user's attention via the same neural mechanisms as flashing, which is relatively undesirable. Note that several flashing techniques for "apparent motion" can be used to create, eventually after automatic processing in the human brain, a percept of motion; however, such percepts have a different neuronal sensory basis and in particular do not depend upon the automatic low-level neuronal motion detection circuitry that are modeled by the Hassenstein-Reichardt and Barlow-Levick models mentioned above. Refresh rates of display for computer screens typically range from 30 to 60 frames per second although much faster screens are used often by game players. While most humans do not perceive room lighting flicker at 50 cycles per second, as already noted the perception of motion occurs elsewhere in the brain and for most humans is faster and more reliable for causing a user to make involuntary saccades and ultimately to consciously perceive it. To ensure that motion detection capabilities of the dorsal stream are engaged, even when using slower but still common display hardware that operates at a 30 Hertz refresh rate, it is useful for motions to run slow enough to provide sufficient intermediate frames to reliably stimulate automatic low-level motion detection circuitry.

It is an aim of the present disclosure to ensure that users will see the motion stimulus used, which is another reason for motions to last long enough to reliably be observed. During saccades, which can have a duration of 150 milliseconds or more, stimuli for motion detection are automatically suppressed to prevent the saccade itself from generating false percepts of motion. Thus, motions that last less than 150 milliseconds can easily be entirely suppressed even when fully within the view of a user. Moreover, if a motion generates a saccade, but during the saccade an object in motion moves rapidly to another location and halts, then the final motions of the object may all be neuronally suppressed. In addition, an object that has motion onset and completion in too short of a time period cannot be tracked, even by involuntary saccades, rapid as they may be. It is an aim of this disclosure to provide motions and other transitory visually salient stimuli to distinguish parts of documents that can be tracked by saccades and are for that reason less likely to be missed than stimuli that cannot be thus tracked. It is an aim of this disclosure to ensure, to the extent visually possible without creating unbearable neuronal interference, that users will reliably perceive the transitory visually salient stimuli provided. Because low-level neuronal motion detection circuitry is directionally sensitive, i.e. certain neuronal motion detection circuitry operates preferentially for motion in one direction and is attenuated in other directions, by providing motion in multiple directions simultaneously it is an aim of this disclosure to help ensure that such distinguishing motions are not missed by users; for example, rotation and expansion and contraction of distinguishing objects can provide motion in multiple directions independent of translational motion.

To ensure engagement of the fastest and most reliable low-level neuronal motion response, it is best if moving objects on a screen and their parts should move over a long enough time period so that the motions can be tracked by saccadic eye movements. Moreover, if simulated motion is too rapid in a discrete frame by frame display, then according to the models, conflicting neural signals will be created and some dedicated neuronal motion detection circuitry may not be able to distinguish the stimuli from flashing stimuli and thereby at least in part be suppressed (for those neurons).

The image motion (which can be achieved by expansion/contraction and rotation as well as motion across the screen)

in some embodiments comprises simulated motion that is simultaneously of sufficiently long duration and sufficiently slow to engage low-level neuronal motion detection and be tracked visually. To achieve this for a floating object or image like the one in FIG. 17, which beneficially presents multiple edges perpendicular to every two-dimensional direction of motion and edges almost perpendicular to instantaneous rotational motion, can require 4 intermediate frames or more for optimal motion detection that moves the image half-way over itself.

The following constraints exclude behavior where the floating image does not move sufficiently with respect to the document display as well as with respect to the display screen: "where d is the average of the average width and the average height of the indication image during the visually apparent transition: two sums of distances between positions of a first trace point in adjacent frames of the indication image, with the first sum positions taken relative to the display screen, with the second sum positions taken relative to the scroll position of the document display, and with the sums taken over frames of the display screen between the first appearance and the second appearance, are both at least d/2." This takes into account the size of the floating image and requires that motions must add up to at least half the width of the image. Note however, that by summing a trace of a point of the image (rather than only summing only translational motions), rotations, expansions, and contractions are not excluded (by the description) from beneficially stimulating the dorsal stream—which such movements are neurologically capable of doing.

The following excludes many classes of behavior that may move too fast overall to reliably engage the dorsal stream in automatic movement detection: "the distance between adjacent steps of every point of the first appearance of the indication image, according to a minimal transition between the first appearance and the second appearance of the indication image that is divided into $t*f$ equal steps, is less than or equal to d/9 where it is the time duration of the visually apparent transition and $f$ is the refresh rate of the display screen". Note that "minimal transition" is defined at some length below; it is the shortest linear transformation to bring the first image to as close as possible to the second image (as can be achieved by a linear transformation in the plane). Note that rotations, translations (movement across the screen), and uniform expansions and contractions are all linear transformations that can be described exactly and simultaneously by a linear transformation. Also notice that again the size of the floating image is taken into account as 'd' here has the same meaning as in the previous paragraph (although its meaning is not here repeated).

Human full muscle actuation reaction in a distracting environment have been measured to be as slow as 500 milliseconds. Since a computer environment can be distracting, especially when a document is being newly rendered or scrolled, some embodiments make such transitions within a small multiple of the normal observed reaction times for humans in distracting environments; for example, some embodiments use a nominal 1.5 seconds for some such transitions.

Transitioning too slowly is problematical from a user satisfaction or preference viewpoint, but too slow of a transition is mainly a matter of user satisfaction versus involuntary interference and is not determined by human neurological limitations or the abilities of a computer's display hardware to stimulate it.

Some embodiments provide static distinguishing by providing the floating object or image with a pointer that points to the relevant part or content when the movement has stopped. In some embodiments the relevant part or content is dynamically distinguished by shrinking the floating object or image out of sight over the part as discussed elsewhere in this document. A large multiplicity of embodiments use different static and dynamic ways of distinguishing in conjunction with such movement of a floating object or image; see the definition of 'distinguish' below.

Some embodiments do not make a lateral movement over the screen but only expand and contract and/or rotate over the target. Depending on the floating image characteristics, both scaling up and down and rotation are automatically detectable as movement by the dorsal stream. However, from testing with humans, lateral movement adds to the reliability of the motion detection. Thus, in some embodiments all of these motion types take place simultaneously.

While waiting for relevant content to become displayable, whether through scrolling or other actions like e.g. clicking buttons, some embodiments provide a user with a needed busy indicator. In some embodiments the busy indicator is a partially opaque (i.e. partially transparent) magnifying glass icon with a concentric bull's eye solid-filled circle in the center of the circular part of the magnifying glass. In some embodiments and circumstances, its start position is wherever the user's last mouse action occurred and it migrates over a 2 second interval toward the center of the viewport region of the browser window. In some embodiments, if there is no recent mouse action in the browser window, the start position is the upper left corner of the content viewport region of the browser window. It continues to expand and contract (i.e. scale up and down) over a one second repeating interval until the relevant content is selected and visible to a user somewhere in the viewport. Note that stability may not have yet occurred for the display; e.g. scrolling may still be underway, the browser may be moving things around, applying formatting, adding newly arrived content, or applying newly arrived style sheets; thus, such a selection is sometimes a moving target.

In some embodiments, when target content is first observed in the viewport, visible, and selected; then the busy indicator begins to expand (while still periodically expanding and contracting) to twice its average size while moving toward the first character of the selection. In some embodiments, the first character location will be checked on 50 millisecond intervals; and if the target has moved, then the busy indicator translational motion is paused for a few milliseconds (in some embodiments just for enough time to calculate a new trajectory) while a new trajectory is calculated, after calculation it is immediately started from its paused position toward the new target position. In some embodiments the busy indicator is smoothly scaled down (on average, while still expanding and contracting) to ¾ of its nominal size (i.e. its nominal size while waiting in the center of the viewport) as it reaches the final position of the first character of the selection. When at its final position it then continues to shrink and finally disappears out of sight over the first character. In some embodiments it thus provides an illusion of shrinking into the first selected character.

In some embodiments this moving, scaling, and rotating busy indicator is implemented by a scalable vector graphic (SVG), which is known to those skilled in the art as a browser supported animation technology that simultaneously supports smooth lateral motions (translations), expansions and contractions (scaling), rotations, and opacity changes for arbitrary vector graphic objects. Note that in some such embodiments, if the trajectory begins at the same location that it will end and does not translate, it nevertheless provides a user with a visually apparent expanding and then contracting image over the relevant content. In some embodiments, even if by chance starting directly over the relevant content, a small translational motion takes place away from and then back to the relevant content.

It is useful in some embodiments for the form of the busy indicator to be a recognizable registered trademark so that an end-user will reliably (and perhaps instinctively over time) know from experience what he should expect from searches that display it when he sees it in operation.

In some embodiments, until relevant matching content is displayed in the viewport, no visual object (e.g. a busy indicator as described above) is added to the document display. However, once the target content is visible then a visual object such as a busy indicator or some other visual object is expanded and then contracted directly over the first character as it disappears. Such embodiments address the likelihood that an end user would have difficulty identifying the selected relevant text. However, such an embodiment does not beneficially draw a user's eyes across the screen by translational motion and does not beneficially start at the location of the last mouse action of a user.

In some embodiments, where specific document content is to be visually distinguished or partially distinguished ('distinguished' and 'partially distinguished' were defined and described in U.S. Pat. No. 10,430,474, but note that here their definition is presented and expanded to include in particular distinguishing by use of simulated motion, which was not disclosed in that patent), a busy indicator appears over the viewport area before the document is fully downloaded. In some embodiments it starts as a tiny graphic much smaller than a single character and grows as it migrates toward the center of the viewport. In some embodiments it will not always arrive at the viewport center because the relevant text may appear before that occurs, in which case its trajectory is interrupted and re-targeted to migrate (translate) to the first character as previously described. While there are benefits to targeting the first character for the end user, since the first character is likely a reasonable place for a user to start reading, some embodiments target other areas in the selection; for example, in some embodiments the center of the bounding rectangle for the selection is used as the target. In other embodiments, the center of the first word is used as the target.

In some embodiments, a previously stable document representation in a browser becomes unstable when a search is requested; e.g., additional content is programmatically requested and then programmatically examined because it is previously known that the additional content likely contains matching text. In some embodiments and circumstances, there is no indication whether particular additional content may have matching text; so in order to establish whether it does or does not, additional content is requested and displayed in the document. In some embodiments and circumstances, content is retrieved but not displayed until it is established whether it contains matching content.

In some embodiments, the browser display of a document is manipulated programmatically so as to obtain the full potential content of the document for display; then conventional or fuzzy find-select-scroll of the contents presents matching content. This manipulation comprises scrolling to the bottom of the page and programmatically clicking 'more' buttons, in English language documents it is 'more' buttons, in other languages the search string is different. Note that finding the buttons and determining which of them display text that indicates that they are likely being used to display 'more' information is performed in some embodiments by a sequence of JavaScript operations. Note that clicking on a 'more' button can reveal additional 'more' buttons, so this is at least in principle a repetitive operation that is halted after a predetermined number of iterations or when no changes occur. The open-source and permissively licensed Google headless browser can be configured (and Google publicly encourages its use in this manner) to obtain page content identical to the content that would be indexed by their search engine; if the same techniques are used for obtaining the Google indexed content, then the resulting page would have all content available that would appear in a web-search snippet. Thus, some embodiments use the techniques to achieve this that are exhibited in the Google chromium headless browser source code. A disadvantage of the full expansion of a displayed instance is that all content for the target page is downloaded and displayed. This is deliberately avoided by the designers of such a page and in many circumstances, it is unnecessary as will be described next.

In some embodiments, separate estimates of full textual content for documents are obtained and used; these estimates are distinct from the displayed instance of the document. In some embodiments, such estimates of full textual content are obtained at the display machine (user agent or browser) by application of multiple techniques, which include:
  processing the document separately in a hidden instance so as to obtain a representation of the entire potential content that can be displayed—without affecting the display version; requesting a search engine web crawler version of the document from the original source, which may be text-only or HTML without scripts, and which need not be manipulated to cause all viewable content to be downloaded and displayed; and
  requesting a third-party server version (e.g. a web search engine indexed version or, as described in U.S. Pat. No. 10,430,474, a URI Service version) of the document, which may be text-only and which need not be manipulated via page-associated scripts to work with the indexed content.

Some embodiments use more than one of the above enumerated techniques of obtaining a full textual estimate, and some embodiments use all of them, depending on circumstances.

After a full-version estimate of a document is obtained, some embodiments use that estimate by: examining the content of the estimate version for matching text; and if there is matching text, then using where it is in the estimate version to know how and where to expand the content of the displayed version so that matches found in the estimated full version are viewable in the displayed version. Some embodiments then present matching content to the user in the display instance. Some such embodiments include presentation of a moving busy indicator as described above, which in some embodiments is first presented to users at the time a user makes a request or when the document first has an HTML 'body' node in its DOM instance.

Figure 22:
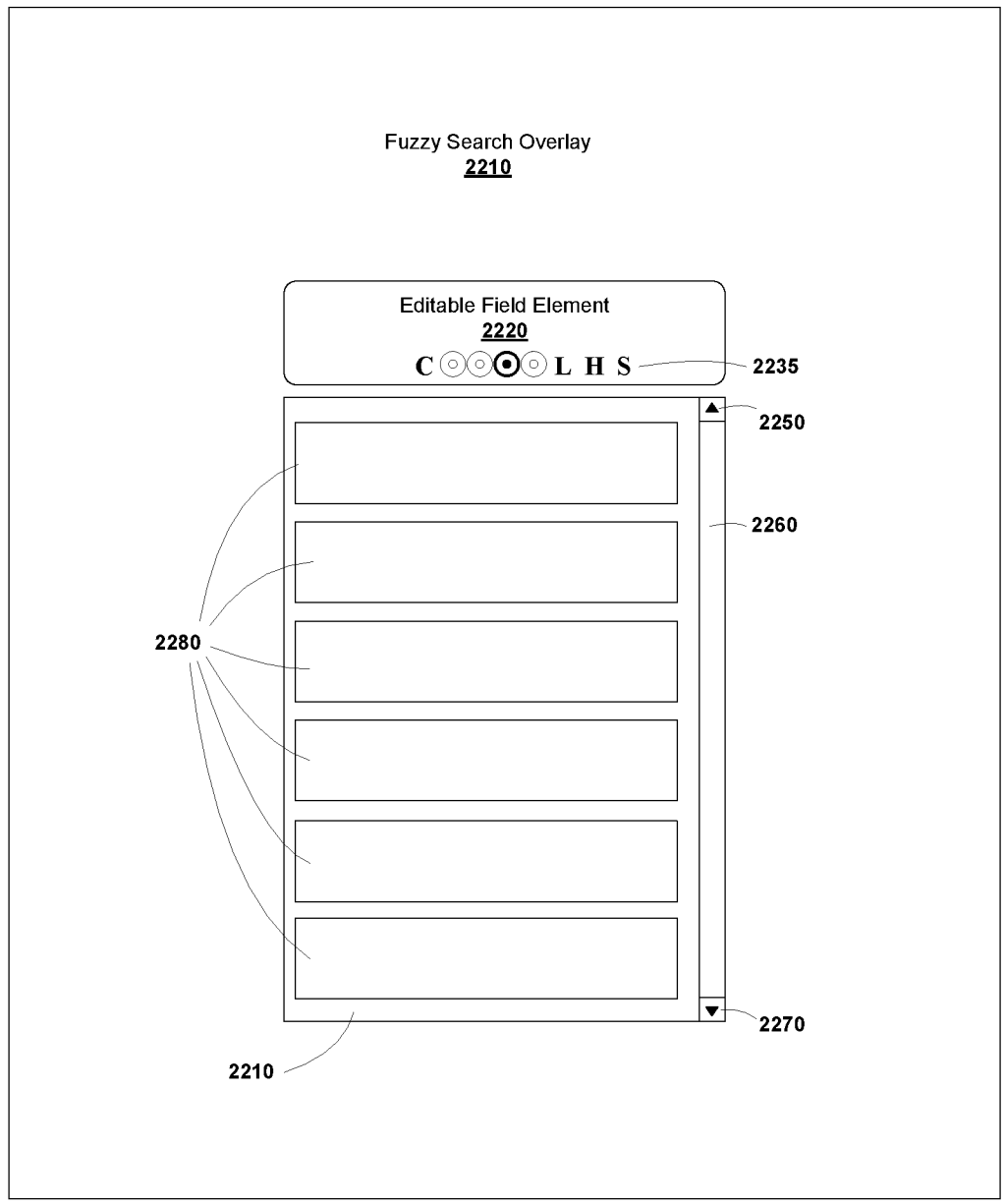
FIG. 22 illustrates a search results and control display with multiple match schemes selectable having a linear order of fuzziness.

FIG. 1 illustrates high quality search, very fuzzy search, cross-document search within a tab, application of a targeted busy indicator, and retrieval of additional content to support search. This process begins with one of four user-initiated event types: selection 105 of a snippet (which becomes a search string) in a web search-results window; activation 110 of a precision hyperlink (that identifies a specific target textual content in a document); initialization 115 of either a forward (which is default) or backward search for a target search string in context of a HTML document display, and 117 selection of a match scheme and/or a new search string, which initializes search using the currently selected match scheme and search string as illustrated in FIG. 22. Examples of the first two event types are described in U.S. Pat. No. 10,430,474, with the first as activation of a version 2 Fragment URI. The second entails activation of a version 1 Fragment URI or indirect Fragment URI, that results in initial failure to find the intended content, with the event 110 including entering into a recovery operation using, as the target search string, the concatenated prefix, target, and suffix as described for version 1 Fragment URIs in U.S. Pat. No. 10,430,474, which are obtained from a server. Since the new very fuzzy match scheme algorithm presented here has a capability of efficiently searching for high quality and lower quality matches simultaneously, the initial activity of finding desired content for version 1 Fragment URIs or indirect Fragment URIs also proceeds according to FIG. 1 by starting with the obtaining of the prefix, target, and suffix strings from a server. In some embodiments, if a version 1 Fragment URI or an indirect Fragment URI identifies a target string that is longer than a predetermined maximum length, then the mechanisms described in U.S. Pat. No. 10,430,474 are used for initial searching for the content, but if they are not longer than the predetermined maximum (which is likely the case for many if not most circumstances) then the initial search and recovery is integrated using mechanisms described here.

The direct activation of a particular match scheme 117 initialization is also used for initializing searches in ordinary document displays such as word processors which in some cases may load HTML documents but typically load documents in a format integrated into the word processor such as PDF or MS Word formatted documents. While the examples are described in detail for the more dynamic browser context, the operations are all performable for any document type. Some operations are not needed for documents that do not change content dynamically or that are not downloaded across the Internet or across some other semi-reliable network, so operations for HTML documents will, even though some are perhaps unnecessary, work with other document formats.

After initialization cases 105,110 where document DOM instances have just been created on a new tab, create 107 an empty 'search history list' for the active tab, that can be accessed in any context using the tab identifier, and set the new target search string at the head of the search history list. Note that some searching is performed tab-wide. Also note that not all browsers support tabs, so in some embodiments, actions described as tab-wide are browser-wide. In some embodiments, when a search snippet is selected from a web search engine as discussed above, the other snippets for the same target URI are added to the 'search history list' before the new target search string is placed at the head of the search history list. Doing this allows these snippets to later be selected for search without returning to the search results page and without opening a new tab; see the use of the search history list in conjunction with the display of that list by pressing the "H" (for history in English) button in the control button sequence 2235 illustrated in FIG. 22.

In some embodiments, if the initialization occurs via a mouse click in the viewport of a document display (which is in some embodiments a browser display), then a start position is recorded for that mouse click and used 120 later as the start position for a 'busy' indicator. The default start position is two pixels in, both vertically and horizontally, from the upper left of the viewport. For the initialization cases 105,110 where the target document is not yet retrieved when the user takes initializing action, the document is retrieved sufficiently to populate a DOM instance and then it is checked 120 on 50 millisecond intervals until 'document. body' in the DOM instance is a defined object. In some embodiments, a DOM mutation event listener is set up for the 'document' object, whereby only if DOM changes are made does the activity of checking the 'document.body' object occur, which has the benefit of taking up no CPU time for a quiescent DOM instance that is in a stable error condition.

Once 'document.body' is defined, a somewhat transparent (i.e. partially opaque) 'div' DOM element is created 123 to be an 'overlay' for the entire document.body element, which in-effect is therefore typically an overlay for the viewport. An initially tiny semi-opaque 'busy' SVG element is created 123 as a child element of the 'overlay' element that is configured to simultaneously move from the start position to the center of the overlay element (center of the viewport), rotate, expand on average to a conspicuous size, periodically expand and contract, and move from the start position to the center of the overlay element. In order to act as a busy indicator, it is configured to continuously rotate and periodically expand and contract, and continue to do so after it reaches the center of the viewport. It is configured to cease expanding (on average) and cease moving (translating) after it reaches the center of the viewport.

The overlay element becomes a child element of the document.body element by appending it to the possibly empty children container of document.body. Setting the whole overlay element as a child element to document.body is the act that initializes asynchronous animations of its busy SVG child element by a browser or other user agent, as configured above. In some embodiments, the configurations described above for busy SVG element animations are achieved by use of CSS (Cascading Style Sheet) and SVG capabilities simultaneously as defined in their corresponding specifications. While this configured activity for the busy SVG element takes place, this process asynchronously continues.

Figure 15:
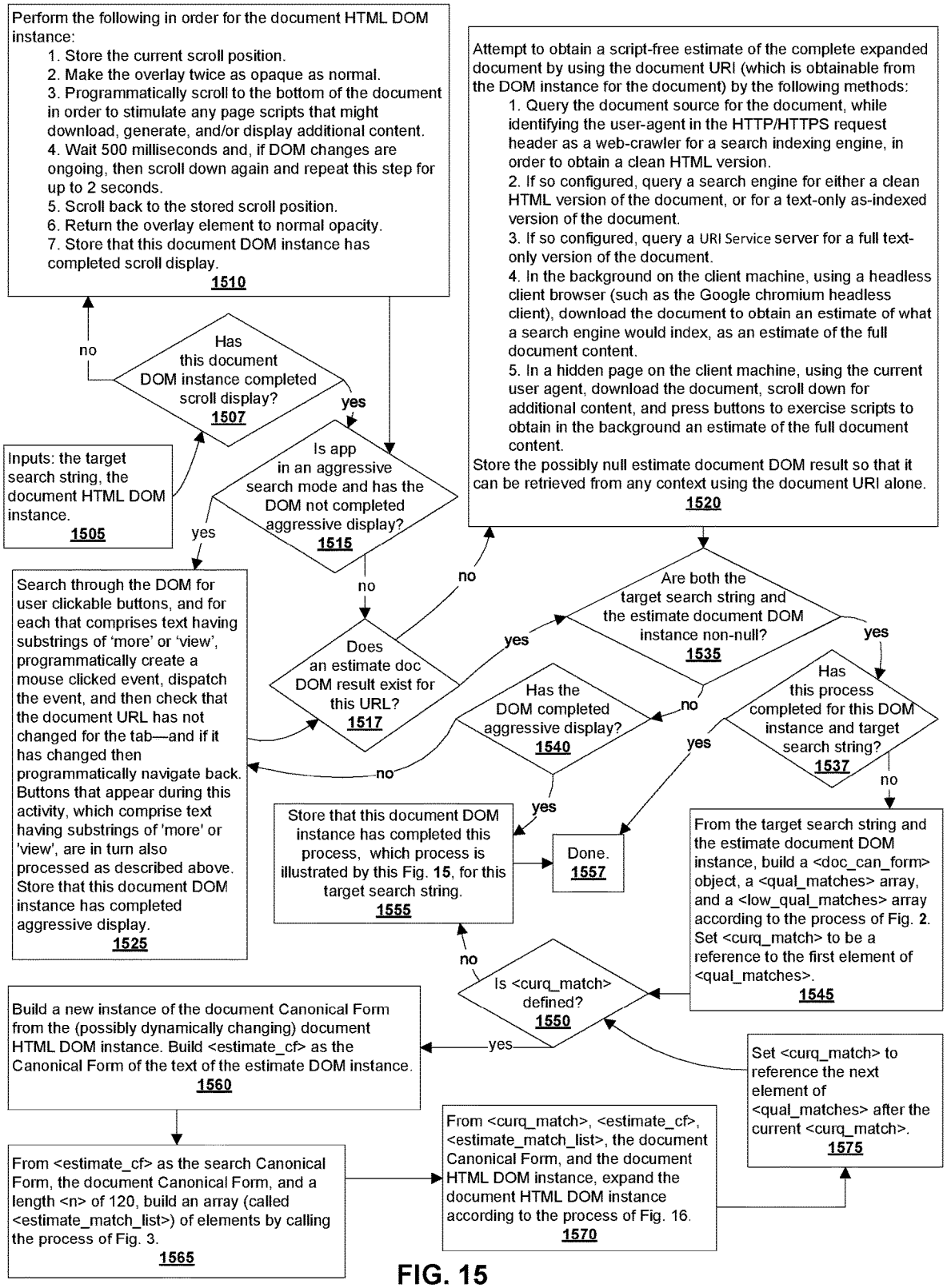
FIG. 15 illustrates retrieval and/or exposure of previously inaccessible potentially matching content of a document by programmatically stimulating retrieval and/or exposure via activation of the document's own scripts.

If the application (e.g. browser or browser extension) is 125 in an aggressive search mode, then an 'expose additional content' process is launched 128 to be performed asynchronously; it attempts to aggressively expose additional content for the document HTML DOM instance and is achieved by asynchronously launching 128 the process of FIG. 15. In some embodiments, aggressive search mode is entered for the entire application by user selection of a menu item. In some embodiments, aggressive search mode is entered for a browser tab only by user selection of a browser context-menu item. In some embodiments, globally entering or leaving aggressive search mode overrides any previously made tab only settings for aggressive search mode.

Figure 2:
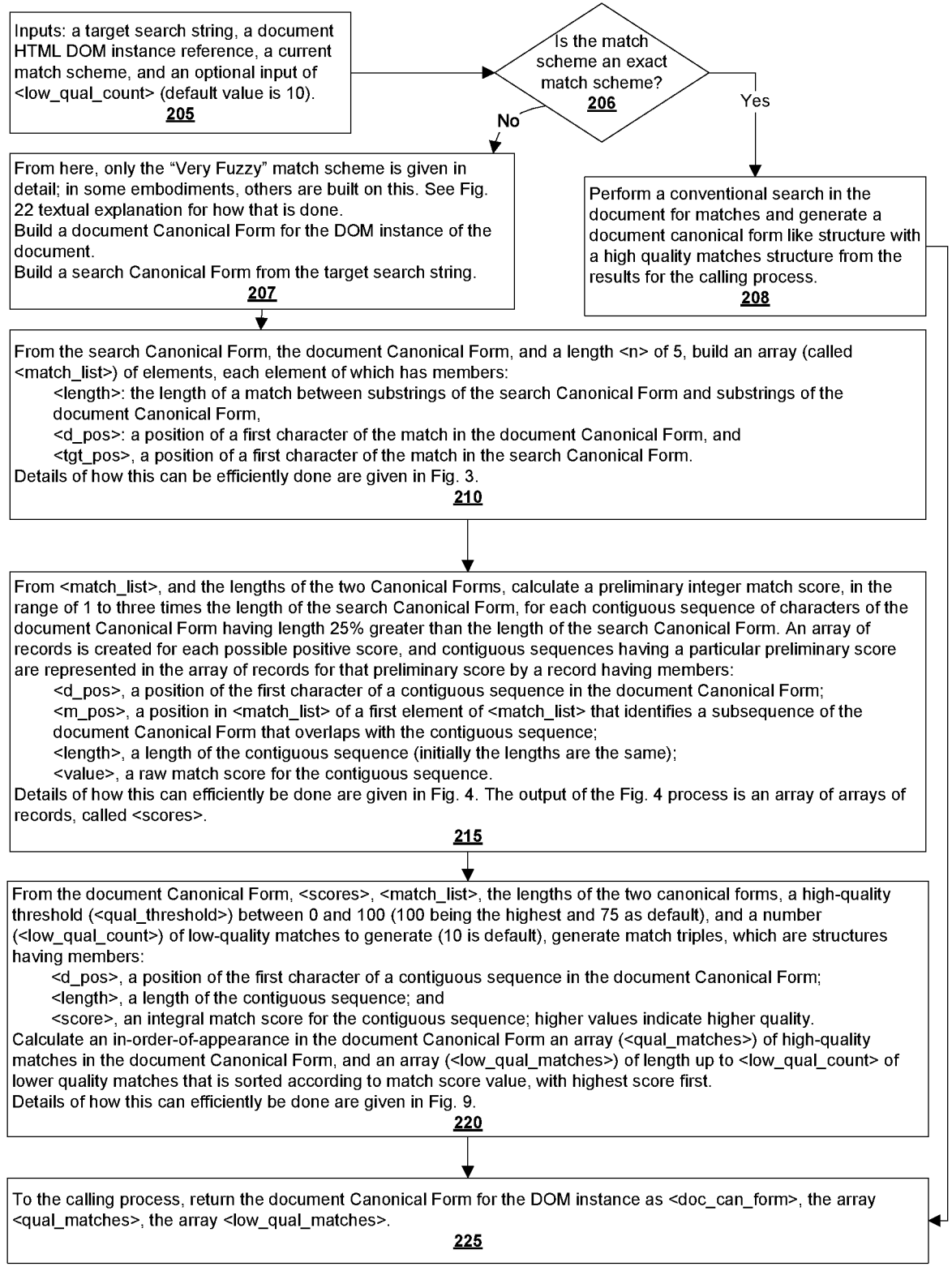
FIG. 2 illustrates use of a target search string and a document HTML DOM instance to construct and return an array of high-quality matches, an array of low-quality matches, and a document Canonical Form.

If the application is not 125 in an aggressive search mode; an 'expose additional content' process has not 145 been launched; this process has just launched 128 an 'expose additional content' process; or this process has just checked and found 143 that the DOM instance has not been stable since it was last checked; then from the target search string (created 105,110,115 in response to the initializing events) and the document DOM instance, build 130 a document Canonical Form <doc_can_form> object, a <qual_matches> array, and a <low_qual_matches> array according to the process of FIG. 2. Checking if the document has been 143 stable initially fails when first checked; in some embodiments this check is implemented via a document-wide event listener for DOM mutations—if none have occurred since last checked then it has been stable; in some embodiments it is more efficiently although somewhat imperfectly approximated by checking in JavaScript if the document.body.innerText.length variable has changed, or changed by more than 10 characters, since it was last checked.

If the <qual_matches> array is 133 non-empty, then by use of the <doc_can_form> object and the <qual_matches> array, identify 135<target_match> as the closest element of the <qual_matches> array that nominally follows (resp. precedes, recall that the user may have asked 115 to search backward, in which case it nominally precedes) a nominal current cursor position in the document HTML DOM instance. When the cursor is after (resp. before) the last (resp. first) element of <qual_matches>, then <target_match> is set to the first (resp. last) element of <qual_matches>. The nominal current cursor position precedes the first element of <qual_matches> if there is no actual cursor position in the document. The current cursor position is obtained by querying for a 'selection' for the document, and if it is non-empty (which includes if it is only a position and does not actually contain anything), then that position is found in the <qual_matches> array via a mapping of characters of the <doc_can_form> into the DOM instance as described in U.S. Pat. No. 10,430,474. The first character of each member (of <qual_matches>) is a character in the <doc_can_form>, and each such character is mapped to a specific character of the document HTML DOM instance. Each such character in the document HTML DOM instance is identified in the mapping by a node of the DOM and an offset; it is either before, after, or the same as the first character after the current cursor position in the document HTML DOM instance, which relationship can be established for node and offset pairs in the DOM instance by JavaScript functions known to those skilled in the art. Using those relationships, in some embodiments <target_match> is found by binary search over <qual_matches> for the nominal current cursor position, yielding <target_match>. In some embodiments, a step-wise comparison search from beginning to end of <qual_matches> establishes which element of the array should become <target_match>.

Figure 14:
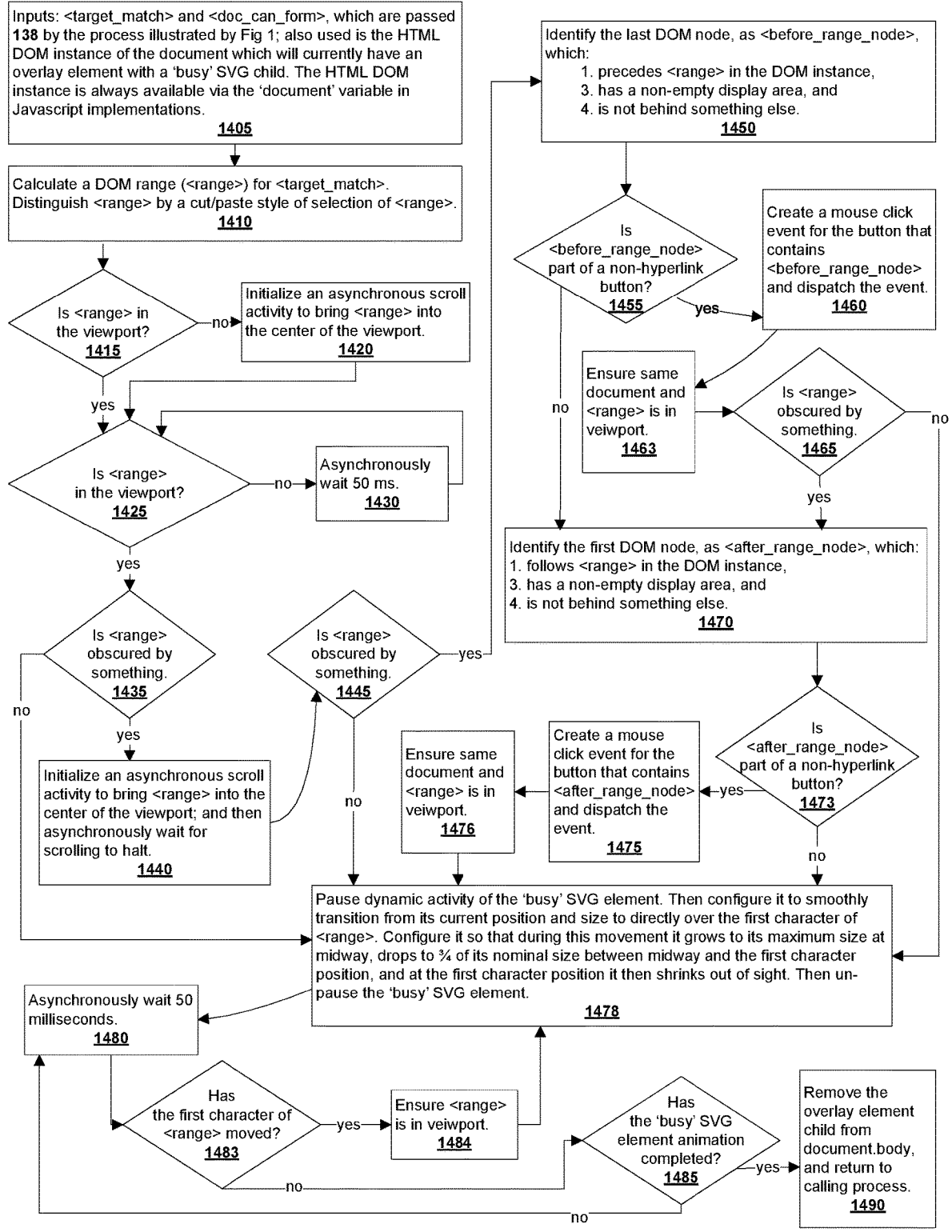
FIG. 14 illustrates simultaneous scrolling of selections, scrolling selections from behind obscuring DOM elements, pressing buttons to expose obscured selections, and repeated targeting of a targeted busy indicator to bring the user's attention to a revealed selection.

The <target_match> identified snippet of the document is displayed and distinguished 138 according to the process of FIG. 14, which also uses the character mapping from characters in <doc_can_form> to characters of the document HTML DOM instance, as described in U.S. Pat. No. 10,430,474.

If the <qual_matches> array is 133 empty, then asynchronously (i.e. while allowing other processes to continue) wait 140 for two seconds.

Figure 19:
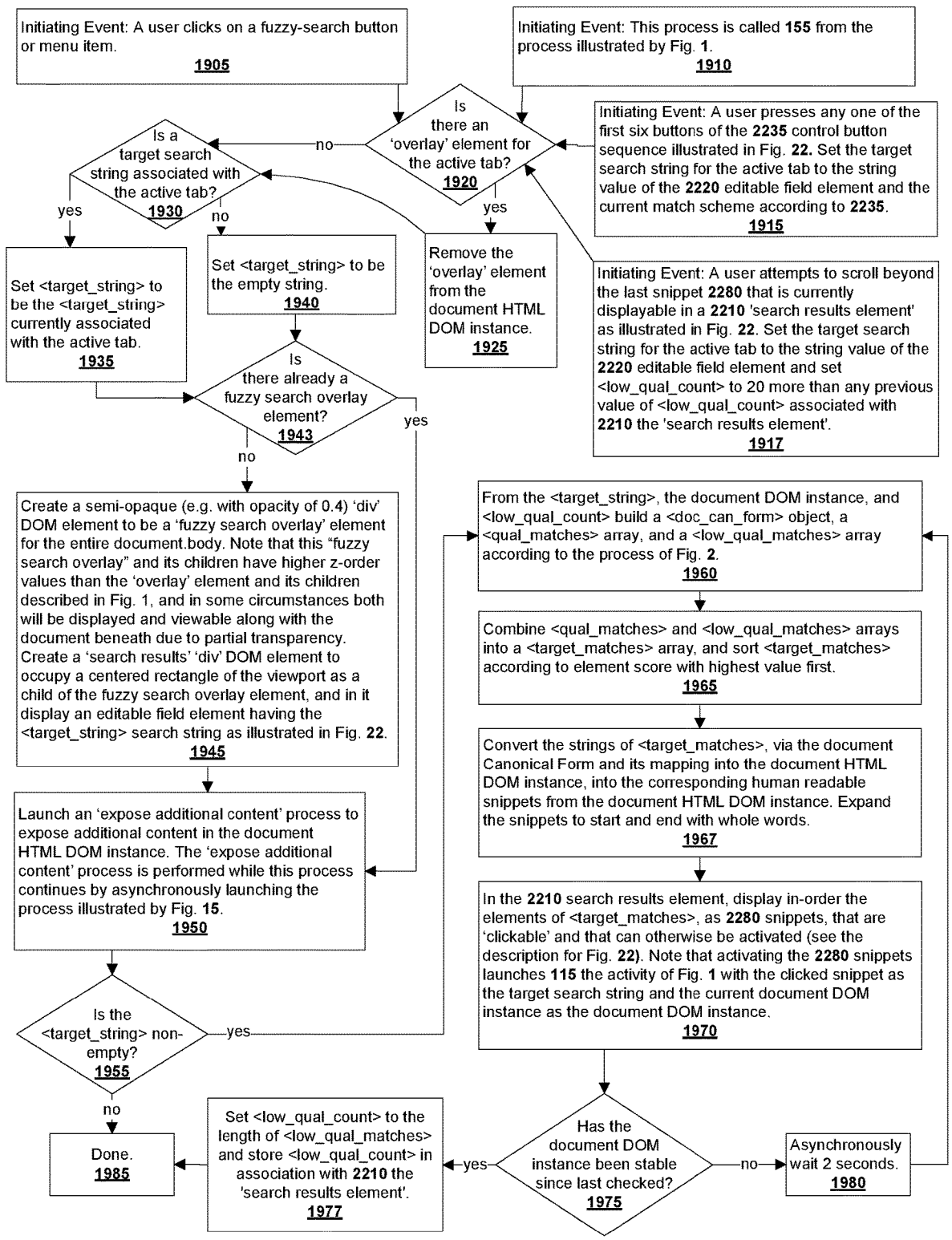
FIG. 19 illustrates creation of search results and display of the search results as user clickable snippets.

If the document DOM instance has 143 been stable since it was last checked, an 'expose additional content' process has 145 been launched, and if the application is 150 in an aggressive search mode; or if the document DOM instance has 143 been stable since it was last checked, an 'expose additional content' process has 145 been launched, the application is not 150 in an aggressive search mode, the target search string does 153 not have a high quality match in a different document that has been open in the current tab, and there are one or more elements of <low_qual_matches> having scores that are 160 at or above 45 or there is no matching alternative document version on hand; then asynchronously 155 launch the process illustrated by FIG. 19 and end this process illustrated by FIG. 1. Note that FIG. 19 creates circumstances whereby this process is again 115 initiated. In some embodiments there are multiple fuzzy match schemes and in some such embodiments a particular one of the multiple fuzzy match schemes is used by default for the processing outlined in FIG. 19; however, when a fuzzier (e.g. a match scheme expansion) of the default fuzzy match scheme is supported by the embodiment, and there are no <low_qual_matches> having scores that are at or above 45, then the next fuzzier match scheme (e.g. the closest match scheme expansion) relative to the default match scheme is chosen for the match scheme that is used in the processing described in FIG. 19.

If the document DOM instance has 143 been stable since it was last checked, an 'expose additional content' process has 145 been launched, the application is not 150 in an aggressive search mode, the target search string does 153 not have a high quality match in a different document that has been open in the current tab, all elements of <low_qual_matches> have scores that are 160 below 45, and there is a matching alternative document version on hand; then update 165 the current tab to be active on that alternative document version and launch 115 an instance of this process on it with the target search string. This is a backup for when an alternative version of the document has been found that has high quality matches in it, but attempts to reveal similar high-quality matches in the standard version of the document have failed and likewise there is no document associated with the tab that has high quality matches. In such a case, even if there is nothing but text (i.e. no beautifying formatting but simply the text), the text is presented to the user using, if necessary, a created local document with a URI local to the display machine.

If the document DOM instance has 143 been stable since it was last checked, an 'expose additional content' process has 145 been launched, the application is not 150 in an aggressive search mode, the target search string has 153 a high quality match in a different document (technically speaking a different URI) that has been open in the current tab; then update the current tab to be active on that different document and launch 115 an instance of this process on that document with the target search string. This behavior is increasingly important because document content is dynamic without actually downloading a different document. Clicking buttons in a document can change the content entirely, including the displayed URI, without actually downloading a different web page. Such behavior is characteristic of what are called single page applications (SPA). In some embodiments this is implemented by saving high-quality search match history for each URI accessed from a tab, so that if the content for the current URI does not have the sought content, then the history for other URIs for the tab are checked. Such an embodiment works in many cases because searches in the past that were successful are what the user wants to return to.

In some embodiments, an alternative text-only document is kept locally for each URI that has been displayed on a tab, and when a search is performed for any document that has been open on a tab, and that search does not produce high-quality matches, then the saved text for each of the previously displayed URIs for that tab is automatically searched. In some such embodiments the search 155 also provides, in order of score from highest to lowest, matches found in all of the URIs that have been displayed in that tab simultaneously. This has the benefit of supporting simultaneous searching across all parts (all URIs) of a single page application that have been displayed previously on the tab. It also has the benefit that a user need not remember precisely how to navigate to things he has seen previously when browsing a single page application—i.e. he can simply search for it locally as described here.

FIG. 2 illustrates use of a target search string, a document HTML DOM instance, and a match scheme to construct an array of high-quality matches, an array of low-quality matches, and a document Canonical Form or, in the case of binary searches, a document Canonical Form like structure for purposes of returning search results. This process is divided into 5 fairly complex activities that are performed sequentially, each before the next until the results are returned. All of these 5 activities are supported in detail in other figures and in some cases in U.S. Pat. No. 10,430,474. This process comprises the new very fuzzy match scheme algorithm previously discussed.

First the inputs 205 are received. If the match scheme is a binary or exact match scheme 206 then a conventional search 208 for matches is performed and a structure similar to a document Canonical Form with a populated high quality matches structure (binary searches have no such thing as low-quality matches) is created to return results to the calling process. In some embodiments this is done with a Boyer Moore search algorithm. Then the results are returned 225.

If the match scheme is not 206 a binary or exact match scheme, then there are 5 activities described for the search process, which are described in detail only for the "Very Fuzzy" match scheme. In some embodiments, the other formally fuzzy match schemes are built on this "Very Fuzzy" search, see the textual description for FIG. 22 to for an explanation of how this is done in some embodiments.

The first of the five activities of FIG. 2 is to build 207 a document Canonical Form for the document HTML DOM instance and a search Canonical Form for the target search string. The two Canonical Transform operations are similar but not identical. They differ in particular in that the document Canonical Form includes a mapping of characters into the DOM instance that is used later for locating text, i.e. locating document snippets, in the DOM instance so that visual changes can be provided to the user in the display. The search Canonical Form does not include such a mapping. The creation of such canonical forms and their use, including their use for locating and making changes to visual displays of a document, are provided in detail in U.S. Pat. No. 10,430,474. However, they are modified here for instances that provide case sensitivity by removing steps for full case folding. See the definition of "Case Sensitive Canonical Form Transform". Thus, to provide case sensitivity in this search procedure, the only modification required is to not perform the step of case folding for both the search string or the document, which results in cased versions of characters to be treated as different characters throughout. Only the "Very Fuzzy" search procedure, from here on out, is provided in minute detail, which details are from here the same for case sensitive and case insensitive forms. See the documentation for FIG. 22 for further discussion of the other fuzzy match schemes.

The second of the five activities of FIG. 2 is to build 210 a <match_list> array of elements, with each element being a structure comprising three data members: <length>, which is the length of a match between substrings of the search Canonical Form and substrings of the document Canonical Form: <d_pos>, which is a position a first character of the match in the document Canonical Form; and <tgt_pos>, which is a position of a first character of the match in the search Canonical Form. The resulting <match_list> has the property that each character of the document Canonical Form is spanned by a match that is the longest match of that character in the search Canonical Form that comprises <n> or more characters of the search Canonical Form. This is achieved by invoking the process of FIG. 3 with the value of <n> set to the integer 5. In some embodiments <n> is another fixed value and in some embodiments <n> depends on the length of the search Canonical Form. In some embodiments <n> is set to the next highest integer to the base 10 logarithm of the maximum of 2 and the length of the search Canonical Form. I.e., where L is the length of the search Canonical Form, <n>=⌈log$_{10}$(Max(2, L))⌉.

The third of the five activities of FIG. 2 is to calculate 215 a preliminary integer match score for each contiguous sequence of characters of the document Canonical Form having length 25% greater than the length of the search Canonical Form. An array of records is created for each possible positive score, and contiguous sequences having a particular preliminary score are represented in the array of records for that preliminary score by a structure having members: <d_pos>, which is a position of the first character of a contiguous sequence in the document Canonical Form; <m_pos>, which is a position in <match_list> of a first element of <match_list> that identifies a subsequence of the document Canonical Form that overlaps with the contiguous sequence; <length>, which is a length of the contiguous sequence (initially when output here the lengths are the same); and <value>, which is a preliminary match score for the contiguous sequence. Details of how this can efficiently be done are given in FIG. 4. The output of the FIG. 4 process is an array of arrays of records, called <scores>.

The fourth of the five activities of FIG. 2 is to generate; from the document Canonical Form, <scores>, <match_list>, the lengths of the two canonical forms, a high-quality threshold (<qual_threshold>) between 0 and 100 (100 being the highest meaningful value and 75 is the default), and a number (<low_qual_count>) of low-quality matches to generate (10 is default); match triples that are structures having members: <d_pos>, which is a position of the first character of a contiguous sequence in the document Canonical Form; <length>, which is a length of the contiguous sequence; and <score>, which is an integer match score for the contiguous sequence. Higher values indicate higher quality of match. The output is an in-order-of-appearance in the document Canonical Form an array (<qual_matches>) of high-quality match triples (matches) in the document Canonical Form, and an array (<low_qual_matches>) of length up to <low_qual_count> of lower quality match triples (matches) that is sorted according to match score value, with highest score first. This is done by invoking the process of FIG. 9.

The fifth of the five activities of FIG. 2 is to return 225 the document Canonical Form for the DOM instance as <doc_can_form>, the array <qual_matches>, and the array <low_qual_matches> to the invoking process.

Figure 3:
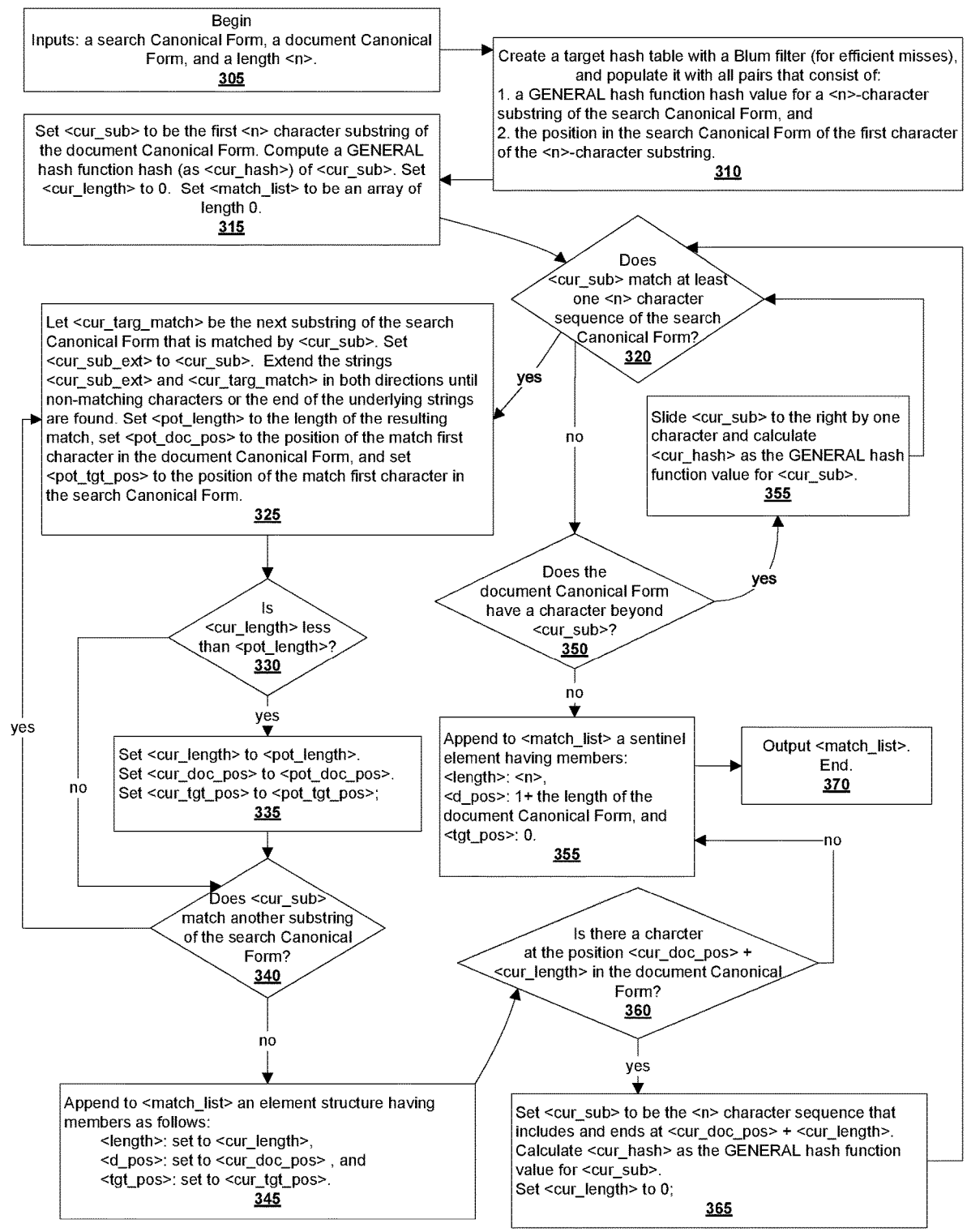
FIG. 3 illustrates use of a search Canonical Form, a document Canonical Form, and an n-gram length to build an array of exact matches between the two canonical forms.

FIG. 3 illustrates use of a search Canonical Form, a document Canonical Form, and an n-gram length to build an array of exact matches between the two canonical forms. It is invoked 305, from 210 FIG. 2, with inputs of a search Canonical Form, a document Canonical Form, and a length <n>.

A target hash table with a Blum filter (for efficient misses) is 310 created and populated with all pairs that consist of: 1. a GENERAL hash function hash value for a <n>-character substring of the search Canonical Form, and 2. the position in the search Canonical Form of the first character of the <n>-character substring. The GENERAL hash function used is initialized with random values that are used for all GENERAL hash function computations for the current instance of the application. Setting up a GENERAL hash function and its use are described in detail in U.S. Pat. No. 10,430,474. In some embodiments the Blum filter is created to have at least a 10 to 1 entry ratio relative to entries in the table. The main benefit of the Blum filter is high performance for computing hash table misses, of which there will typically be many; i.e. with high probability and efficiency the Blum filter eliminates probing of the actual hash table when the probe will be a miss. In some embodiments the GENERAL hash function produces 64-bit hash values. Note that it is possible for two <n> character substrings of the search Canonical Form to have the same GENERAL hash value, this occurs whenever the same <n> character substring is repeated in the search Canonical Form and also with low probability may occur if two different strings produce the same hash value (i.e. produce a hash collision). Thus, there are in general multiple entries in the hash table for a particular hash value, each of which are examined for actual matching when their hash value is probed.

Calculate 315 the GENERAL hash function hash (as <cur_hash>) of the first <n> characters of the document Canonical Form. Set <cur_length> to 0. Set <match_list> to be an array of length 0.

In some embodiments the check 320 of whether <cur_sub> matches at least one <n> character sequence of the search Canonical Form proceeds as follows: 1)<cur_hash> is checked against the Blum filter, if there is no indication of one or more matching entries (which is likely the case) then there is no match and no further probe activity is required; 2)<cur_hash> is checked against the hash table for matching entries, and for each matching entry the underlying string is compared to <cur_sub>; if <cur_sub> matches anywhere in the search Canonical Form then this check 320 succeeds, otherwise it fails. Note that the hash table has an entry, as noted above, for each match of the hash, so in general there is a list of matches for a matching hash value. Moreover, while improbable a collision is possible so the underlying strings are compared to eliminate potential collisions.

If <cur_sub> 320 matches at least one <n> character sequence of the search Canonical Form then 325 set <cur_targ_match> to the next substring (if no previous then to the first substring) of the search Canonical Form that is matched by <cur_sub>; set <cur_sub_ext> to <cur_sub>; extend the strings <cur_sub_ext> and <cur_targ_match> in both directions until non-matching characters or the end of the underlying strings are found. Set <pot_length> to the length of the resulting match, set <pot_doc_pos> to the position of the match first character in the document Canonical Form, and set <pot_tgt_pos> to the position of the match first character in the search Canonical Form.

If <cur_sub> does not 320 match any <n> character sequence of the search Canonical Form and does 350 the document Canonical Form extend by at least one character beyond <cur_sub>, then 355 slide <cur_sub> to the right by one character and calculate <cur_hash> as the GENERAL hash function value for <cur_sub>. Note that in some embodiments this activity is efficiently performed by changing indexes and calculating the new <cur_hash> value from the old <cur_hash> value without traversing the characters that are in both the old <cur_sub> and the new <cur_sub>. This calculation is described in detail in U.S. Pat. No. 10,430,474.

If <cur_sub> does not 320 match any <n> character sequence of the search Canonical Form and at least one character of the document Canonical Form is 350 beyond <cur_sub>, then append to <match_list> a sentinel element having members: <length>, which is set to <n>; <d_pos>, which is set to 1+ the length of the document Canonical Form; and <tgt_pos>, which is set to 0. Then return 370 <match_list> to the invoking process. Note that the appended sentinel is used later to avoid otherwise necessary checking if a traversal is at the end of the <match_list> array.

If <cur_length> is 330 less than <pot_length>, then 335 set <cur_length> to <pot_length>, set <cur_doc_pos> to <pot_doc_pos>, and set <cur_tgt_pos> to <pot_tgt_pos>.

If <cur_sub> matches 340 another substring of the search Canonical Form, then loop back and process 325 the next match.

If <cur_sub> does not match 340 another substring of the search Canonical Form, then append to <match_list> an element structure having members as follows: <length>, which is set to <cur_length>; <d_pos>, which is set to <cur_doc_pos>; and <tgt_pos>, which is set to <cur_tgt_pos>.

If there is 360 a character at the position <cur_doc_pos>+<cur_length> in the document Canonical Form (which indicates that there is more content to process), then set <cur_sub> to be the <n> character sequence that includes and ends at <cur_doc_pos>+<cur_length>; calculate <cur_hash> as the GENERAL hash function value for <cur_sub>; and set <cur_length> to 0.

If there is not 360 a character at the position <cur_doc_pos>+<cur_length> in the document Canonical Form (which indicates that there is no more content to process), then append to <match_list> a sentinel element having members: <length>, which is set to <n>; <d_pos>, which is set to 1+ the length of the document Canonical Form; and <tgt_pos>, which is set to 0. Then return 370 <match_list> to the invoking process.

In some embodiments, when no match from the process of FIG. 3 covers the stem (i.e. the first k characters) of a word in the document Canonical Form, where k is determined at runtime, and that k length stem matches the stem of a word in the search Canonical Form, then that match is extended to its longest match length and it is added in its order to the <match_list> array. In some embodiments this is done in a separate pass over the data, and in other embodiments it is done in conjunction with the process of FIG. 3. To do this in conjunction with FIG. 3, before an <n> character match is 345 added to the <match_list>, the character sequence after the last entry in <match_list> and the new entry are checked to see if the first k characters of any word match the first k characters of a word in the search Canonical Form, and if they do then expand that match and append it to <match_list>; then repeat this check with the new <match_list> until all possibilities have been checked, and then 345 add the <n> character or more match to <match_list>. The beginning of words is, for some embodiments, determined by keeping this information as a bit (Boolean) when collapsing the strings to their document Canonical Form and search Canonical Form; i.e., when white space or punctuation (other than a dash '-' and its equivalents) is removed, adjacent characters are marked to indicate that they either end or begin a word. This results in rapid determination of whether a character of the document Canonical Form either begins or ends a word.

Figure 4:
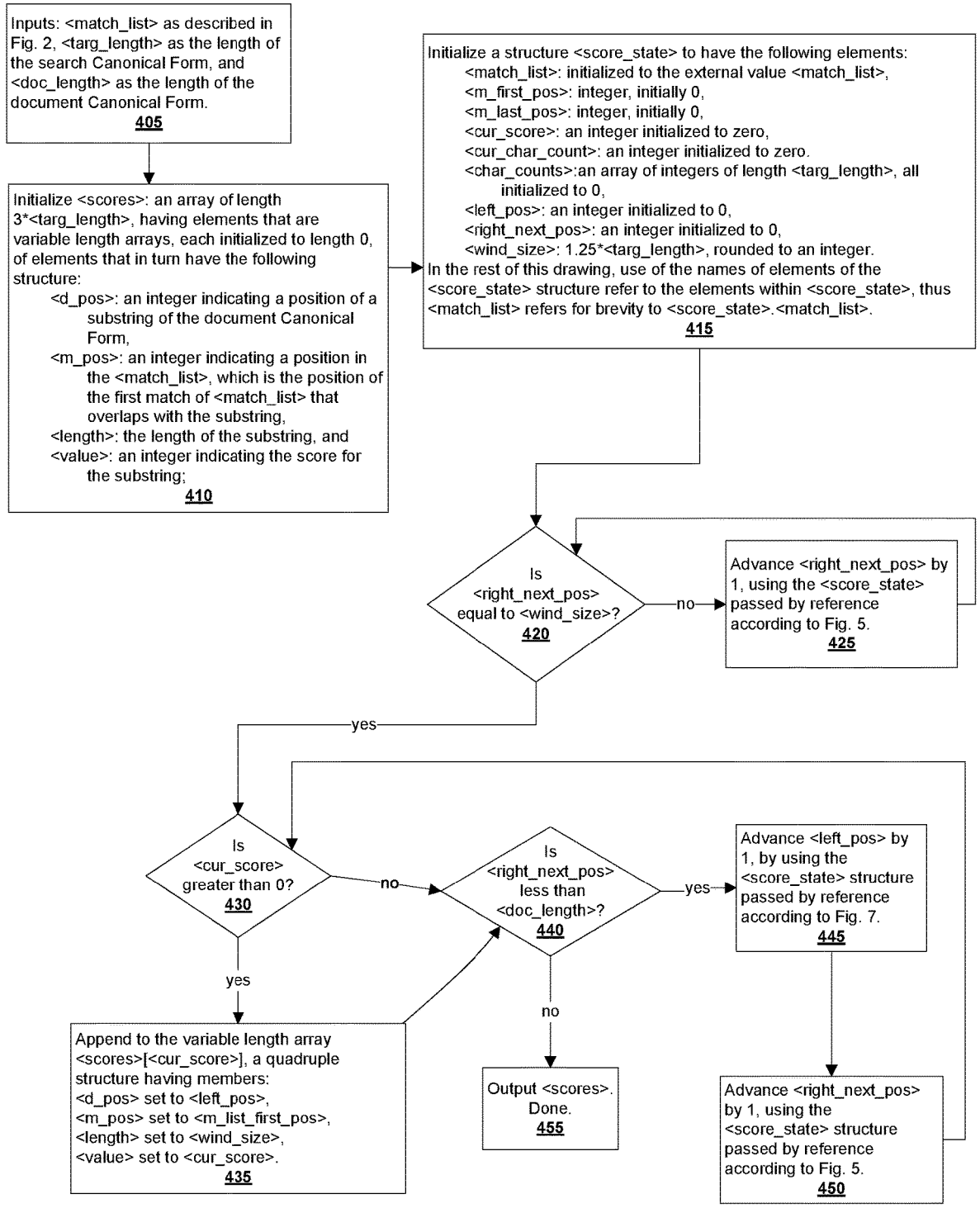
FIG. 4 illustrates using an array of exact matches between two canonical forms to create an array of potential fuzzy matches that are ordered by integer match quality scores.

FIG. 4 illustrates using an array of exact matches between two canonical forms to create an output array of potential fuzzy matches that are ordered by integer match quality scores. The output array is an array of arrays, with the index of the outer array being the score of elements of the array at that index. The output array of arrays may be quite sparse, i.e. there may be many potential scores for which there is no potential fuzzy match. This process is called 215 from FIG. 2.

Inputs to FIG. 4 are 405 <match_list> as described in FIG. 2, <targ_length> as the length of the search Canonical Form, and <doc_length> as the length of the document Canonical Form.

A <scores> array, which will be the eventual output, is initialized 410 to be an array of length 3*<targ_length> of variable length arrays, each initialized to length 0 of elements that in turn have the following structure: <d_pos>, which is an integer indicating a position of a substring of the document Canonical Form; <m_pos>, which is an integer indicating a position in the input <match_list> and is the position of the first match of <match_list> that overlaps with the substring; <length>, which is the length of the substring (and which initially and in FIG. 4 are all the same length); and <value>, which is an integer indicating the score for the substring;

Initialize 415 a structure <score_state> to have the following elements: <match_list>, which is initialized to be a reference to the input value <match_list>; <m_first_pos>, which is an integer and initially 0; <m_last_pos>, which is an integer and initially 0; <cur_score>, which is an integer initialized to zero; <cur_char_count>, which is an integer initialized to zero; <char_counts>, which is an array of integers of length <targ_length> with all elements initialized to 0; <left_pos>, which is an integer initialized to 0; <right_next_pos>, which is an integer initialized to 0; <wind_size>, which is initialized to 1.25*<targ_length> rounded to the closest integer.

In the rest of this description for FIG. 4, the names of elements of the <score_state> structure refer to the singular elements within <score_state>, thus <match_list> refers for brevity to <score_state>.<match_list>. Note that <score_state> is passed as a parameter to the processes of other figures by reference, i.e. changes made there are seen here in <score_state>.

Figure 5:
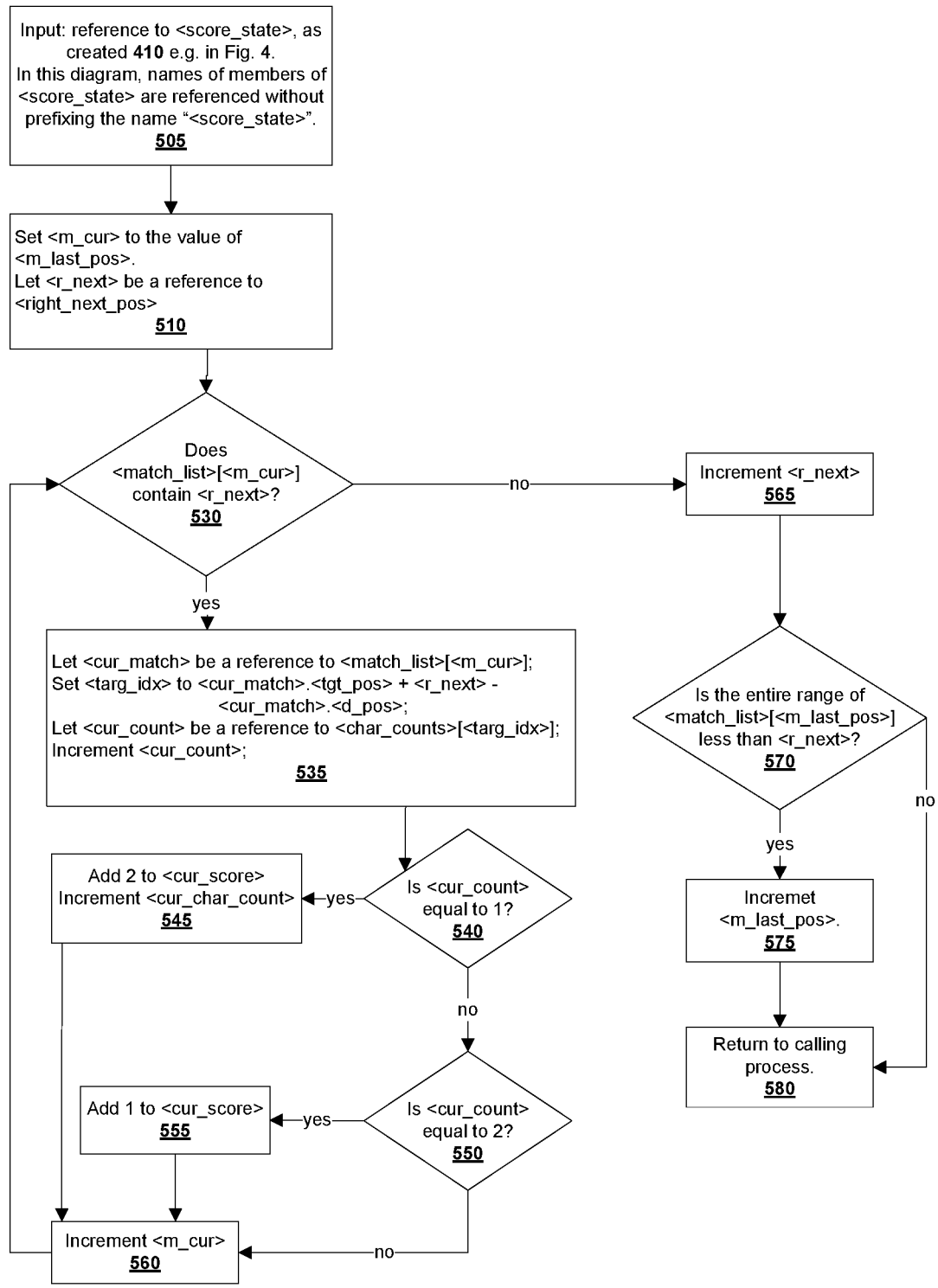
FIG. 5 illustrates expansion of a potential fuzzy match by one character on the right while keeping track of the changes in score.

Until <right_next_pos> is 420 equal to <wind_size>, repeatedly advance 425 <right_next_pos> by 1, by passing <score_state> by reference and executing the process of FIG. 5. This repeated call to FIG. 5 initializes the values of <score_state> to apply to the first <wind_size> character substring, which is the first substring defined by a sliding window.

If <cur_score> is greater than 0 (again, recall that <cur_score> for brevity means <score_state>.<cur_score>), then append 435 to the variable length array <scores>[<cur_score>], a quadruple structure having members: <d_pos>, which is set to <left_pos>; <m_pos>, which is set to <m_list_first_pos>; <length>, which is set to <wind_size>; and <value>, which is set to <cur_score>.

If <right_next_pos> is not 440 less than <doc_length>, then output the <scores> array and return to the invoking process.

Figure 7:
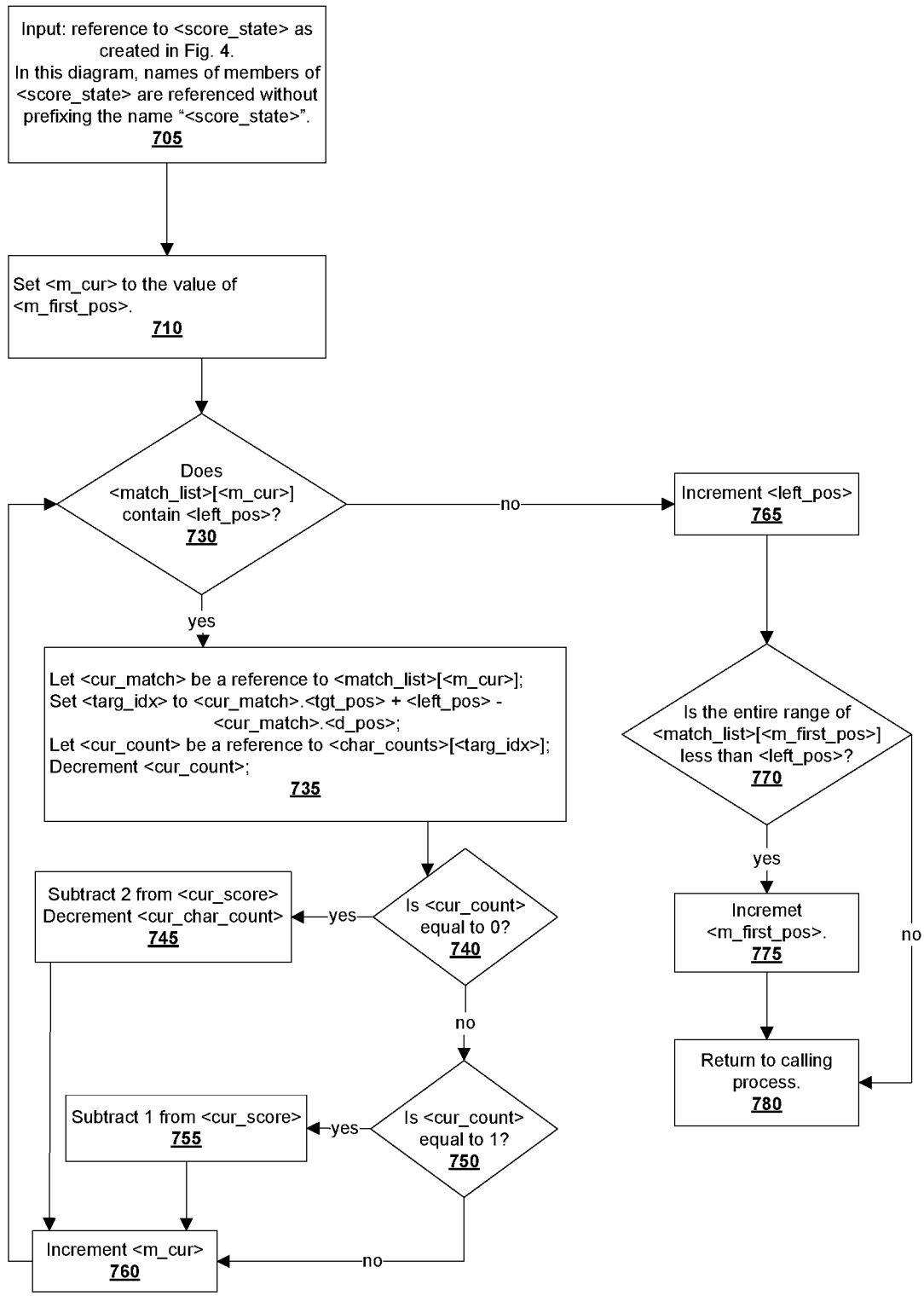
FIG. 7 illustrates contraction of a potential fuzzy match by one character on the left while keeping track of the changes in score.

If <right_next_pos> is 440 less than <doc_length>, then first advance 445 <left_pos> by 1, by using the <score_state> structure passed by reference to the process of FIG. 7, then advance 450 <right_next_pos> by 1, using the <score_state> structure passed by reference to the process of FIG. 5, and then loop back to the conditional 430 where <cur_score> is checked for being greater than 0. Note that this loop advances both the left and right boundaries of the 'window', so it stays the same size. The score is kept dynamically and by design it is affected only by changes on the edges, which makes this activity highly efficient with the efficiency not depending on the length of the window.

FIG. 5 illustrates expansion of a potential fuzzy match by one character on the right while keeping track of the changes in score. The only input is 505 a reference to <score_state>, which may have been created in FIG. 4. Note that in this description of FIG. 5, names of members of <score_state> are referenced without prefixing them with the name "<score_state>".

Set 510 <m_cur> to the value of <m_last_pos> and let <r_next> be a reference to <right_next_pos>.

If <match_list>[<m_cur>] contains 530 the position <r_next> (in the document Canonical Form), then let 535 <cur_match> be a reference to <match_list>[<m_cur>]; set <targ_idx> to <cur_match>.<tgt_pos>+<r_next>−<cur_match>.<d_pos>; let <cur_count> be a reference to <char_counts>[<targ_idx>]; and increment <cur_count>.

If <cur_count> is 540 equal to 1, then 545 add 2 to <cur_score> and increment <cur_char_count>.

If <cur_count> is 550 equal to 2, then 555 add 1 to <cur_score>.

Increment 560 <m_cur> and then loop 530 back to the check whether the current match contains the character at position <r_next>.

If <match_list>[<m_cur>] does not contain 530 the position <r_next> (in the document Canonical Form), then Increment 565 <r_next>.

If the entire range of <match_list>[<m_last_pos>] is 570 less than <r_next>, then increment 575 <m_last_pos>.

Return 580 to the calling process.

Figure 6:
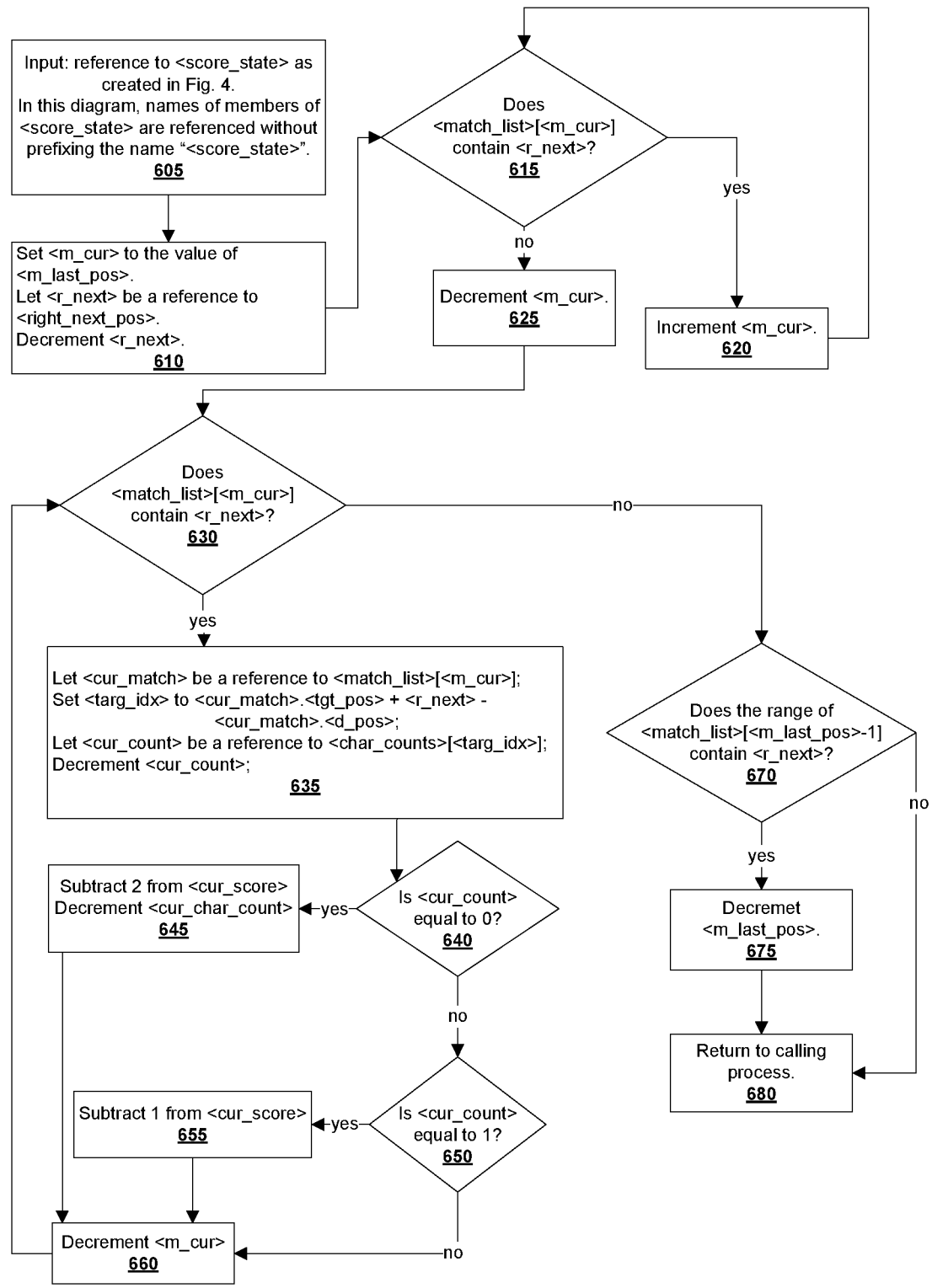
FIG. 6 illustrates contraction of a potential fuzzy match by one character on the right while keeping track of the changes in score.

FIG. 6 illustrates contraction of a potential fuzzy match by one character on the right while keeping track of changes in score. The only input is 605 a reference to <score_state>, which may have been created in FIG. 4. Note that in this description of FIG. 6, names of members of <score_state> are referenced without prefixing them with the name "<score_state>".

Set 610 <m_cur> to the value of <m_last_pos>, let <r_next> be a reference to <right_next_pos>, and decrement <r_next>.

Until <match_list>[<m_cur>] does not contain 615 <r_next>, increment 620 <m_cur>.

Decrement 625 <m_cur>.

If <match_list>[<m_cur>] contains 630 the position <r_next> (in the document Canonical Form), then let 635 <cur_match> be a reference to <match_list>[<m_cur>]; set <targ_idx> to <cur_match>.<tgt_pos>+<r_next>−<cur_match>.<d_pos>; let <cur_count> be a reference to <char_counts>[<targ_idx>]; and decrement <cur_count>.

If <cur_count> is 640 equal to 0, then 645 subtract 2 from <cur_score> and decrement <cur_char_count>.

If <cur_count> is 650 equal to 1, then 655 subtract 1 to <cur_score>.

Decrement 660 <m_cur> and then loop 630 back to the check whether the current match contains the character at position <r_next>.

If <match_list>[<m_cur>] does not contain 630 the position <r_next> (in the document Canonical Form) and if the range of <match_list>[<m_last_pos>−1] 670 contains <r_next>, then increment 675 <m_last_pos>.

Return 680 to the calling process.

FIG. 7 illustrates contraction of a potential fuzzy match by one character on the left while keeping track of the changes in score. The only input is 705 a reference to <score_state>, which may have been created in FIG. 4. Note that in this description of FIG. 7, names of members of <score_state> are referenced without prefixing them with the name "<score_state>".

Set 710 <m_cur> to the value of <m_first_pos>.

If <match_list>[<m_cur>] contains 730 the position <left_pos> (in the document Canonical Form), then let 735 <cur_match> be a reference to <match_list>[<m_cur>]; set <targ_idx> to <cur_match>.<tgt_pos>+<left_pos>−<cur_match>.<d_pos>; let <cur_count> be a reference to <char_counts>[<targ_idx>]; and decrement <cur_count>.

If <cur_count> is 740 equal to 0, then 745 subtract 2 from <cur_score> and decrement <cur_char_count>.

If <cur_count> is 750 equal to 1, then 755 subtract 1 from <cur_score>.

Increment 760 <m_cur> and then loop 730 back to the check whether the current match contains the character at position <left_pos>.

If <match_list>[<m_cur>] does not contain 730 the position <left_pos> (in the document Canonical Form), then Increment 765 <left_pos>.

If the entire range of <match_list>[<m_last_pos>] is 770 less than <left_pos>, then increment 775 <m_first_pos>.

Return 780 to the calling process.

Figure 8:
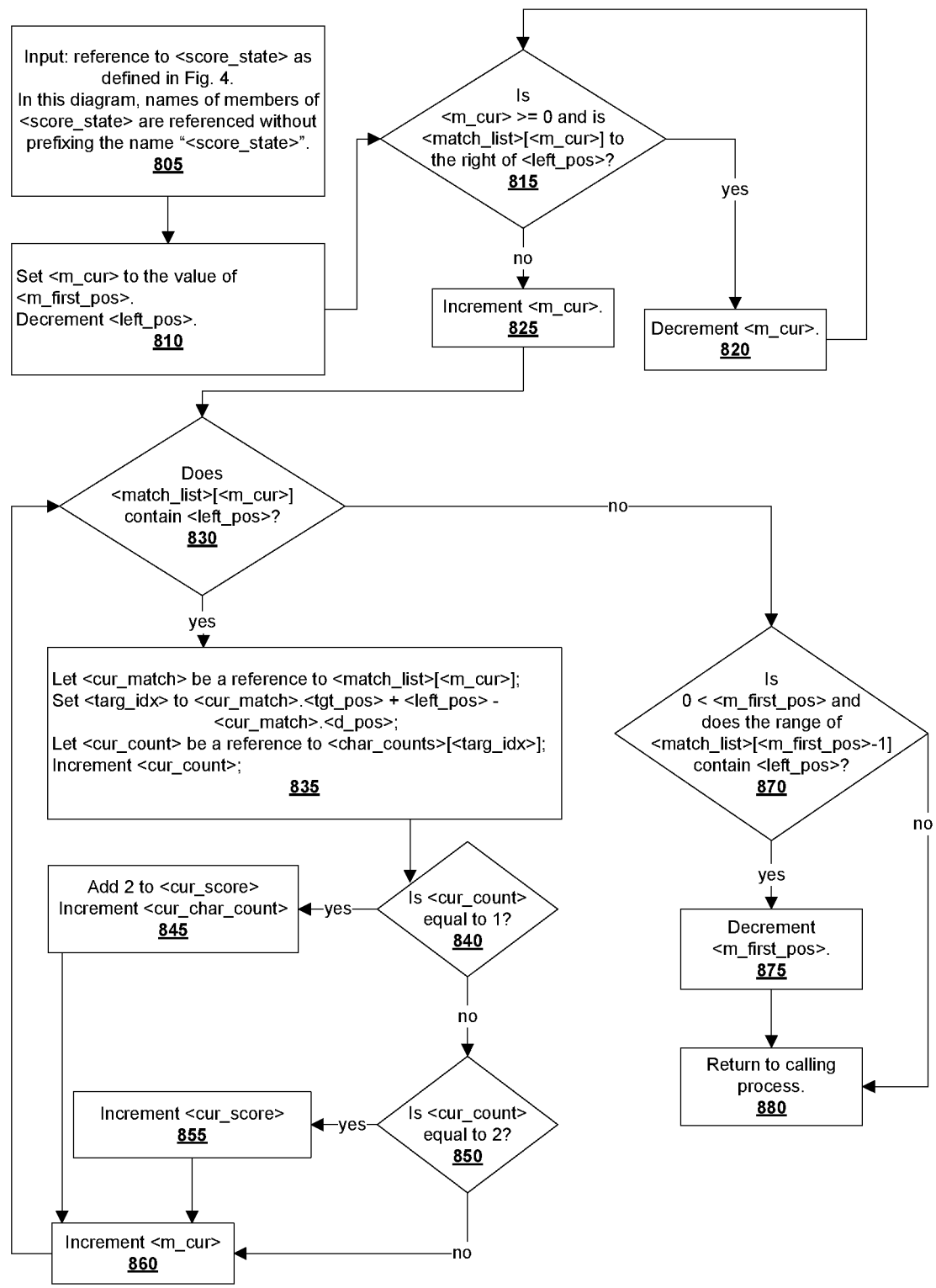
FIG. 8 illustrates expansion of a potential fuzzy match by one character on the left while keeping track of the changes in score.

FIG. 8 illustrates expansion of a potential fuzzy match by one character on the left while keeping track of the changes in score. The only input is 805 a reference to <score_state>, which may have been created in FIG. 4. Note that in this description of the processes of FIG. 8, names of members of <score_state> are referenced without prefixing them with the name "<score_state>".

Set 810 <m_cur> to the value of <m_first_pos> and decrement <left_pos>.

Until <m_cur> is less 815 than 0 or <match_list>[<m_cur>] identifies a match entirely to the left of <left_pos>, decrement 820 <m_cur>.

Increment 825 <m_cur>.

If <match_list>[<m_cur>] contains 830 the position <left_pos> (in the document Canonical Form), then let 835 <cur_match> be a reference to <match_list>[<m_cur>]; set <targ_idx> to <cur_match>.<tgt_pos>+<left_pos>−<cur_match>.<d_pos>; let <cur_count> be a reference to <char_counts>[<targ_idx>]; and increment <cur_count>.

If <cur_count> is 840 equal to 1, then 845 add 2 to <cur_score> and increment <cur_char_count>.

If <cur_count> is 850 equal to 2, then 855 add 1 to <cur_score>.

Increment 860 <m_cur> and then loop 830 back to the check whether the current match contains the character at position <left_pos>.

If <match_list>[<m_cur>] does not contain 830 the position <left_pos> (in the document Canonical Form), 0 is 870 less than <m_first_pos>, and the range of <match_list>[<m_first_pos>−1] contains <left_pos>, then decrement 875 <m_first_pos>.

Return 880 to the calling process.

Figure 9:
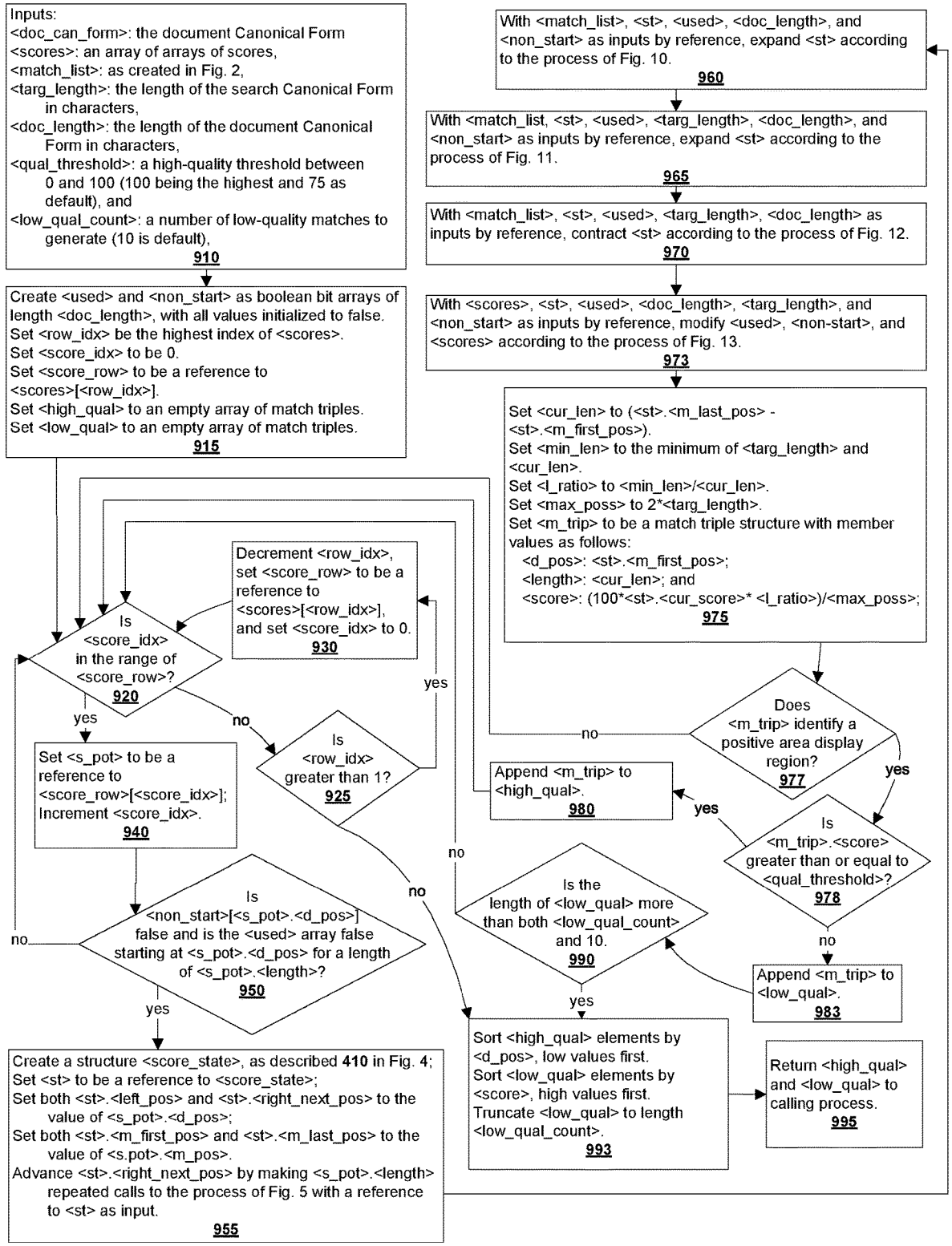
FIG. 9 illustrates use of an array of potential fuzzy matches and a quality threshold to construct an array of high-quality matches and an array of low-quality matches.

FIG. 9 illustrates use of an array of potential fuzzy matches and a quality threshold to construct an array of high-quality matches and an array of low-quality matches. Inputs to this process 910 are: the document HTML DOM instance, <doc_can_form>, which is the document Canonical Form; <scores>, which is an array of arrays of scores; <match_list>, which is an array of matches as created 210 in FIG. 2; <targ_length>, which is the length of the search Canonical Form in characters; <doc_length>, which is the length of the document Canonical Form in characters; <qual_threshold>, which is a high-quality threshold between 0 and 100 (100 being the highest and 75 is the default); and <low_qual_count>, which is a number of low-quality matches to generate (10 is default). This process is called 220 from the process of FIG. 2.

Create 915 <used> and <non_start> to be Boolean arrays, which in some embodiments are bit arrays, of length <doc_length>, with all values initialized to false or 0; set <row_idx> be the highest index of <scores>; set <score_idx> to be 0; set <score_row> to be a reference to <scores>[<row_idx>]; set <high_qual> to an empty array of match triples; and set <low_qual> to an empty array of match triples.

Match triple elements are instances of a structure having the following members: <d_pos>, which is an integer position for a match string in the document Canonical Form; <length>, which is the length of the match string; and <score>, which is an integer indicating the quality of the match string as a match.

While <score_idx> is 920 not in the range of <score_row> and <row_idx> is 925 greater than 1, decrement 930 <row_idx>, set <score_row> to be a reference to <scores>[<row_idx>], and set <score_idx> to 0. Note that any row of <scores> may be a zero-length array, we are here finding the first or next row, starting from the highest index and thus highest score, that is non-empty.

Set 940 <s_pot> to be a reference to <score_row>[<score_idx>] and then increment <score_idx>.

If <non_start>[<s_pot>.<d_pos>] is true then loop 920 back to check if <score_idx> is still in the range of <score_row>. Note that values of <non_start> are set to true if there is no longer a point in processing that position as a potential match in the document Canonical Form; this occurs e.g. when the position is closely followed by an already identified match, i.e. already used characters closely follow, because its score is likely invalid and an earlier potential match position will likely subsume the same as-yet unused characters. An important contribution to the performance of this procedure is the maintenance and use of the <non_start> and <used> arrays.

If <non_start>[<s_pot>.<d_pos>] is 950 true or at least one index of <used> is true starting at <s_pot>.<d_pos> for a length of <s_pot>.<length>, then ignore the current potential fuzzy match by looping 920 back to the check whether <score_idx> is still in the range of <score_row>. This conditional, which examines values of the <non_start> and <used> arrays, provides computational efficiency by typically causing many potential fuzzy matches to be ignored while traversing the <scores> array from higher score potential fuzzy matches to lower score potential fuzzy matches. To understand why this is appropriate see the introduction below for the process illustrated by FIG. 13, which performs maintenance on the <non_start>, <used>, and <scores> arrays after each match is fully generated. Note that the first potential fuzzy match that reaches this step is never caused to be ignored by this step because all values of <non_start> and <used> are initialized 915 to false.

If <non_start>[<s_pot>.<d_pos>] is 950 false and <used> is false starting at index <s_pot>.<d_pos> for a length of <s_pot>.<length>, then create 955 a structure <score_state>, as described and with initial values as specified 410 in FIG. 4; set <st> to be a reference to <score_state>; set both <st>.<left_pos> and <st>.<right_next_pos> to the value of <s_pot>.<d_pos>; set both <st>.<m_first_pos> and <st>.<m_last_pos> to the value of <s.pot>.<m_pos>; advance <st>.<right_next_pos> by making <s_pot>.<length> repeated calls to the process of FIG. 5 with a reference to <st> as input.

Figure 10:
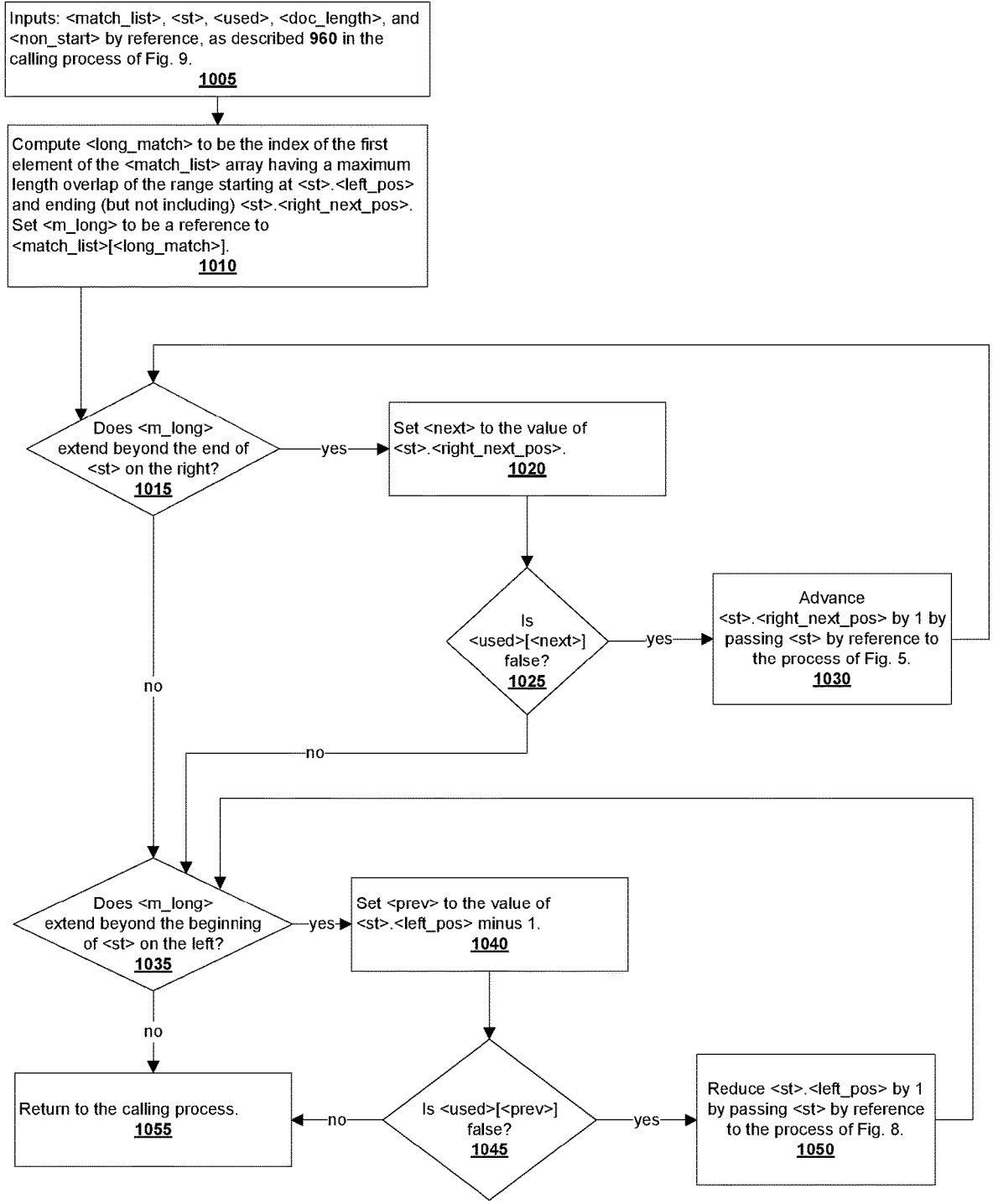
FIG. 10 illustrates repeated single character expansion of a potential fuzzy match to include as much of the longest comprised exact match as possible.

With <match_list>, <st>, <used>, <doc_length>, and <non_start> as inputs by reference, expand 960 <st> according to the process of FIG. 10. This expands, by repeated single character expansion of a potential fuzzy match, to include as much of the longest overlapped exact match as possible. When finished, it will include the whole of the longest overlapped exact match from <match_list> unless characters of that exact match have already been used and are marked 'true' in the <used> array.

Figure 11:
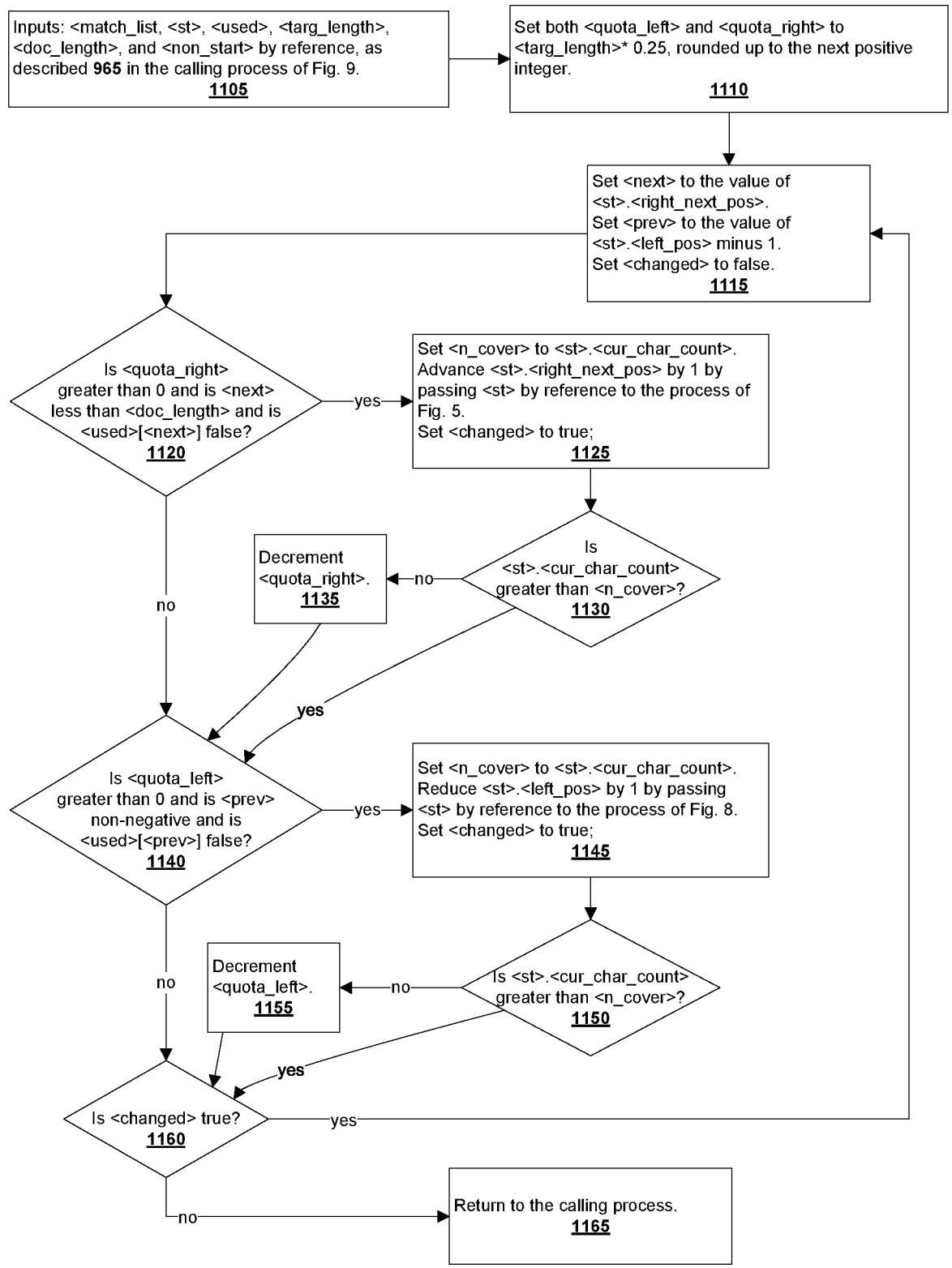
FIG. 11 illustrates repeated single character expansion of a potential fuzzy match to include surrounding text until non-essential character thresholds for the potential fuzzy match are met.

With <match_list, <st>, <used>, <targ_length>, <doc_length>, and <non_start> as inputs by reference, expand 965 <st> according to the process of FIG. 11. This expands the potential fuzzy match <st> to include surrounding text until non-matching character thresholds are met. The non-matching character thresholds are by default a percentage of <targ_length>.

Figure 12:
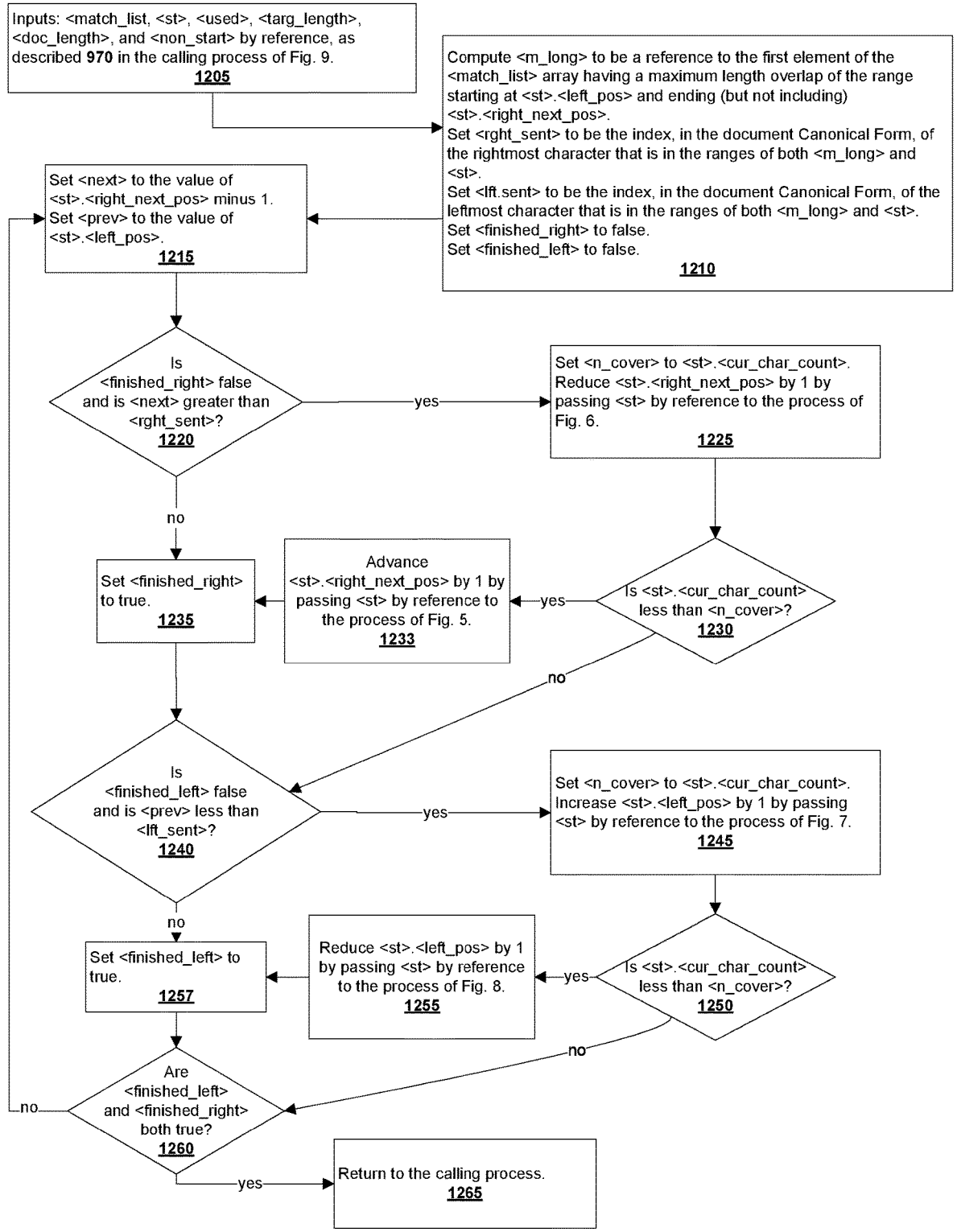
FIG. 12 illustrates repeated single character contraction of a potential fuzzy match until character removal would cause a matched target character to become unmatched.

With <match_list>, <st>, <used>, <targ_length>, <doc_length> as inputs by reference, contract 970 <st> according to the process of FIG. 12. This contracts <st> on the left and right in single character increments until the removal of another character would reduce the number of characters from the search Canonical Form that are matched. This is the final step in establishing the next match to be output.

Figure 13:
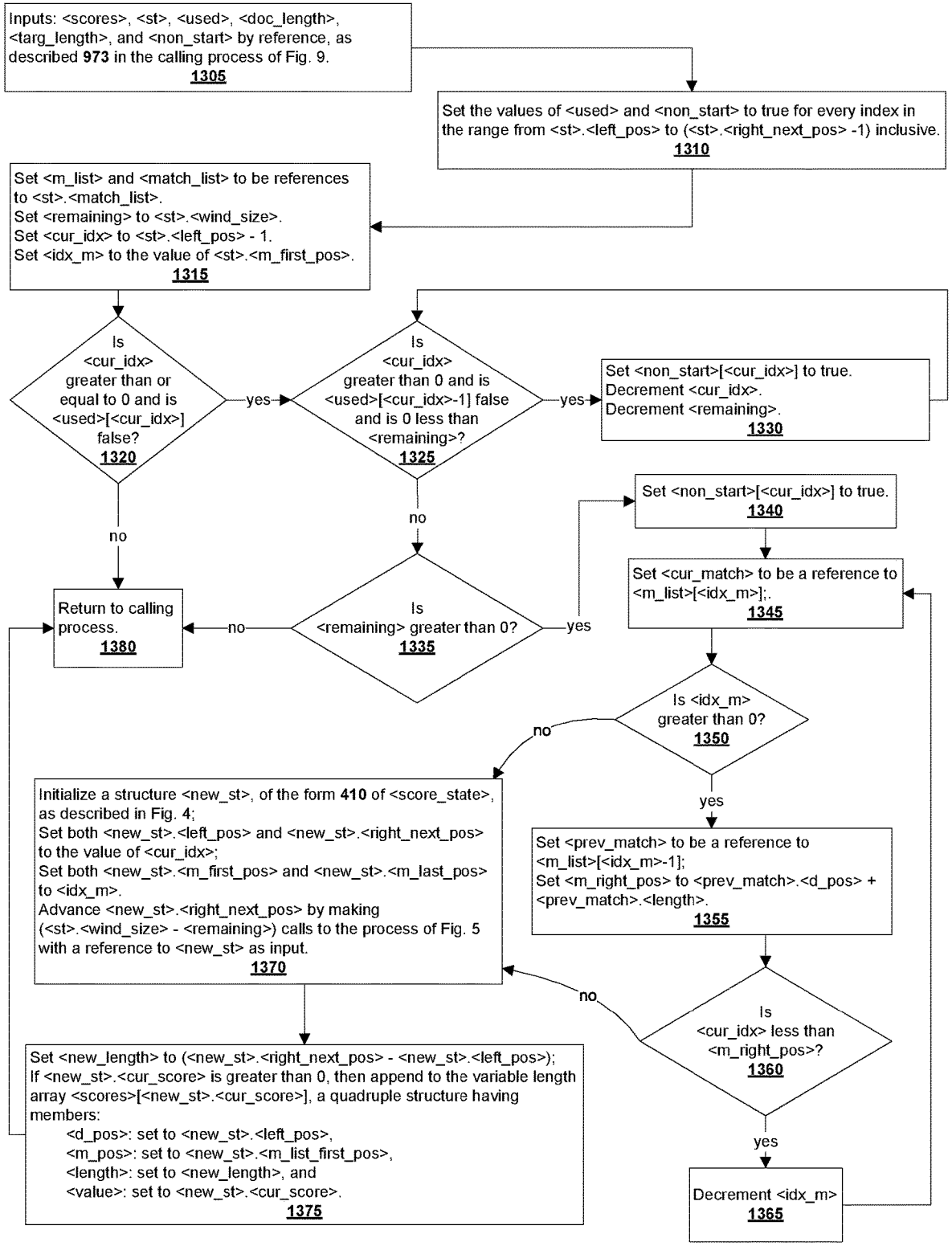
FIG. 13 illustrates modifying an array of potentially fuzzy matches and marking characters of the document Canonical Form as used and as non-start in order to continue to efficiently construct arrays of matches.

With <scores>, <st>, <used>, <doc_length>, <targ_length>, and <non_start> as inputs by reference, modify 973 <used>, <non_start>, and <scores> according to the process of FIG. 13. This marks the characters comprised by the match <st> as used, i.e. marks them as 'true' in <used>. This marks the characters that precede the match up to a length of the potential match window size minus 1 as non-starting characters (i.e. characters that can be ignored as potential starting characters for additional matches); this is appropriate because it leaves a character unmarked whose window size covers all of the marked characters that immediately precede the current match. When the sequence preceding the current match is shorter than the potential match window size, then a score for the first unused character in the sequence, in conjunction with the unused characters that follow it, is computed and appended to the appropriate <scores> array. Note that this cannot result in a score that is greater than the score that character already had, so continuing the traversal of the <scores> array of arrays will eventually encounter it.

Set 975 <cur_len> to (<st>.<m_last_pos>–<st>.<m_first_pos>); set <min_len> to the minimum of <targ_length> and <cur_len>; set <l_ratio> to <min_len>/<cur_len>; set <max_poss> to 2*<targ_length>; and set <m_trip> to be a match triple structure with member values as follows: <d_pos>, which is set to <st>.<m_first_pos>; <length>, which is set to <cur_len>; and <score>, which is rounded to the nearest integer to (100*<st>.<cur_score>*<l_ratio>)/<max_poss>. This sets up 100 as a best match score, which occurs with an exact match with the search Canonical Form.

If <m_trip> identifies 977 a positive area display region and <m_trip>.<score> is 978 greater than or equal to <qual_threshold>, then append 980 <m_trip> to <high_qual>, and loop 920 back to check if <score_idx> is still in the range of <score_row>. The check if <m_trip> identifies a positive area display region is done by mapping of the range of <m_trip> in the document Canonical Form to a range the document HTML DOM instance, which is described in detail in U.S. Pat. No. 10,430,474. Then, the range in the document HTML DOM instance is queried, using the JavaScript function getBoundingClientRectangle, to obtain a bounding rectangle for the range. If the rectangle returned has a non-zero area, then the above-described test for a positive area display region succeeds.

If <m_trip> identifies 977 a positive area display region and <m_trip>.<score> is 978 less than <qual_threshold>, then append 983 <m_trip> to <low_qual>.

If the length of <low_qual> is 990 not more than both <low_qual_count> and 10, then loop 920 back to check if <score_idx> is still in the range of <score_row>.

If the length of <low_qual> is 990 more than both <low_qual_count> and 10; or if <score_idx> is 920 in the range of <score_row> and <row_idx> is 925 greater than 1; then 993 sort <high_qual> elements by their member <d_pos>, with low values first; sort <low_qual> elements by their member <score>, with high values first; truncate <low_qual> to length <low_qual_count>; and return 995 the <high_qual> array and <low_qual> array to the calling process.

FIG. 10 illustrates repeated single character expansion of a potential fuzzy match to include as much of the longest comprised exact match as possible. This process is called 960 from FIG. 9. Inputs 1005 are: <match_list>, <st>, <used>, <doc_length>, and <non_start> by reference, as described 960 in the calling process of FIG. 9.

Compute 1010 <long_match> to be the index of the first element of the <match_list> array having a maximum length overlap of the range starting at <st>.<left_pos> and ending (but not including)<st>.<right_next_pos>; and set <m_long> to be a reference to <match_list>[<long_match>]. Note that in general this is not the longest element of <match_list> that overlaps, but instead the member of <match_list> that has the longest overlap with <st>.

If <m_long> extends 1015 beyond the end of <st> on the right, then set <next> to the value of <st>.<right_next_pos>.

If <used>[<next>] is 1025 false, then advance 1030<st>.<right_next_pos> by 1 by passing <st> by reference to the process of FIG. 5 and then loop back to the conditional 1015 that queries if <m_long> extends beyond the end of <st> on the right.

If <m_long> extends 1035 beyond the beginning of <st> on the left, then set <prev> to the value of <st>.<left_pos> minus 1.

If <used>[<prev>] is 1045 false, then reduce 1050<st>.<left_pos> by 1 by passing <st> by reference to the process of FIG. 8 and then loop back to the conditional 1035 that queries if <m_long> extends beyond the end of <st> on the left.

Return 1055 to the calling process.

FIG. 11 illustrates repeated single character expansion of a potential fuzzy match to include surrounding text until non-essential character thresholds for the potential fuzzy match are met. A non-essential character is a character of the document Canonical Form having the property relative to <st> that for each member of <match_list> that spans it, the matching character in the search Canonical Form is already matched in <st>; i.e., programmatically a potentially added character is non-essential if adding the character to the span of <st> does not increase the value of <st>.<cur_char_count>, which keeps a running count of the number of characters of the search Canonical Form that are currently matched in <st> by some member of <match_list>. In addition, adding characters on the left or right halts if an end of the document Canonical Form is reached or a character that has already been included in a resulting match is reached. By default the thresholds are 25% of the length of the search Canonical Form. In some embodiments these thresholds are passed as parameters and can meaningfully be any non-negative integer. This process is called 965 from FIG. 9. Inputs 1105 are: <match_list, <st>, <used>, <targ_length>, <doc_length>, and <non_start> all by reference, as described 965 in the calling process of FIG. 9.

Set 1110 both <quota_left> and <quota_right> to <targ_length>*0.25, rounded up to the next positive integer.

Set 1115 <next> to the value of <st>.<right_next_pos>; set <prev> to the value of <st>.<left_pos> minus 1; and set <changed> to false.

If <quota_right> is 1120 greater than 0, <next> less than <doc_length>, and <used>[<next>] false, then set <n_cover> to <st>.<cur_char_count> and then advance <st>.<right_next_pos> by 1 by passing <st> by reference to the process of FIG. 5, and set <changed> to true.

If <st>.<cur_char_count> is 1130 not greater than <n_cover>, then decrement 1135 <quota_right>.

If <quota_left> 1140 is greater than 0, <prev> is non-negative, and <used>[<prev>] is false; then 1145 set <n_cover> to <st>.<cur_char_count>; reduce <st>.<left_pos> by 1 by passing <st> by reference to the process of FIG. 8; and set <changed> to true.

If <st>.<cur_char_count> is 1130 greater than <n_cover>, then decrement <quota_right>.

If 1120 <quota_right> is 0, <next> is greater or equal to <doc_length>, or <used>[<next>] is true; and if 1140 <quota_left> is greater than 0, <prev> is non-negative, and <used>[<prev>] is false; then set 1145 <n_cover> to <st>.<cur_char_count>; reduce <st>.<left_pos> by 1 by passing <st> by reference to the process of FIG. 8; and set <changed> to true.

If <st>.<cur_char_count> is 1150 not greater than <n_cover>, then 1155 decrement <quota_left>.

If <changed> is 1160 true, then 1115 set <next> to the value of <st>.<right_next_pos>; set <prev> to the value of <st>.<left_pos> minus 1; set <changed> to false, and then loop back to the first conditional 1120 of FIG. 11.

Return 1165 to the calling process.

FIG. 12 illustrates repeated single character contraction of a potential fuzzy match until character removal would cause a matched target character to become unmatched. This process removes tails of non-essential characters on both the left and the right of a potential fuzzy match. Note that this can remove characters that match, but if it removes a matching character then that character is redundantly matched. Programmatically speaking, characters at the edge are removed if their removal does not decrease the value of <st>.<cur_char_count>. Also note that this leaves non-essential characters in the potential fuzzy match if they are interior to such a match, so this process is not in general the inverse of the process of FIG. 11. Inputs 1205 are: <match_list>, <st>, <used>, <targ_length>, <doc_length>, and <non_start> with all passed by reference, as described 970 in the calling process of FIG. 9.

Compute 1210 <m_long> to be a reference to the first element of the <match_list> array having a maximum length overlap of the range starting at <st>.<left_pos> and ending (but not including)<st>.<right_next_pos>; set <rght_sent> to be the index, in the document Canonical Form, of the rightmost character that is in the ranges of both <m_long> and <st>; set <lft.sent> to be the index, in the document Canonical Form, of the leftmost character that is in the ranges of both <m_long> and <st>; set <finished_right> to false; and set <finished_left> to false.

Set 1215 <next> to the value of <st>.<right_next_pos> minus 1; and set <prev> to the value of <st>.<left_pos>.

If 1220 <finished_right> is true or <next> is less than or equal to <rght_sent>, then set 1235 <finished_right> to true.

If 1220 <finished_right> is false and <next> is greater than <rght_sent>, then set 1225 <n_cover> to <st>.<cur_char_count>; reduce <st>.<right_next_pos> by 1 by passing <st> by reference to the process of FIG. 6; and then if <st>.<cur_char_count> is 1230 found to be less than <n_cover> (i.e. <st>.<cur_char_count> decreased 1225 in the previous step), then undo the effect of that step by advancing 1233 <st>.<right_next_pos> by 1 by passing <st> by reference to the process of FIG. 5, and set 1235 <finished_right> to true.

If 1240 <finished_left> is true or <prev> is greater than or equal to <lft_sent>, then set 1257 <finished_left> to true.

If 1240 <finished_left> is false and <prev> is less than <ift_sent>, then set 1245 <n_cover> to <st>.<cur_char_count>; increase <st>.<left_pos> by 1 by passing <st> by reference to the process of FIG. 7; and then if <st>.<cur_char_count> is 1250 found to be less than <n_cover> (i.e. <st>.<cur_char_count> decreased 1245 in the previous step), then undo the effect of that step by reducing 1255 <st>.<left_pos> by 1 by passing <st> by reference to the process of FIG. 8, and set 1257<finished_left> to true.

If <finished_left> or <finished_right> is 1260 false, then loop back to where 1215 <next> and <prev> are set.

Return 1265 to the calling process.

FIG. 13 illustrates modifying an array of potentially fuzzy matches and marking characters of the document Canonical Form as used and as non-start in order to continue to efficiently construct arrays of matches. This process marks the characters of the document Canonical Form that are spanned by a passed match record as used characters, which means that they will not be included in subsequently generated matches. This process also marks characters of the document Canonical Form as non-start characters. When a character of the document Canonical Form is marked as non-start, then potential fuzzy matches that start with the character are ignored for further processing into fully generated matches. Since used characters will not take part in subsequently generated matches, a potential fuzzy match that starts with the immediately preceding character could only be of length 1; therefore, the preceding character (if also not yet used) would represent a span of 2 characters and would necessarily have a higher preliminary score; i.e. in that circumstance the immediately preceding character to the current match can safely be marked as non-start, and thereby any potential fuzzy match that starts with it can be ignored. This reasoning could also imply, in appropriate circumstances, that the next previous character can be marked as non-start as well, and so on until appropriate circumstances no longer hold. The process of FIG. 13 describes how this is done in some embodiments. Since the span of characters following a start character of a potential fuzzy match can be shortened by using one or more of them in a previously generated match, the score for a potential match starting at a character can be lower over time while generating matches. The process illustrated by FIG. 13 generates new potential fuzzy matches for such characters and inserts them into the array; however, it does not remove the previous potential fuzzy match; instead, the span of potential fuzzy matches are examined 950, in the process illustrated by FIG. 9, and when they are about to be processed into generated matches the <used> array is examined to establish if any characters in the span are already used. If any are already used, then the potential fuzzy match is ignored and identification of the next potential fuzzy match for processing 920 begins. This works because the corresponding shorter span and its score will have already been appended 1375 to the array, and a shorter one cannot have a higher score than the longer potential fuzzy match that is ignored (recall that processing of potential fuzzy matches proceeds from higher to lower scores, see the initialization 915 of <row_idx> illustrated in FIG. 9). In some embodiments, the maintenance of these structures as illustrated in FIG. 13 is used to achieve higher performance generation of matches.

Inputs to this process 1305 are: <scores>, <st>, <used>, <doc_length>, <targ_length>, and <non_start> all by reference, as described 973 in the calling process of FIG. 9.

Set 1310 the values of <used> and <non_start> to true for every index in the range from <st>.<left_pos> to (<st>.<right_next_pos>−1) inclusive. I.e., the span of <st> is now the span of a match that is to be output, so its span of characters is marked as 'used'.

Set 1315 <m_list> and <match_list> to be references to <st>.<match_list>; set <remaining> to <st>.<wind_size>; set <cur_idx> to <st>.<left_pos>−1; and set <idx_m> to the value of <st>.<m_first_pos>.

If <cur_idx> 1320 is less than 0 or <used>[<cur_idx>] is true, then return 1380 to the calling process. This step says that if the immediately preceding character does not exist (the match starts at index 0) or it is used, then there is nothing to do to maintain the structures for this match.

If <cur_idx> 1320 is greater than or equal to 0 and <used>[<cur_idx>] is false; then while 1325 <cur_idx> is greater than 0, <used>[<cur_idx>−1] is false, and 0 is less than <remaining>, then 1330 set <non_start>[<cur_idx>] to true, decrement <cur_idx>, and decrement <remaining>.

If <remaining> is 1335 equal to 0, then return 1380 to the calling process.

Set 1340 <non_start>[<cur_idx>] to true.

Set 1345 <cur_match> to be a reference to <m_list>[<idx_m>].

If <idx_m> is 1350 greater than 0; then set 1355 <prev_match> to be a reference to <m_list>[<idx_m>−1] and set <m_right_pos> to <prev_match>.<d_pos>+<prev_match>.<length>, and then if <cur_idx> is 1360 less than <m_right_pos>, then decrement 1365 <idx_m> and loop back to where <cur_match> is set 1345 to be a reference to <m_list>[<idx_m>].

Initialize 1370 a structure <new_st>, of the form 410 of <score_state> as described in FIG. 4; set both <new_st>.<left_pos> and <new_st>.<right_next_pos> to the value of <cur_idx>; set both <new_st>.<m_first_pos> and <new_st>.<m_last_pos> to <idx_m>; advance <new_st>.<right_next_pos> by making (<st>.<wind_size>−<remaining>) calls to the process of FIG. 5 with a reference to <new_st> as input. This step calculates the score for the truncated potential match.

Set 1375 <new_length> to (<new_st>.<right_next_pos>−<new_st>.<left_pos>); if <new_st>.<cur_score> is greater than 0, then append to the variable length array <scores> [<new_st>.<cur_score>], a quadruple structure having members: <d_pos>, which is set to <new_st>.<left_pos>; <m_pos>, which is set to <new_st>.<m_list_first_pos>; <length>, which is set to <new_length>; and <value>, which is set to <new_st>.<cur_score>; and then return 1380 to the calling process.

FIG. 14 illustrates simultaneous scrolling of selections, scrolling selections from behind obscuring DOM elements, pressing buttons to expose obscured selections, and repeated targeting of a moving busy indicator to bring the user's attention to a revealed selection. Many of the sub-processes of the process illustrated by FIG. 14 run in parallel with other sub-processes. For example, the animations (including traversing the screen) of the SVG busy indicator occur entirely in parallel to all other processing as soon as a configuration for the busy indicator is placed in the document DOM instance and, when applicable, a controlling CSS 'paused' property is removed. In some embodiments, parallel processing is provided by commercial browser functionality that is familiar to those skilled in the art. In some embodiments, some parallel processing is arranged by use of Javascript runtime facilities for cooperative parallel processing such as explicit asynchronous provisions of the language like promises and the Javascript key-words 'async' and 'await'; all of which are familiar to those skilled in the art. In this way scrolling, animations of the SVG busy indicator, and pressing of buttons to reveal more content all occur asynchronously and their effects on the display of the document can occur essentially at any time while other operations are underway. In addition, in many circumstances these operations occur in parallel with downloading of initial or additional content, scripts, and CSS code for the document from external sources, and effects of the arrival of such information to a browser also in general occur asynchronously while the above actions are simultaneously occurring.

This parallelism can affect the correctness of previously calculated operations; for example, after computing a desired animation of the SVG busy indicator in part by targeting the position of a first character of a selection as an end-point for the translational component of the animation, a multiplicity of events can cause that first character to no longer be at the targeted position. Moreover, scrolling of the display alone is in general incapable of alleviating this circumstance. In some embodiments as a solution to this problem in part, the current position of the targeted first character is checked nominally on 50 millisecond intervals, and if it has changed then the old animation is paused; if the first character is out of the viewport then scrolling to bring it back into the viewport is requested asynchronously and then waiting for the scrolling to have brought the first character back into the viewport begins (note that in general scrolling motion continues asynchronously after the first character is in the viewport); if and when the first character is in the viewport a new animation of the SVG busy indicator is calculated, which starts at the paused position and ends at the new location of the first character; the HTML DOM instance elements that programmatically describe the old animation to the browser are replaced with the new animation description; and then animation for SVG busy indicator resumes by un-pausing it, which causes it to proceed asynchronously while checking the first character position resumes on nominal 50 millisecond intervals.

Inputs 1405 are: <target_match> and <doc_can_form>, which are passed 138 by the process illustrated by FIG. 1. Also used is the HTML DOM instance of the document having an overlay element with a 'busy' SVG child. In some embodiments the HTML DOM instance of the document is always available in its latest form through the global Javascript 'document' variable.

Calculate 1410 a DOM range (<range>) corresponding to <target_match> and then distinguish <range> by a cut/paste style selection of <range>. Calculating the DOM range is performed using the <doc_can_form> (the document Canonical Form) for the DOM instance as described in detail in U.S. Pat. No. 10,430,474. I.e., the <target_match> identifies a range of characters in <doc_can_form> (the document Conical Form), and via a mapping maintained and according to the teachings of U.S. Pat. No. 10,430,474, this range of characters is translated into a range <range> in the HTML DOM instance. Then, <range> is selected programmatically to distinguish it visually for the user similar to a cut/paste style of selection.

If <range> is 1415 not in the viewport, then initialize 1420 an asynchronous scroll activity to bring <range> into the center of the viewport. Note that there are various Javascript functions that can be used to do this. In some embodiments this is done using the 'smooth' scrolling option whereby the display seems to smoothly slide in view of the user.

While a test 1425 whether <range> is in the viewport, by asking e.g. in Javascript for its bounding client rectangle, shows that <range> is not in the viewport, wait 1430 asynchronously for 50 milliseconds. Note that because the request for scrolling is asynchronous, it is common in some embodiments for the initial tests here to fail to find the <range> in the viewport. It is also common to exit this loop before scrolling is complete, because the test in some embodiments is only whether it is in the viewport and not whether scrolling is complete.

If <range> is obscured 1435 by some other object of the HTML DOM instance, then Initialize 1440 an asynchronous scroll activity to bring <range> into the center of the viewport; and then asynchronously wait for scrolling to halt. Note that this is not redundant, because if <range> starts in the viewport, but not in the center, then up to this point there may have been no scrolling. There are many ways that <range> can be obscured, some of which can be alleviated simply by scrolling <range> to the center of the screen. Many web pages and HTML based pdf viewers have permanent or temporary fixed (i.e. that do not scroll with other content) elements that obscure content near the top or the bottom of the viewport, and in such circumstances a simple scroll to the center of the screen can bring the intended content into view for the user. In other circumstances a document may have a full overlay that obscures everything (and does not scroll), perhaps waiting for the user to supply credentials or respond to an advertisement. In the latter case some embodiments scroll the intended content to the center as described above and then proceed the same as if it were actually visible to the user. Often, this results in the user observing the busy indicator traversing to the position of the first character, which as noted is obscured, but this nevertheless provides assistance to the user because an experienced user will see from this where the intended content is (although obscured) and that it is in fact viewable provided he can eliminate the obscuring element. Moreover, the obscuring element may not be fully opaque, so the user may be able to see the desired content thus distinguished. In some embodiments waiting for asynchronous scrolling to halt is achieved by the use of an event listener for scroll events, in other embodiments it is achieved by asking for the bounding client rectangle for <range> on 50 millisecond intervals until it has not moved for at least the last three such requests. The test whether <range> is obscured, in some embodiments, is achieved by a hit test in the center of the bounding client rectangle for just the first character; a Javascript function known to those skilled in the art provides an array that lists the nodes at that location in order of 'hit' for a hypothetical ray of light passing through all elements at that location, and if the first such element (after elements of the semi-opaque overlay through which users can see, including the busy SVG element) is not the text node or its parent element then <range> is taken to be obscured.

If <range> is 1445 obscured by something, then Identify 1450 the last DOM node, as <before_range_node>, which: 1. precedes <range> in the DOM instance; 2. has a non-empty display area; and 3. is not behind something else. The hit test described above is used to test if it is behind something, but again the overlay and busy SVG elements are not considered obscuring even though they will typically appear in front of anything since in some embodiments they have a high z-order value. The tests are run on leafs in the DOM tree starting at the leftmost container of the <range>, each leaf node, moving left in the DOM instance tree, is queried for having a non-zero area bounding client rectangle, and if so then it is hit-tested with a getElementsFromPoint Javascript call on a point interior (not near the edge) of the bounding client rectangle. In some embodiments a point within one pixel of the center of the bounding client rectangle is used. In some embodiments, if the node comprises text, then the first character of the text is made into a DOM range object, and the hit test is performed against a point near the center of the bounding client rectangle for that first character. Eventually an element that meets these requirements is almost always arrived at; however, once searching has exhausted descendent nodes of the body node, searching stops with failure to define a <before_range_node>. Thus, in what follows, <before_range_node> could be null or undefined.

If <before_range_node> is 1455 part of a button that is not a foreign hyperlink, then create 1460 a mouse click event and dispatch the event on the button element that comprises <before_range_node>. A foreign hyperlink button is a button that navigates to a new href (different href compared exclusive to any fragment identifiers), which in some cases can be determined by examination of an embedded 'href' attribute for the button. However, while such examination eliminates navigation to another web page in many cases, it cannot be depended upon to always prevent such navigation, so the resulting URL for the tab is then examined 1463 and if it has changed then navigation back to the previous URL occurs by programmatically performing essentially the same thing as pressing the 'back' button on a browser. In some embodiments this is done in Javascript using the 'history' API. Also, after this simulated button push and possible navigation, if the selection has collapsed or is 1463 out of the viewport, then it is re-selected if necessary and scrolled (while waiting in this circumstance) back into the viewport.

If <range> is (still) obscured 1465 by something (again by using the hit test described above), then Identify 1470 the first DOM node, as <after_range_node>, which: 1. follows <range> in the DOM instance; 2. has a non-empty display area; and 3. is not behind something else. The hit test described above is used to test if it is behind something, but again the overlay and busy SVG elements are not considered obscuring even though they will appear in front of most anything since in some embodiments they have a high z-order value. See the discussion above for the previous 1450 similar process, although it is in the opposite direction.

If <after_range_node> is 1473 part of a button that is not a foreign hyperlink, then create 1475 a mouse click event and dispatch the event on the button element that comprises <after_range_node>. A foreign hyperlink button is a button that navigates to a new href (different href compared exclusive to any fragment identifiers), which in some cases can be determined by examination of an embedded 'href' attribute for the button. However, while such examination eliminates navigation to another web page in most cases, it does not always prevent such navigation, so the resulting URL for the tab is then examined 1476 and if it has changed then navigation back to the previous URL occurs programmatically essentially the same as pressing the 'back' button on a browser; which in some embodiments is performed in Javascript using the 'history' API. Also, after this button push and possible navigation, if the selection has collapsed or is 1476 out of the viewport, then it is re-selected if necessary and scrolled (while waiting in this circumstance) back into the viewport.

In multiple places 1435,1445,1465 a test is performed to determine if <range> is obscured by something, which in some embodiments is ascertained by performing a hit test as described above. If the answer is no in any of those cases then the activity illustrated by FIG. 14 jumps to this point.

Figures 16, 17:
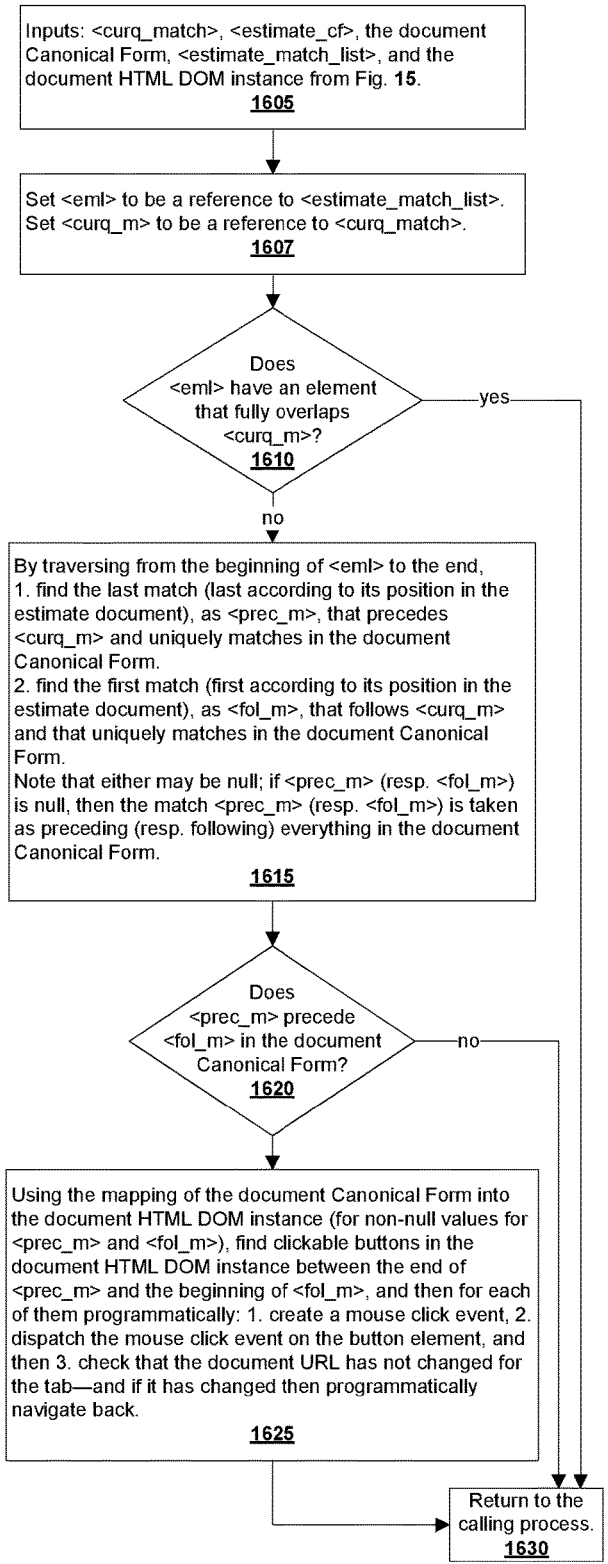
FIG. 16 illustrates identification and clicking of particular clickable buttons for the downloading and/or exposure of specifically identified content.
FIG. 17 illustrates a Scalable Vector Graphic busy indicator that is overlaid over document displays and is used via expansions, contractions, rotations, opacity settings, and translations (i.e. various motions) to dynamically indicate busy states and draw user's eyes to locations of targeted content.

Pause 1478 dynamic activity of the 'busy' SVG element; configure it to smoothly transition over a 1.5 second interval from its current position and size to directly over the first character of <range>; configure it so that during this motion it grows to its maximum size of two times its nominal size at midway, drops to ¾ of its nominal size between midway and the first character position so that just as it reaches the first character position it is ¾ of its nominal size, and at the first character position it then shrinks out of sight; then un-pause the 'busy' SVG element so that the newly configured animation executes. In some embodiments the busy SVG element form is a modified magnifying glass graphic as illustrated in FIG. 17, with the outer circle 1710 and the handle 1730 a medium gray, modified with a central bull's-eye 1720 of light blue. In some embodiments, the form of the busy SVG element is a legal trademark to ensure that end users are not confused by similar behaviors, thereby providing users with a benefit of being able to more reliably depend on expected behavior from one usage to another. Thus, in some embodiments, the icon identifying the browser itself is of this same form, appropriately sized, In some embodiments, when used as a busy indicator, the entire graphic rotates once every two seconds around the center of the bull's-eye, which is considered the position of the SVG element. In some embodiments the entire graphic expands and contracts as described to further indicate that activity is underway. The motion to the first character and then shrinking and disappearing out if sight, which visually makes it appear to shrink and disappear into the first character, beneficially draws the user's eyes to that first character regardless of other clutter that may be displayed.

In some embodiments the nominal size of the busy SVG element is 1 inch across the outside diameter of the 1710 outer circle, when displayed on a 32 inch monitor at 1280× 1024 pixels. In some embodiments, the periodic expansion and contraction are to expand to 1.5 times a current nominal size and then contract back to 1.0 times the current size at one expansion-contraction cycle per second. The current size itself expands and contracts during translational motion as described above. Until it begins to disappear out of sight over the first character, in some embodiments its opacity is set at 0.7, and as it disappears it progressively becomes more transparent. In some embodiments such smooth and simultaneous animations of the busy SVG element depends on simultaneously requested use of individual animation capabilities that are built-in to most modern browsers and that are familiar to those skilled in the art. In some embodiments, the HTML elements needed for the overlay and busy SVG element are created in Javascript programmatically as strings and then added to the HTML DOM instance of the document display. Note that HTML document DOM instances are used to display a multiplicity of document types in web browsers, so these teachings apply directly to them; for example, the pdf.js project displays pdf (Portable Document Format) documents using an HTML DOM instance. In addition, since any document format can have a DOM model applied to it, those skilled in the art will appreciate that these teachings are applicable to any document format that comprises text in any formatting language including simple text (e.g. .txt) files. This general applicability is well-known to those skilled in the art and is discussed in more detail in U.S. Pat. No. 10,430,474.

Asynchronously 1480 wait 50 milliseconds.

If the first character of <range> has 1483 moved, which is determined by comparing a prior bounding client rectangle for the first character, which was obtained when the current busy SVG element trajectory was computed, with a new bounding client rectangle obtained at the current point in time, then if necessary 1484 scroll it back into the viewport (while waiting) and then loop back to the 1478 pause and retarget activity above.

If the first character of <range> has 1483 has not moved and if the 'busy' SVG element animation has not 1485 completed, then loop back above to asynchronously wait 1480 for 50 milliseconds.

Remove 1490 the overlay element child of document.body and then return to the calling process. Note that in some embodiments and circumstances this removal leaves the document DOM instance in a state that could have been achieved by a series (perhaps of considerable length) of user GUI manipulations alone. Beneficially, this is performed rapidly and automatically; moreover, in many circumstances the user would not know and would not have the ability to identify, except by tedious trial and error experimentation, a sequence of manipulations that would be similarly beneficial.

FIG. 15 illustrates retrieval and/or exposure of previously inaccessible or un-viewable potentially matching content of a document by programmatically stimulating retrieval and/or exposure via activation of the document's own scripts. Inputs are 1505 the target search string and the document HTML DOM instance.

If scroll display has not 1507 completed for this document DOM instance, then perform 1510 the following steps in order using the document HTML DOM instance: 1. store the current scroll position of the document display; 2. make the overlay twice as opaque as normal, which is done by splitting the difference between the current opacity and 1.0; 3. programmatically scroll to the bottom of the document in order to stimulate any page scripts that might download, generate, and/or display additional content; 4. wait 500 milliseconds and, if DOM changes are ongoing, then scroll down again and wait up to 2 seconds for DOM changes to stop; 5. scroll back to the scroll position stored in step 1; 6. return the overlay element to normal opacity; 7. store that this document DOM instance has completed scroll display. The desired effect is to stimulate any document scripts that key on scroll position to download additional content that might contain matching text.

If the application (typically a browser or browser extension) is 1515 in an aggressive search mode and if aggressive display has not completed previously for this DOM instance, then 1525 search through the DOM instance for user clickable buttons, and for each such button that qualifies for being programmatically clicked by comprising text having substrings of 'more' or 'view' (in English documents, translations of 'more' and 'view' for documents presented in other languages), programmatically create a mouse clicked event, dispatch the event on that button, then ensure that the URL has not changed for the tab—and if it has changed then programmatically navigate back using the same functionality (in some embodiments) as the backward navigation button; and store that this document DOM instance has completed aggressive-display; and then if 1517 an estimate doc DOM result exists for this URL, loop back to 1520 obtain a script free estimate of the content. Ensuring that the URL has not changed is described in more detail previously and illustrated 1463 in FIG. 14. In some embodiments, buttons that first appear and become clickable during this activity, which qualify for being programmatically clicked by comprising text having substrings of 'more' or 'view', are in turn also processed as described in this paragraph. In some embodiments, storage that this document DOM instance has completed aggressive-display is done so as to be able to retrieve it with the combination of the tab identifier, the document DOM instance URL, and a random number generated for every document when it is opened and that is kept in script memory with that document instance.

The random number technique prevents a second instance of the same document from being opened and then the second document DOM instance falsely determined to have been aggressively expanded.

In some embodiments the aggressive expansion 1525 of the document programmatically presses all buttons that do not obviously cause navigation to another URI, which in some embodiments is established by the button having a 'href' attribute that comprises a URI that is different than the present URI (without comparing any fragment identifiers that may be present in either URI). In some embodiments, if pressing a button nevertheless results in another URI, then the history API is used immediately to programmatically navigate back before other buttons are pressed.

If an estimate doc DOM result does 1517 not yet exist for this URL, then 1520 attempt to obtain a script-free estimate of the complete expanded document by using the document URI (which is obtainable from the DOM instance for the document) by the following methods: 1. query the document source for the document, while identifying the user-agent in the HTTP/HTTPS request header as a web-crawler for a search indexing engine, in order to obtain a clean (i.e. script free) HTML version; 2. if so configured, query a search engine for either a clean HTML version of the document, or for a text-only as-indexed version of the document; 3. if so configured, query a URI Service server, as described in U.S. Pat. No. 10,430,474, for a full text-only version of the document; 4. in the background on the client machine, using a headless client browser (which in some embodiments is the Google chromium headless client), download the document to obtain an estimate of what a search engine would obtain to index, which is taken as an estimate of the full document content; and 5. in a hidden page on the client machine, using the current user agent, download the document as for display, scroll down for additional content, and press buttons to exercise scripts to obtain in the background an estimate of the full document content; and then store the (possibly null) estimate document DOM result so that it can be retrieved from any context using the document URI alone; and then loop back to test 1517 if an estimate doc DOM result exists for this URL.

Method 1 above is not guaranteed to work for a variety of reasons. Some document servers are not configured to respond with such a clean document, regardless of the identity of the requestor (i.e. even if it is Google making the request) and regardless of the manner of making the request; moreover, some document servers are careful to only respond to such requests from Google or from some predetermined set of web crawlers. In fact, Google provides specific guidance to developers for making such restrictions. Nevertheless, if method 1 works and if it is attempted first, then by succeeding it lowers the bandwidth load on the services for methods 2 and 3. Methods 2 and 3 are applicable only if a service has the content and is configured to respond with it; however, if the same service that produced a snippet 105,110 as illustrated in FIG. 1 is configured to respond in this way, then it could beneficially be guaranteed to have either a full HTML or at least a text version of the document that comprises the snippet in question. Method 4 should work in many cases where method 1 does not work, because the snippet identifying server must have gotten the snippet content from its own use of method 1 or in many cases where method 1 does not work then method 2; in the case of search services this reasoning would always work except that, as described, method 1 sometimes succeeds for a search service but not for anyone else. When all else fails or is inapplicable, method 5 is used. Method 5 is essentially the same as the aggressive expansion of the document illustrated 1525 in this FIG. 15 and described below, except that the exercise is hidden from the user and, as will be seen, its use has a potential of expanding the visible version of the document just enough to reveal the intended content to the user, i.e. without expanding the visible version to its maximum possible extent.

Note that any of these methods that are applicable in a particular instance can be attempted in parallel or partially in parallel. The above sequence can be attempted sequentially as presented or in parallel, depending on the capabilities of the client machine; in some embodiments the above activity is performed in parallel and all of the above methods halt when one of the above methods results in a full document content estimate.

In some embodiments, the transmission bandwidth usage from server to client (user agent) is minimized in either of methods 2 and 3 above by use of one of the deduplication technologies. In some embodiments, the deduplication technology used is that which is specified in U.S. Pat. No. 5,446,888. In some embodiments, the text of the document Canonical Form is taken as an existing version and the servers synchronize, toward the user agent, their approximation by first converting it to a Canonical Form and synchronizing according to U.S. Pat. No. 5,446,888. This obtains, at the user agent or browser, the estimate document Canonical Form, which is used further as described below. While U.S. Pat. No. 5,446,888 does not use the term "deduplication", the technology it discloses has since come to be known as a form of or application of deduplication. As used in some embodiments, the general "key defining method" recited in the claims of U.S. Pat. No. 5,446,888 is implemented here as a modified 64-bit GENERAL rolling hash function described earlier and used for various purposes in some embodiments.

Often servers are hosted in environments, like public clouds, where the cost to server operators of incoming bandwidth is zero. Thus, in some embodiments for methods 2 and 3 above, the document Canonical Form is transmitted, at zero cost in its entirety, to a server. The server uses the received document Canonical Form to populate a Limpel Ziv compression dictionary (e.g. a gzip dictionary), and then compresses its own version against the thus initialized dictionary and then transmits this conventionally compressed version to the client. Since the client already has the initial dictionary initialization data, the transmission size to the user agent is typically smaller than even the deduplication scheme above achieves. However, in this case the size of the transmission to the server is much larger. Nevertheless, because for some servers incoming bandwidth is zero cost, this method of transmission can lower the cost of operating such servers.

While the bandwidth is greater, in some embodiments the whole of the text is synchronized with the server for methods 2 and 3, rather than the Canonical Forms; when deduplication or compression is used as described in the previous two paragraphs. Pre-populating a dictionary for compression and usage of deduplication to reduce bandwidth are familiar to those skilled in the art.

If either the target search string or the estimate document DOM instance 1535 are null, and the document DOM instance has not 1540 completed aggressive display, then loop back 1525 to perform aggressive display for this document DOM instance.

If either the target search string or the estimate document DOM instance 1535 are null, and the document DOM instance has 1540 completed aggressive display; then store

1555 that this particular document DOM instance has completed this process, which is illustrated by FIG. 15, for this particular target search string; and then 1557 halt this process.

If both the target search string and the estimate document DOM instance 1535 are non-null, and if this process, which is illustrated by FIG. 15, has completed for this DOM instance and target search string, then 1557 halt this process.

From the target search string and the estimate document DOM instance, 1545 build a <doc_can_form> object, a <qual_matches> array, and a <low_qual_matches> array according to the process of FIG. 2 and set <curq_match> to be a reference to the first element of <qual_matches>.

If <curq_match> is 1550 is not defined; then store 1555 that this particular document DOM instance has completed this process, which is illustrated by FIG. 15, for this particular target search string; and then 1557 halt this process.

Build 1560 a new instance of the document Canonical Form from the (possibly dynamically changing) document HTML DOM instance and build <estimate_cf> as the Canonical Form of the text of the estimate document DOM instance.

From <estimate_cf> as the search Canonical Form, the document Canonical Form, and a length <n> of 120, build 1565 an array (called <estimate_match_list>) of elements by calling the process of FIG. 3.

From <curq_match>, <estimate_cf>, <estimate_match_list>, the document Canonical Form, and the document HTML DOM instance, expand 1570 the document HTML DOM instance according to the process of FIG. 16.

Set 1575 <curq_match> to reference the next element of <qual_matches> after the current <curq_match>; and then loop back to the check 1550 if <curq_match> is defined. Note that this paragraph loop will eventually halt because <curq_match> will eventually be null or undefined since <qual_matches> is a finite array—so eventually the next element is undefined or null.

FIG. 16 illustrates identification of and clicking of particular clickable buttons for the downloading and/or exposure of specifically identified content. Inputs 1605 are <curq_match>, <estimate_cf>, <estimate_match_list>, the document Canonical Form, and the document HTML DOM instance from FIG. 15. Recall that <estimate_match_list> is a list of matches between the document Canonical Form and the estimate document Canonical Form (<estimate_cf>).

Set 1607<eml> to be a reference to <estimate_match_list> and set <curq_m> to be a reference to <curq_match>.

If <eml> has 1610 an element that fully overlaps <curq_m> in the <estimate_cf>, then 1630 return to the calling process.

If <eml> does not have 1610 an element that fully overlaps <curq_m> in the <estimate_cf>, then by traversing 1615 from the beginning of <eml> to the end and comparing every match; 1. find the last match (last according to its position in the estimate document), as <prec_m>, that starts before <curq_m> in <estimate_cf> and that uniquely matches in the document Canonical Form; 2. find the first match (first according to its position in the estimate document), as <fol_m>, that ends after <curq_m> in <estimate_cf> and that uniquely matches in the document Canonical Form. Note that if a potential match for <prec_m> (resp. <fol_m>) is found to not be unique, which means that the same span of characters of <estimate_cf> matches elsewhere in the document Canonical Form, then that match is eliminated as a potential match for <prec_m> (resp. <fol_m>). Since non-uniqueness for textual pieces that are at least 120 characters long is expected to be either rare or contrived, for increased average efficiency in some embodiments the traversal merely discovers such non-uniqueness, marks the non-unique match as unusable, and then another full traversal is undertaken.

If <prec_m> (resp. <fol_m>) is null, which means that no match meeting the requirements was found, then the null match <prec_m> (resp. <fol_m>) is taken as preceding (resp. following) everything in the document Canonical Form.

If <prec_m> 1620 entirely precedes <fol_m> in the document Canonical Form, then using the mapping of the document Canonical Form into the document HTML DOM instance (for non-null values for <prec_m> and <fol_m>), 1625 find clickable buttons in the document HTML DOM instance between the end of <prec_m> and the beginning of <fol_m>, and then for each of them programmatically: 1. create a mouse click event, 2. dispatch the mouse click event on the button element, and then 3. check that the document URL has not changed for the tab—and if it has changed then programmatically navigate back.

Return 1630 to the calling process.

Figure 18:
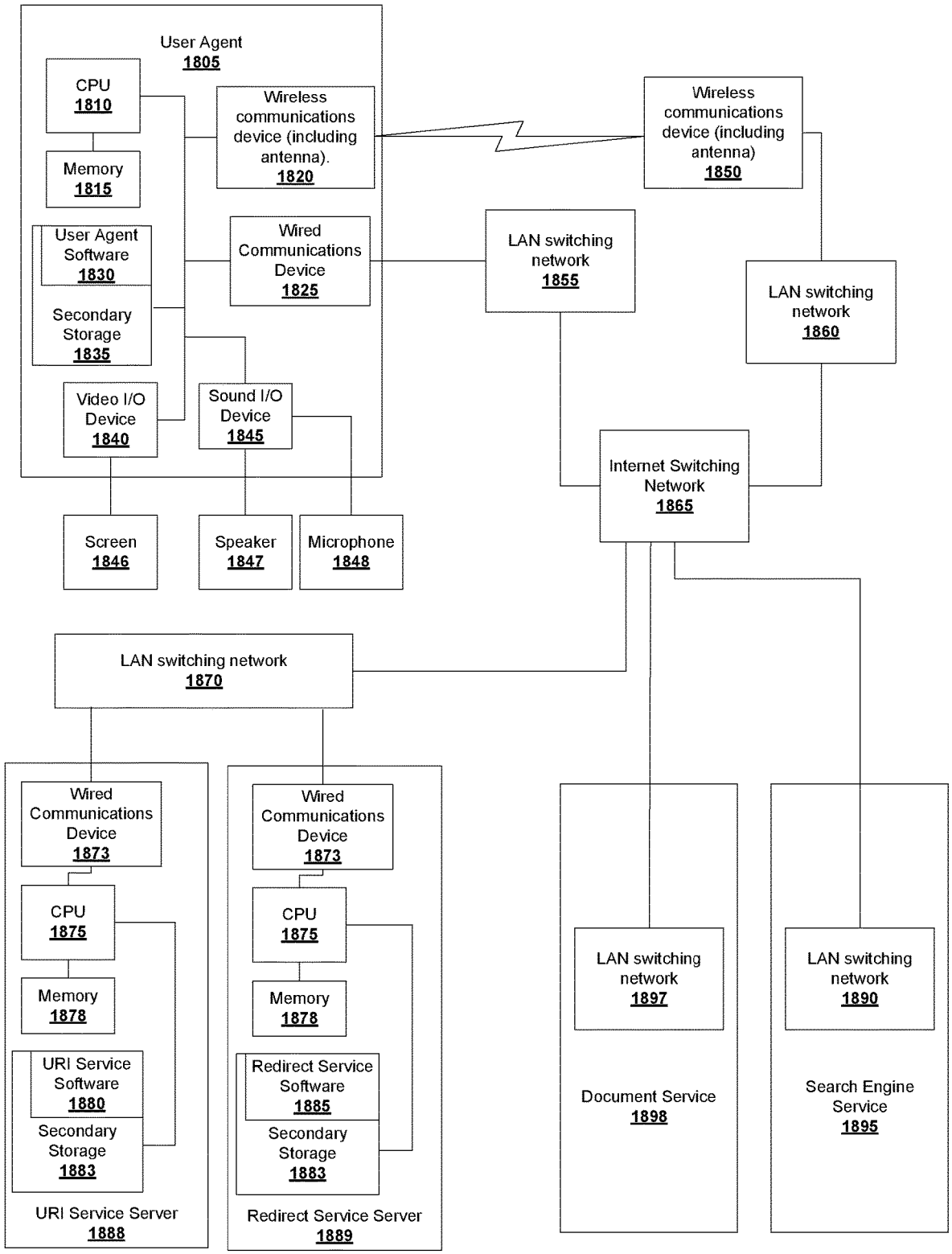
FIG. 18 illustrates a typical physical architecture for realizing embodiments, including a communications capability that enables the sending and receiving of messages between various elements of the physical architecture.

FIG. 18 illustrates a typical physical architecture for realizing embodiments and is essentially the same as in the specification for U.S. Pat. No. 10,430,474, where precision hyperlinks as mentioned 110 in FIG. 1 are described (there called e.g. indirect Fragment URIs, Fragment URIs, and version 1 indirect Fragment Hyperlinks), how they are created, and how their use can result in a need for recovery operations are documented in detail. This architecture supports those operations and recovery operations described here whereby content is located in documents that may no longer exhibit perfect matches (after canonical transforms are made on the content and targets). Embodiments include a communications capability that enables the sending and receiving of messages between various elements of the physical architecture; in some embodiments this communications capability is provided by the Internet switching network infrastructure 1865, with attached Local Area Networks (LANs) 1855,1860,1870,1890,1897. Attached to some LANs 1860 are radio transmission based (wireless) communications antenna devices 1850, that enable communications without wires between user agent wireless communication devices 1820 and the communications capability that in some embodiments (including the physical architecture illustrated in FIG. 18) comprises the Internet switching network 1865. In alternative embodiments wireless communications are used also to communicate with server devices. While this is a typical physical architecture, in other embodiments the Internet switching network is not utilized. For example, many phone companies are connected to a worldwide circuit switched network that in some circumstances can complete long distance communications independently of Internet facilities; such communications take place on what are sometimes called dial-up networks.

Major communication end-points of this example physical architecture are the user agent 1805, the URI Service server 1888, the Redirect Service server 1889, the Document Service 1898, and the search engine service 1895. In some embodiments the search engine service can be an existing search service as a beneficial element in the environment. In other embodiments the search engine service provides specific new functionality to achieve additional benefits. Both possibilities for search engine aspects of embodiments have been described in detail previously and in U.S. Pat. No. 10,430,474. In some embodiments the search engine service is combined physically with the URI Service, Redirect Service, or both; benefits of embodiments having such a combination of services are described in U.S. Pat. No. 10,430,474.

The Document Service serves out documents for display on user agents such as browsers, which are implemented on many different machine types including but not limited to: desktop computers, smart phones, tablet computers, and laptop computers. In some embodiments a Document Service performs certain functions to assist in search functionality on user agents.

There may be any number of user agents in an implementation of this physical architecture, which for illustrative purposes shows only one. User agents typically have one or more screens 1846, which are a typical means by which a user agent machine communicates visually to the user. The screen in some embodiments is used for the user to communicate to the device, typically using touch with fingers or stylus. In the illustration the screen is shown as a separate single device, but some devices have more than one screen and in some user agent devices it is typical for one or two screens to be physically integral with the rest of the device 1805. For example, a cell phone computation device typically has one or more screens that are integral with the device, and such a device may also have the ability to use a separate screen. Screens are typically controlled by a video I/O device 1840.

A speaker 1847 and microphone 1848 may be present on user agent embodiments, and may be separate (as shown) or physically integral with the user agent. In some embodiments sound devices may be used to enter or receive textual information including commands to the device; for example, by use of voice recognition and voice synthesis techniques. In some embodiments a microphone and speaker may be integrated physically into a single device or may be connected to a user agent by wires (as shown) or by wireless means; for example, Bluetooth wireless is often used for such a connection because of its low power requirements. Microphones and speakers are typically controlled by a sound input/output device 1845.

In embodiments user agents comprise a CPU (central processing unit) 1810 connected either separately (as shown) or integrally with primary memory 1815 and memory act together to provide direct control of user agent components according to a particular physical arrangement of non-volatile secondary storage 1835. While shown as a single unit, in some embodiments the user agent comprises multiple CPUs. The particular non-volatile secondary storage physical arrangement is in part set according to user agent software 1830; when non-volatile secondary storage is physically arranged according to user agent software, and the CPU or CPUs act according to that physical arrangement, the secondary storage is said to "hold" or "store" the user agent software and the CPU is said to "run" the user agent software.

The user agent communicates with other elements of embodiments through a wired communication device 1825, a wireless communication device 1820, or both. Wired communication devices in embodiments include any form of physical guide for signals that stretches from both the device and the recipient of communications. Thus embodiments may have wired devices that include devices using copper wires for electrical signals, fiber optics, or a microwave wave guide. If the devices send their signals without such a physical guide from the sender to recipient of messages, then it is said to be a wireless communication device, such signals are propagated by means that include, without limitation, radio waves, visible light, and sound.

While the servers shown 1888,1889 do not comprise wireless devices, in other embodiments the servers comprise wireless communications capabilities. Because servers are typically not mobile and wired communications are beneficially cheaper and faster to devices fixed in place, wireless communications are not shown as typical of embodiments.

A URI Service server 1888 is shown, for convenience, as a single device. However, in embodiments the service may comprise many such servers and may be distributed physically across nations, continents, or world-wide. When it is distributed widely, the service itself may be internally connected via the Internet 1865.

A Redirect Service server 1889 is shown, for convenience, as a single device. However, in embodiments the service may comprise many such servers and may be distributed physically across nations, continents, or world-wide. When it is distributed widely, the service itself may be internally connected via the Internet 1865.

The URI Service servers and Redirect Service servers are shown separate, but may operate on the same physical server devices.

In embodiments, URI Service servers and Redirect Service servers comprise a CPU (central processing unit) 1875 connected either separately or integrally with primary memory 1878, which act together to provide direct control of server components according to a particular physical arrangement of non-volatile secondary storage 1883. While shown as a single unit, in some embodiments the user agent comprises multiple CPUs and may comprise separate memory components attached to those CPUs. The particular non-volatile secondary storage physical arrangement is in part set according to URI Service software 1880 or Redirect Service software 1885; when non-volatile secondary storage is physically arranged according to such software, and the CPU or CPUs act according to that physical arrangement, the secondary storage is said to "hold" or "store" the software and the CPU is said to "run" that software.

The URI Service servers and Redirect Service servers communicate with other elements of embodiments through a wired communication device 1873 (although usually less efficient wireless devices can be used). Wired communication devices in embodiments include any form of physical guide for signals that stretches from both the device and the recipient of communications. Thus embodiments may have wired devices that include devices using copper wires for electrical signals, fiber optics, or a microwave wave guide.

Those skilled in the art will appreciate that there are many embodiments having physical realizations that differ from the example physical architecture shown, and that differ from the several alternative physical architectures explicitly described in conjunction with FIG. 18 and previously, without departing from the teachings herein.

FIG. 19 illustrates creation of search results and display of the search results as user clickable snippets. Initiating events are: when a user clicks 1905 on a fuzzy-search button or menu item, which in some embodiments is a button or menu item outside of the viewport; when the process illustrated by FIG. 1 launches 1910 this process as a default behavior 155 after failed attempts to find high quality matches in the document DOM instance; when a user 1915 presses or otherwise activates one of the first six control buttons 2235 of the control button sequence illustrated in FIG. 22, then the target search string for the active tab is set to the string value of the 2220 editable field element and the match scheme to be searched is set according to current selections in control buttons 2235; and when a user attempts 1917 to scroll beyond the last snippet 2280 that is currently displayable in a 2210 'search results element' as illustrated in FIG. 22, then set the target search string for the active tab to the string value of the 2220 editable field element and set <low_qual_count> to 20 more than any previous value of <low_qual_count> associated with 2210 the 'search results element' (which association may have occurred 1977 in this process illustrated by FIG. 19). Note that 20 is used for the new value of <low_qual_count> if there is no previous value associated with the search results element.

If there is 1920 an 'overlay' element for this document DOM instance, then it (including its children) is 1925 removed from the document DOM instance.

If there is a target search string 1930 associated with the active tab, then set <target_string> to be the target search string currently associated with the active tab; otherwise 1940 set <target_string> to be the empty string.

If there is 1943 not already a fuzzy search overlay element, then create 1945 a semi-opaque (e.g. in some embodiments with opacity of 0.4) 'div' DOM element to be a 'fuzzy search overlay' element for the entire document.body; and then create a 'search results' div' DOM element to occupy a centered rectangle of the viewport as a child of the fuzzy search overlay element, and in it display an editable field element having the <target_string> search string at the top. More details of the layout of the fuzzy search overlay element, including child and other descendant elements, is illustrated in FIG. 22. Note that this "fuzzy search overlay" and its children have higher z-order values than the 'overlay' element and its children described in FIG. 1, and in some circumstances (notwithstanding that we have here removed the overlay element) both will be displayed and viewable along with the document beneath due to partial transparency of both the overlay and fuzzy search overlay elements and their descendent elements.

Launch 1950 an 'expose additional content' process to expose additional content in the document HTML DOM instance. The 'expose additional content' process is performed while this process continues by asynchronously starting the process illustrated by FIG. 15 with inputs 1505 of <target_string> and the document HTML DOM instance.

If <target_string> is 1955 the empty string, then this process 1985 halts. Note that while this process halts, the fuzzy search overlay and its descendants remain before the user, who may e.g. enter a search string and launch a search process for that string as described below.

If <target_string> is 1955 non-empty, then from the <target_string>, the document DOM instance, and <low_qual_count> build 1960 a <doc_can_form> object, a <qual_matches> array, and a <low_qual_matches> array according to the process of FIG. 2; 1965 combine <qual_matches> and <low_qual_matches> arrays into a <target_matches> array and then sort <target_matches> according to element score with highest value first; convert 1967 the strings of <target_matches>, via the document Canonical Form and its mapping into the document HTML DOM instance, into the corresponding human readable snippets from the document HTML DOM instance, and expand the snippets to start and end with whole words; and then, in the 2210 search results element, 1970 display in-order the elements of <target_matches>, as 2280 snippets, that are 'clickable' and that can otherwise be activated (see the description for FIG. 22). Note that activating the 2280 snippets launches 115 the activity of FIG. 1 with the clicked snippet as the target search string, the current document DOM instance as the document DOM instance, and the current match scheme as the match scheme. In some embodiments, launching a search for every such selection is not performed and instead the locations of the snippets are kept in memory associated with the snippet display and re-performing the search is only done if the document snippets are not found. For example, some embodiments search in Microsoft Word documents that, unlike web documents, are not modified dynamically by arbitrary Javascript.

If the document DOM instance 1975 has not been stable since it was last checked, then 1980 wait for 2 seconds and loop back to build 1960 a new <doc_can_form> object and match arrays and continue from there. When the 1975 check for stability is first made, the check fails; thereafter, the comparison is made with the state of the document DOM instance when last checked. In some embodiments this comparison is efficiently made by keeping the length of the innerText for the document. body element; while such a comparison is imperfect, e.g. a wholesale change in the content could by chance result in the same length of displayable text, this is a reasonable optimization because content is being added in general and if the length has not changed then with high probability there is no change to the text.

If the document DOM instance 1975 has been stable since it was last checked, then 1977 set <low_qual_count> to the length of <low_qual_matches> and store <low_qual_count> in association with 2210 the 'search results element'; and this process 1985 halts.

Figure 20:
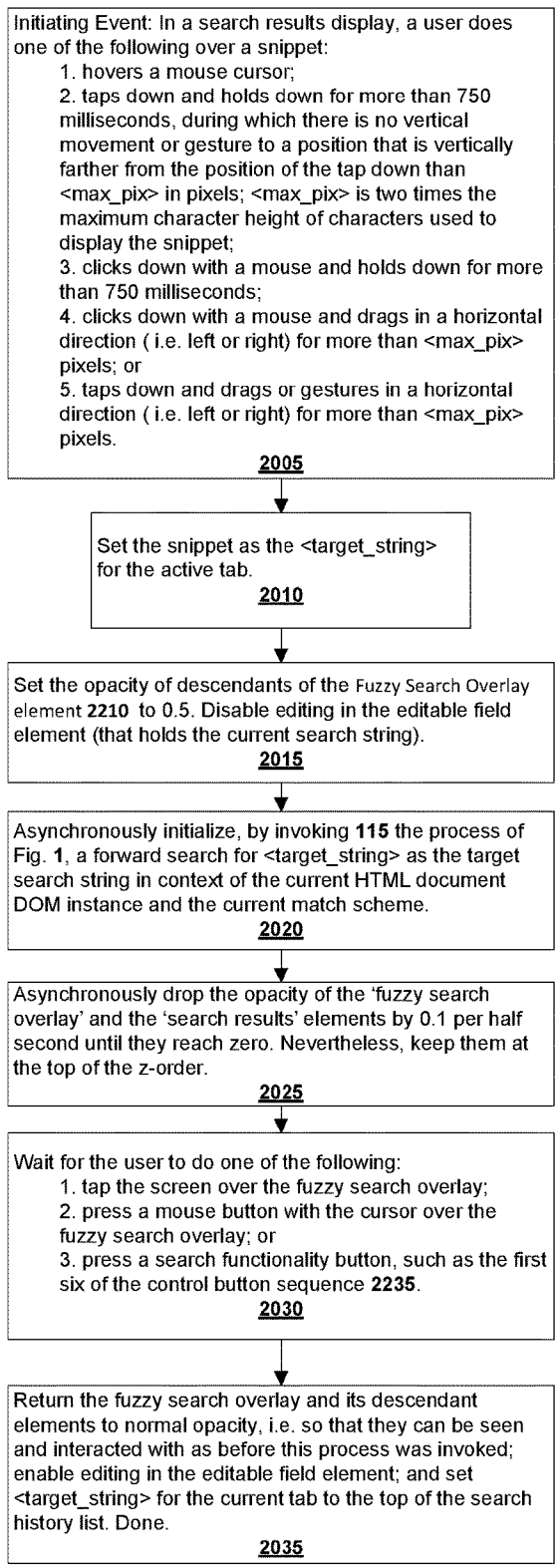
FIG. 20 illustrates tentative selection of a snippet in a search results display and effects of such tentative selection.

FIG. 20 illustrates tentative selection of a snippet in a search results display and effects of such tentative selection. Users initiate this process when, in a search results display, they 2005 do one of the following over a snippet: 1. hover a mouse cursor; 2. tap down and hold down for more than 750 milliseconds, during which there is no vertical motion or gesture to a position that is vertically farther from the position of the tap down than <max_pix> in pixels, with <max_pix> two times the maximum character height of characters used to display the snippet; 3. click down with a mouse and hold down for more than 750 milliseconds; 4. click down with a mouse and drag in a horizontal direction (i.e. left or right) for more than <max_pix> pixels; or 5. tap down and drag or gesture in a horizontal direction (i.e. left or right) for more than <max_pix> pixels.

Set 2010 the snippet as the <target_string> for the active tab. Note that this does not affect the search history list, and when this process ends the <target_string> for the active tab is set back to its previous value.

Set 2015 the opacity of descendants of the fuzzy search overlay element 2210 to 0.5 and disable editing in the editable field element (that holds the current search string). Note that, except for the Fuzzy Search Overlay element 2210 of FIG. 22 itself, which is transparent or nearly transparent, all elements of FIG. 22 are children or descendants of the fuzzy search overlay element.

Asynchronously 2020 initialize, by invoking 115 the process illustrated by FIG. 1, a forward search for <target_string> as the target search string in context of the current HTML document DOM instance. Note that the process illustrated by FIG. 1 and this process continue simultaneously; and that the 'overlay' element and 'fuzzy search overlay' element, with their descendent elements, are present simultaneously; moreover, because of partial transparency they are simultaneously viewable.

Asynchronously 2025 drop the opacity of the 'fuzzy search overlay' and the 'search results' elements by 0.1 (from a range of 0 to 1.0) per half second until they reach zero, which is fully transparent and thereby essentially invisible. Nevertheless, keep them at the top of the z-order.

In particular, because they remain present, they can capture mouse events anywhere in the viewport.

Wait 2030 for the user to do one of the following: 1. tap the screen over the fuzzy search overlay (i.e. somewhere in the viewport); 2. press a mouse button with the cursor over the fuzzy search overlay; or 3. press a search functionality button, such as one of the 2235 first 6 of the control button sequence. Note that this captures any mouse button event or tap of the screen in the viewport and any search functionality button visible. This state of waiting persists, for this tab, until such an event occurs. In some embodiments, loss of focus for the tab and then returning to focus will also end this wait state.

Return 2035 the fuzzy search overlay and the 'search results' elements to normal opacity, i.e. so that they can be seen and interacted with as before this process was invoked; enable editing in the editable field element; set <target_string> for the current tab to the string at the head of the search history list; and return to the state before this process illustrated by FIG. 20 was entered. This process ends.

Figure 21:
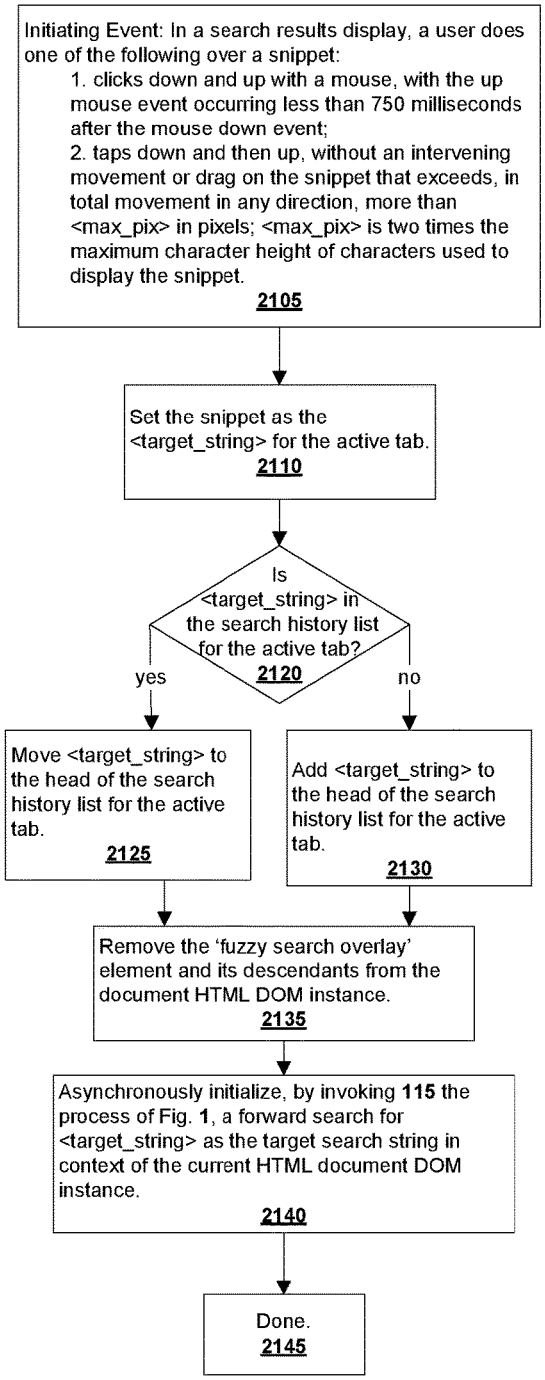
FIG. 21 illustrates definitive selection of a snippet in a search results display and effects of such definitive selection.

FIG. 21 illustrates definitive selection of a snippet in a search results display and effects of such definitive selection. Users initiate this process when, in a search results display, they 2105 do one of the following over a snippet: 1. click down and up with a mouse, with the up mouse event occurring less than 750 milliseconds after the mouse down event (i.e. a standard mouse click); or 2. tap down and then up with the release of the tap occurring less than 750 milliseconds after the tap down event; both the mouse click down and up and tap down and up must occur without an intervening motion, gesture, or drag on the snippet that exceeds, in total motion in any direction, more than <max_pix> in pixels; <max_pix> is two times the maximum character height of characters used to display the snippet. Note that intervening movements, drags, or gestures cause other activities to occur. For example, intervening vertical motion causes scrolling of the snippets.

Set 2110 the snippet as the <target_string> for the active tab.

If <target_string> is 2120 in the search history list for the active tab, then move it to the head of the search history list for the active tab; otherwise, add 2130 <target_string> to the search history list at the head of the list.

Remove 2135 the 'fuzzy search overlay' element and its descendants from the document HTML DOM instance.

Asynchronously 2140 initialize, by invoking 115 the process of FIG. 1, a forward search for <target_string> as the target search string in context of the current HTML document DOM instance.

Halt 2145 this process that is illustrated by FIG. 21.

FIG. 22 illustrates a search results display. Over the entire viewport is the 2210 'fuzzy search overlay' element, which is always at least somewhat transparent so that users beneficially see that the overlay is over the underlying display of the document DOM instance. In some embodiments, where space is at a premium like on smartphones, the space between the edge of the viewport and the edge of the 2210 'search results element' may be small or even non-existent in order to provide sufficient space for display of snippet content 2280 fields. While most of the match schemes selectable in the search results display are, formally speaking, "fuzzy match schemes" according to the definition of fuzzy match schemes, i.e. are not binary, in this example embodiment and in other embodiments binary match schemes complement, on the low end of fuzziness, the fuzzy match schemes. See the definition of "fuzziness", which applies to match schemes in general and not only fuzzy match schemes per-se.

An editable field element 2220 displays the current search string, which in some embodiments may extend beyond the boundaries and in other embodiments scrolled as it is not bounded in size. The user may edit the current search string. If a user presses any of the first six of the control button sequence 2235, then a match scheme is selected and a search is launched 1915 according to the process illustrated by FIG. 19 according to the selected match scheme.

The control button sequence 2235 works as follows from left to right. The 'C' button is for toggling case sensitivity in searches; if searches are case sensitive then an oval background of the "C" changes color to a light blue. When this button is pressed, a search according to the resulting match scheme and search string is initiated. Hovering over the 'C' button causes an explanatory tool tip to appear that briefly identifies the function of the button.

The next four buttons are a linear ordering of increasing fuzziness. Tool tips for these buttons declare the linear ordering by their hover-activated tool-tip labels that have the following sequence: "No Fuzzy (exact)", "Less Fuzzy", "Fuzzy", and "Very Fuzzy". In the fuzziness sequence 2235, only one of the fuzziness levels can be selected, which is illustrated by the single solid circle within a circle. In some embodiments, users are not, at least in the user interface, given any other indication of how these match schemes work; instead, users are encouraged to learn to use these controls on the basis of pure search strings (i.e. no metadata in the search strings) and pressing these control buttons to see either more or fewer results. The definitions of fuzzy match scheme and match scheme expansion explain and give several examples of actual fuzzy match schemes that can be used in this linear ordering of match schemes according to fuzziness.

In this example embodiment, the "No Fuzzy (exact)" match scheme requires an exact match of the search string except that it collapses white space to a single space and prevents entering two or more adjacent spaces in the search string field. In some embodiments, there is even a lower level of fuzziness that requires absolute exactness, which is more useful in word processors than for searching for information on the web. In some embodiments, users can configure to be presented with both of these binary match schemes at the low end of the fuzziness hierarchy, or either of them.

In this example embodiment, the "No Fuzzy (exact)" labeled match scheme is binary, i.e. strings either match or they do not, and the rest (in both case sensitive and case insensitive versions) are formally speaking fuzzy match schemes that map search strings and document snippets to a multiplicity of values.

All of the formally fuzzy match schemes of this example embodiment search for matches using either a Canonical Form Transform of the document and the search string or a Case Sensitive Canonical Form Transform of the document and the search string. So such transforms are an initial step in searching.

The "Less Fuzzy" match scheme requires whole word matches but the words can be in any order. Raw matches can be up to 1.25 times the length of the search string, and then whole word matches are extended in either direction to the end of matching words. The scoring scheme for the less fuzzy match is the same as for the very fuzzy match scheme, except that only whole word matches are counted.

The "Fuzzy" match scheme matches words and parts of words provided that there is a sufficiently long substring between a word in the search string and a word in the snippet being scored. Half the length of the search string is enough for prefixes and ⅝ the length is sufficient for matches that do not include a prefix of the search string word. Again, raw matches can be up to 1.25 times the length of the search string, and are extended to include matches that overlap the ends.

The "Very Fuzzy" match scheme algorithm is presented here in detail as "the" fuzzy match algorithm. It matches without regard to word boundaries so long as the matches are sufficiently long, which is a length that grows logarithmically in the length of the search string. In some embodiments, the "Very Fuzzy" match algorithm presented here is used to find best quality matches for "Very Fuzzy" and then those best "Very Fuzzy" matches are re-evaluated for the lower levels of fuzziness (except for the "No Fuzzy" match scheme, which in some embodiments uses the Boyer-Moore string search algorithm as described previously).

In some embodiments, if a user presses or otherwise activates the 2235 "L" button, which stands for in English "Low Quality Matches", then in some embodiments a new search is performed for the current match scheme and search string, from which lower quality matches are retained and displayed in the 2210 search results element even if there are ample high quality matches. Different embodiments retain different numbers of low quality matches by default in this circumstance, and in some embodiments the default number is 10. In some embodiments, if low quality matches are being displayed, an oval blue background appears around the "L" button and hovering over the "L" button causes an explanatory tool tip to appear.

In some embodiments, if a user presses or otherwise activates the 2235 "H" button, which in English stands for "search history", then the 2210 search results field has a set of historical search strings displayed from which a user may choose a different search string. If the user selects one of these search strings from this search history list, then the editable field element 2220 is set to that string value selected, essentially as if the user had entered it by making keystrokes.

In some embodiments, if a user presses or otherwise activates the 2235 "S" button, which in English stands for "search service", then a new tab is opened and populated with search results from one or more search engines using the current search string. In some embodiments, the match scheme is sent to one or more of the one or more search engines and snippets are identified in results based on the current match scheme.

A 2260 scrollbar can be used to scroll up and down the 2280 snippets. An up arrow 2250 of the scrollbar can be used to scroll the 2280 snippets up. A down arrow 2270 can be used to scroll the 2280 snippets down.

If a user attempt to scroll down is made using the scrollbar 2260, the down arrow 2270, touch screen gestures in 2210 in the 'search results element', or other techniques such as use of a mouse wheel with the cursor 2210 in the 'search results element'; but there are no snippets further down to scroll into view; then a search is launched 1917 according to the process illustrated by FIG. 19.

In some embodiments, hovering over the 2240 search icon causes a dropdown box that provides a search menu that in some embodiments includes one or more of the following items: Search the web; search the site; search in all tabs; and search the current tab. If the user presses the 'search the web' menu item, then a standard web search (e.g. a Google search page) is opened in a new tab and a search for the search string is launched. If the user presses the 'search the site' menu item, then a standard web search is opened in a new tab and a search for the search string, with the search restricted to the current document site (e.g. with the addition of 'site:facebook.com' to the query to restrict search results to URIs that comprise the domain name facebook.com), is launched. If the user presses the 'search all tabs' menu item, then a previously stored document Canonical Form for each document previously open in this application instance is searched according to the process of FIG. 2, except that it starts 210 one step into the process, and then the results are all combined and sorted according to score and displayed as snippets. In some embodiments a limit of 100 documents is kept to be searched in this way. If the user presses 'search this tab' menu item, then a previously stored document Canonical Form for each document previously open in this tab is searched according to the process of FIG. 2, except that the results are all combined and sorted according to score and displayed as snippets. Again, in some embodiments a limit of 100 documents is kept to be searched in this way for each tab.

In some embodiments, the 1895 Search Engine Service, 1898 Document Service, or the 1888 URI Service Server, serve out search assistance versions (SAV) of documents. A SAV of a document comprises text that can be displayed in that document without changing the URI (exclusive of fragment identifiers), along with information sufficient to cause the display of all such text. Some text is displayed and can be scrolled into view simply by loading the document. Some text requires actions to be downloaded and/or displayed so the user can view it. Along with the text in an SAV is a single-root DAG (directed acyclic graph) of structures that have three members, an xpath identifier of a DOM node, an action, and an identifier of its parent in the DAG. Possible actions include programmatic clicking or 'pressing' of buttons, scrolling, and hovering over elements to cause content to be displayed by scripts or CSS rules embedded with the document. Each character of the SAV text is associated with an element of the DAG; however, long contiguous sections of text are generally associated with the same DAG element as it is exceedingly unlikely for a script to be launched in a document to expose a single character or even only several characters, so in part for efficiency the association is represented by a sequence of structures, and each structure in the sequence comprises an index <index> into the text, a length <length>, and a DAG node identifier; each structure applies to the substring of characters starting at index <index> and having length <length> from the SAV text.

If a character is associated with the root node of the DAG, then no action, other than downloading and displaying the document as-delivered and possibly scrolling is necessary to display that character. For all other character-DAG associations, the path from the root node to the associated DAG node identifies actions that, when taken in sequence starting at the root of the DAG, are sufficient to display that character when starting with the as-delivered and displayed document. All document text is associated with a DAG node but not all DAG nodes are associated directly with document text because a sequence of actions may be represented by a sequence of DAG nodes in a circumstance where only completing the whole sequence actually reveals text. It is even possible that a branch in the DAG structure occurs that is not directly associated with text. Therefore, while some embodiments for efficiency compact DAGs by collapsing branchless sequences of actions that have no associated text, such compacted DAGs may still have nodes that are not directly associated with text.

Best practice when creating documents that will have a SAV is to ensure that 'hover' actions are used sparingly and apply only to leaf elements of the DAG; it is also best if all non-hover actions result in display of characters that are unaffected (in terms of whether they are displayed and viewable) by any other actions of the DAG. Sometimes this is impossible because displays may cover other displays; moreover, display of all of the text of a document is typically not possible to achieve simultaneously. The first text of a large selection is therefore displayed in such circumstances. If a snippet is found in the SAV that spans segments of text that together are associated with at most one 'hover' action, then the actions for all of those segments are executed in DAG order to display the snippet, with the 'hover' action last provided it does not interfere with displaying the first of the snippet.

If a searched snippet spans text that in total is associated with more than one leaf 'hover' action, then in some embodiments the hover action that represents the longest substring of the targeted snippet is used and the others ignored. In some embodiments, until a user takes action to stop it, when more than one 'hover' action applies then the hover actions are taken in a repeating cycle of 1.5 seconds each in order to display sequentially all of the selected content in a cyclic manner. In some embodiments such display cycles are halted by physical mouse clicks, keyboard key strokes, gestures, or voice commands on the part of users, who may choose to restart the process e.g. by clicking on a search result snippet in a full snippet eximious application.

In some embodiments, a Document Service 1898 that serves out HTML documents also serves out a SAV for the document that is embedded within the document. In some embodiments, in order to avoid negative issues with extremely long 'head' elements, a SAV for a document is in descendent elements of the 'body' element that are marked to never be displayed; in some such embodiments a SAV root HTML element is nevertheless identified by a meta-data element in the head of the document. In some embodiments, the meta-data element in the head can alternately have a URI by which the Document Service serves out a SAV for the document.

In some embodiments, on request search engines serve out SAVs for documents that they index, which in some embodiments is achieved with a search query comprising the normal URI of the document but with a distinctive HTTP header, which if not understood by the search service simply results in a query comprising the document URI. In other embodiments, a distinctive query entry in the URI itself is used to indicate that a SAV is desired, which is then may be served out by the originating document server.

In some embodiments, a Search Engine Service, a Document Service, or a URI Service server accepts the URI for a document along with a snippet and then computes, at the server, the portions of the SAV action DAG that need to be executed to display high quality matches for the snippet, and then return those portions of the computed action DAG to the user agent. The user agent then executes the actions as described above. In such embodiments the servers have reduced outgoing bandwidth but have increased computation loads. However, if the server has SAVs pre-computed, then the additional computing cost can be a fraction of the cost of the otherwise outgoing bandwidth.

In some embodiments, when a Search Engine Service returns search results with snippets, then it also returns, in association with those snippets, the portions of the SAV action DAG that are needed to display that snippet.

In some embodiments, when a Redirect Service Server redirects an indirect fragment URI (as described in U.S. Pat. No. 10,430,474) then it also returns, in association with that redirected URI, the portions of the SAV action DAG that are needed to display the targeted content. Note that most often no SAV action is needed, but if that is the case then the DAG required to be executed is simply the root, which serves to indicate that no action (other than to download and display) is needed.

ENUMERATED EMBODIMENT CLASSES

In the light of the foregoing disclosures including embodiments and embodiment classes, the following structured enumeration of embodiment classes are described. Note that numbering is in order but some consecutive sequences are skipped, i.e. there are gaps.

1. A system for displaying and reliably drawing attention to identified parts of arbitrary documents by use of in-place transitory distinguishing that stimulates automatic attention capture and stimulates involuntary neuronal interference with other image processing at no more than user-tolerable levels, the system comprising:
  one or more hardware-based processors;
  one or more hardware-based memories storing computer-executable instructions; and
  a user agent comprising one or more of the one or more hardware-based processors, one or more of the one or more hardware-based memories storing computer-executable instructions, and a screen;
  wherein:
    each member of a set of one or more documents has an in-place first transitory distinguishing property with respect to a triple that consists of the user agent, a manner of distinguishing, and a set of distinguishing inputs;
    a first identification datum is derived from a first intended snippet;
    a salient distinguishing interval is no more than four seconds in duration, starts at a starting time, and ends at an ending time;
    in response to a first one or more selection inputs to the user agent:
      a first document display of a first version of a document, which is a member of the set of one or more documents, is displayed on the screen; and
      a first distinguishing context, which has the manner of distinguishing and which has the set of distinguishing inputs, of the first document display is derived from the first identification datum and the first version of the document;
    a first set of target document snippets is non-empty and consists of all of at least partially viewable document snippets that are in-place partially distinguished in the first distinguishing context;
    a distinguishing response, which is in response to the first one or more selection inputs and zero or more inputs to the user agent that are permitted according to the set of distinguishing inputs, comprises:
      a first target snippet, which is canonically similar to the first intended snippet and a member of the first set of target document snippets, is selected;

deriving of an in-place transitory partially distinguishing of the first target snippet is performed; and a displaying of the in-place transitory partially distinguishing on the screen within the salient distinguishing interval is performed, which partially distinguishes the first target snippet at the starting time and at the ending time;

the displaying of the in-place transitory partially distinguishing contributes to an overall in-place partially distinguishing, which is an instance of the manner of distinguishing, of the first target snippet;

the visual salience of the overall in-place partially distinguishing, beginning with at least one frame displayed during the salient distinguishing interval, is greater than the visual salience of the overall in-place partially distinguishing beginning with any frame displayed during a subdued distinguishing interval that begins at the ending time, has a duration of at least 500 milliseconds, and has a duration that is no less than the duration of the salient distinguishing interval;

each member of a set of zero or more instances of in-place partially distinguishing, which includes every instance of in-place partially distinguishing of the first target snippet during the subdued distinguishing interval, is contributory to the overall in-place partially distinguishing;

the overall in-place partially distinguishing of the first target snippet is temporally the first partially distinguishing of a document snippet of the first document display that is derived from the first intended snippet;

a second identification datum is derived from a second intended snippet;

in response to a second one or more selection inputs to the user agent:
 a second document display of a second version of the document is displayed on the screen; and
 a second distinguishing context, which has the manner of distinguishing and which has the set of distinguishing inputs, of the second document display is derived from the second identification datum and the second version of the document;

a second set of target document snippets is non-empty and consists of all of at least partially viewable document snippets that are in-place partially distinguished in the second distinguishing context;

a first set of cross matching document snippets, which consists of all at least partially viewable document snippets of the second version of the document that are canonically similar to the first intended snippet, has at least one member that is textually identical to the first intended snippet and its members are undistinguished in the second distinguishing context; and a second set of cross matching document snippets, which consists of all at least partially viewable document snippets of the first version of the document that are canonically similar to the second intended snippet, has at least one member that is textually identical to the second intended snippet and its members are undistinguished in the first distinguishing context.

2. A system for displaying and reliably drawing attention to identified parts of arbitrary documents by use of in-place transitory distinguishing that stimulates automatic attention capture and stimulates involuntary neuronal interference with other image processing at no more than user-tolerable levels, the system comprising:
 one or more hardware-based processors;
 one or more hardware-based memories storing computer-executable instructions; and
 a user agent comprising one or more of the one or more hardware-based processors, one or more of the one or more hardware-based memories storing computer-executable instructions, and a screen;
 wherein:
  each member of a set of one or more documents has an in-place long transitory distinguishing property with respect to a triple that consists of the user agent, a manner of distinguishing, and a set of distinguishing inputs;
  a first identification datum is derived from a first intended snippet;
  a salient distinguishing interval is at least 150 milliseconds in duration, is no more than four seconds in duration, starts at a starting time, and ends at an ending time;
  in response to a first one or more selection inputs to the user agent:
   a first document display of a first version of a document, which is a member of the set of one or more documents, is displayed on the screen; and
   a first distinguishing context, which has the manner of distinguishing and which has the set of distinguishing inputs, of the first document display is derived from the first identification datum and the first version of the document;
  a first set of target document snippets is non-empty and consists of all of at least partially viewable document snippets that are in-place partially distinguished in the first distinguishing context;
  a distinguishing response, which is to the first one or more selection inputs and zero or more inputs to the user agent that are permitted according to the set of distinguishing inputs, comprises:
   a first target snippet, which is canonically similar to the first intended snippet and a member of the first set of target document snippets, is selected;
   deriving of an in-place transitory partially distinguishing of the first target snippet is performed; and
   a displaying of the in-place transitory partially distinguishing on the screen within the salient distinguishing interval is performed, which partially distinguishes the first target snippet at the starting time and at the ending time;
  the displaying of the in-place transitory partially distinguishing contributes to an overall in-place partially distinguishing, which is an instance of the manner of distinguishing, of the first target snippet;
  the visual salience of the overall in-place partially distinguishing, beginning with at least one frame displayed during the salient distinguishing interval, is greater than the visual salience of the overall in-place partially distinguishing beginning with any frame displayed during a subdued distinguishing interval that begins at the ending time, has a duration of at least 500 milliseconds, and has a duration that is no less than the duration of the salient distinguishing interval;
  each member of a set of zero or more instances of in-place partially distinguishing, which includes every instance of in-place partially distinguishing of the first target snippet during the subdued distinguishing interval, is contributory to the overall in-place partially distinguishing;

a second identification datum is derived from a second intended snippet;

in response to a second one or more selection inputs to the user agent:

a second document display of a second version of the document is displayed on the screen; and a second distinguishing context, which has the manner of distinguishing and which has the set of distinguishing inputs, of the second document display is derived from the second identification datum and the second version of the document;

a second set of target document snippets is non-empty and consists of all of at least partially viewable document snippets that are in-place partially distinguished in the second distinguishing context;

a first set of cross matching document snippets, which consists of all at least partially viewable document snippets of the second version of the document that are canonically similar to the first intended snippet, has at least one member that is textually identical to the first intended snippet and its members are undistinguished in the second distinguishing context; and a second set of cross matching document snippets, which consists of all at least partially viewable document snippets of the first version of the document that are canonically similar to the second intended snippet, has at least one member that is textually identical to the second intended snippet and its members are undistinguished in the first distinguishing context.

3. The system of enumerated embodiment class 1, wherein:

each member of the set of one or more documents has an in-place first motion distinguishing property with respect to the triple that consists of the user agent, the manner of distinguishing, and the set of distinguishing inputs;

the deriving of the in-place transitory partially distinguishing of the first target snippet comprises deriving of one or more added simulated motions;

the displaying of the in-place transitory partially distinguishing comprises a displaying of the one or more added simulated motions on the screen within the salient distinguishing interval, which partially distinguishes the first target snippet at the starting time and at the ending time;

the displaying of the one or more added simulated motions contributes to the overall in-place partially distinguishing of the first target snippet; and the displaying of the one or more added simulated motions, during the first one fifth of the salient distinguishing interval and during the last one fifth of the salient distinguishing interval, simulates motion that is simultaneously relative to the display screen and relative to every visible part of the document display that is defined in the first version of the document.

4. The system of enumerated embodiment class 2, wherein:

each member of the set of one or more documents has an in-place long motion distinguishing property with respect to a triple that consists of the user agent, a manner of distinguishing, and a set of distinguishing inputs;

the deriving of the in-place transitory partially distinguishing of the first target snippet comprises deriving of one or more added simulated motions;

the displaying of the in-place transitory partially distinguishing comprises a displaying of the one or more added simulated motions on the screen within the salient distinguishing interval, which partially distinguishes the first target snippet at the starting time and at the ending time;

the displaying of the one or more added simulated motions contributes to the overall in-place partially distinguishing of the first target snippet; and the displaying of the one or more added simulated motions, during the first one fifth of the salient distinguishing interval and during the last one fifth of the salient distinguishing interval, simulates motion that is simultaneously relative to the display screen and relative to every visible part of the document display that is defined in the first version of the document.

5. The system of enumerated embodiment class 3 or 4, wherein:

the one or more added simulated motions comprise a simulated shrinking motion of shrinking a distinguishing shrinking object over the first target snippet to less than ⅓ of its size; and according to the manner of distinguishing, the simulated shrinking motion of shrinking the distinguishing shrinking object over the first target snippet partially distinguishes the first target snippet.

6. The system of enumerated embodiment class 5, wherein shrinking the distinguishing shrinking object out of sight is an essential contributory manner of distinguishing to the manner of distinguishing.

7. The system of enumerated embodiment class 5 or 6, wherein the distinguishing shrinking object exhibits one or more simulated motions of rotation.

8. The system of any one of enumerated embodiment classes 4 to 7, wherein:

the one or more added simulated motions comprise one or more distinguishing translation motions such that a translation object exhibits the one or more distinguishing translation motions and thereby visibly exhibits a simulated motion toward the first target snippet;

at the beginning of the distinguishing translation motions, all parts of the object are at least 5 d from any character of the first target snippet, where d is the average height of visible characters of the first target snippet at the particular time;

according to the manner of distinguishing, the one or more distinguishing translation motions at least in part partially distinguish the first target snippet; and the distinguishing translation object is displayed prior to the first target snippet becoming visible by scrolling into view.

9. The system of enumerated embodiment class 8, wherein the first one or more simulated motions comprise simulated motions of the distinguishing translation object of a type selected from the group consisting of:

simulated rotation;

simulated expansion;

simulated contraction; and alternating simulated expansion and simulated contraction.

10. The system of any one of enumerated embodiment classes 8 or 9 and any one of enumerated embodiment classes 5 to 7, wherein the distinguishing translation object visually becomes the distinguishing shrinking object.

11. The system of any one of enumerated embodiment classes 4 to 10, wherein for the first half of the distinguishing interval the one or more added simulated motions simulate motion toward the first target snippet at a distance of more than 2 h away from any visible part of the first target snippet, where h is the average height of characters in the first target snippet.

12. The system of any one of enumerated embodiment classes 1 to 11, wherein the duration of the subdued distinguishing interval is at least 2 seconds.

13. The system of any one of enumerated embodiment classes 1 to 12, wherein the duration of the subdued distinguishing interval is at least 8 seconds.

14. The system of enumerated embodiment class 13, wherein the duration of the subdued distinguishing interval is at least 50 seconds.

15. The system of enumerated embodiment class 14, wherein the duration of the subdued distinguishing interval is at least 500 seconds.

16. The system of any one of enumerated embodiment classes 1 to 15, wherein the first version of the document and the second version of the document are identical.

17. The system of any one of enumerated embodiment classes 1 to 16, wherein:
the user agent is situated in an electronic communication network;
each member of the set of one or more documents can be accessed by the user agent by retrieval across the communication network;
the first version of the document is obtained by performing an undistinguished retrieval of the document across the communication network; and
the second version of the document is obtained by performing an undistinguished retrieval of the document across the communication network.

18. The system of enumerated embodiment class 17, wherein each member of the set of one or more documents is identified by and can be accessed across the communication network by the user agent using a member of a set of network identifiers.

19. The system of enumerated embodiment class 18, wherein:
each member of the set of network identifiers is a URL (Universal Resource Locator) that comprises one and only one DNS (Domain Name System) domain name; and
DNS domain names of members of the set of network identifiers are each unique to a single member of the set of network identifiers.

20. The system of enumerated embodiment class 21, wherein:
each member of the set of network identifiers has a DNS domain name that is registered in the DNS to an entity that is a member of a set of DNS registrant entities; and
members of the set of DNS registrant entities are each unique to a single member of the set of network identifiers.

22. The system of enumerated embodiment class 21, wherein no two members of the set of DNS registrant entities have shared ownership, directly or indirectly, of 50 percent or more.

23. The system of any one of enumerated embodiment classes 1 to 22, wherein the set of one or more documents comprises at least 2 documents.

24. The system of enumerated embodiment class 23, wherein the set of one or more documents comprises at least 10 documents.

25. The system of enumerated embodiment class 24, wherein the set of one or more documents comprises at least 100 documents.

26. The system of enumerated embodiment class 25, wherein the set of one or more documents comprises at least 1000 documents.

27. The system of enumerated embodiment class 26, wherein the set of one or more documents comprises at least 100000 documents.

28. The system of any one of enumerated embodiment classes 1 to 27, wherein the salient distinguishing interval is at least 160 milliseconds in duration.

29. The system of enumerated embodiment class 28, wherein the salient distinguishing interval is at least 300 milliseconds in duration.

30. The system of enumerated embodiment class 29, wherein the salient distinguishing interval is at least 600 milliseconds in duration.

31. The system of enumerated embodiment class 29, wherein the salient distinguishing interval is at least 1200 milliseconds in duration.

32. The system of enumerated embodiment class 31, wherein the salient distinguishing interval is at least 2400 milliseconds in duration.

33. The system of any one of enumerated embodiment classes 1 to 32, wherein:
the first identification datum is derived from a textual datum; and
the textual datum is not derived from the first version of the document.

34. The system of any one of enumerated embodiment classes 1 to 33, wherein:
the user agent further comprises an eye tracking device; and
data from the eye tracking device is used to derive the in-place transitory partially distinguishing of the first target snippet.

35. The system of enumerated embodiment class 34, wherein the data from the eye tracking device in part determines the visual salience of the overall in-place partially distinguishing during the salient distinguishing interval.

36. The system of enumerated embodiment class 34 or 35, wherein the length of the salient distinguishing interval is derived from the data from the eye tracking device.

37. The system of any one of enumerated embodiment classes 34 to 36, wherein in response to the data from the eye tracking device, the visual salience of the overall in-place partially distinguishing during the salient distinguishing interval is reduced.

38. The system of enumerated embodiment class 37, wherein:
in an eye fixation, a user's eye fixates within a distance of h of a visible part of the first target snippet, where h is the average height of visible characters in the first target snippet;
the data from the eye tracking device comprises fixation data derived from sensor data obtained during the eye fixation; and
a consequence of the fixation data, in the deriving of the in-place transitory partially distinguishing, is that the visual salience of the overall in-place partially distinguishing during the salient distinguishing interval is reduced.

39. The system of any one of enumerated embodiment classes 1 to 38, wherein:
- a search string is the first intended snippet;
- a set of snippet identification datums, each of which identifies a document snippet in the first set of target document snippets, is derived from the first identification datum and the first version of the document;
- a quality of match value for each member of the first set of target document snippets is derived; and
- the quality of match value for each member of the first set of target document snippets is a match value relative to the search string according to a particular match scheme that is selected from a set of match schemes that has at least two members.

40. The system of enumerated embodiment class 39, wherein the particular match scheme is selected automatically from the set of match schemes.

41. The system of enumerated embodiment class 39, wherein the first one or more selection inputs to the user agent comprises selection of the particular match scheme from the set of match schemes.

42. The system of enumerated embodiment class 41, wherein a set of fuzzy match schemes, which has at least two members, is a subset of the set of match schemes.

43. The system of enumerated embodiment class 42, wherein one or more fuzziness display elements indicate an order of increasing fuzziness of members of the set of fuzzy match schemes.

44. The system of enumerated embodiment class 43, wherein:
- the set of fuzzy match schemes has a distinct match property; and
- an expansion sequence of the set of fuzzy match schemes has the same order as the order of increasing fuzziness of the set of fuzzy match schemes.

45. The system of enumerated embodiment class 43 or 44, wherein at least one of the one or more fuzziness display elements is used to select the particular match scheme from the set of fuzzy match schemes.

46. The system of any one of enumerated embodiment classes 42 to 45, wherein the set of fuzzy match schemes has at least 3 members.

47. The system of enumerated embodiment class 46, wherein the set of fuzzy match schemes has at least 4 members.

48. The system of any one of enumerated embodiment classes 39 to 47, wherein the first target snippet is automatically selected from the first set of target document snippets on the basis of the quality of match value for the first target snippet.

49. The system of any one of enumerated embodiment classes 39 to 47, wherein:
- in a snippet display, the user agent displays at least part of the snippet component of the members of the first set of target document snippets; and
- the members of the first set of target document snippets are displayed, in the snippet display, in an order derived from the location in the document of at least one member of the first set of target document snippets.

50. The system of any one of enumerated embodiment classes 39 to 47, wherein:
- in a snippet display, the user agent displays at least part of the snippet component of the members of the first set of target document snippets; and
- the members of the first set of target document snippets are displayed, in the snippet display, in an order derived from the quality of match value for at least one member of the first set of target document snippets.

51. The system of enumerated embodiment class 49 or 50, wherein the first target snippet is selected by making a manual selection in the snippet display.

52. The system of enumerated embodiment class 49, 50, or 51, wherein the snippet display at least partially obscures displayed content of the document. <check specification>

53. The system of any one of enumerated embodiment classes 39 to 47, wherein the first target snippet is selected from the first set of target document snippets by:
- a selection of a next (resp. previous) direction is manually made; and
- a next (resp. previous) member of the set of target snippets is derived based on one or both of a current cursor position and an ordering of the first set of target document snippets. <check specification>

54. The system of enumerated embodiment class 53, wherein the ordering of the first set of target document snippets is derived from quality of match values for members of the first set of target document snippets.

55. The system of enumerated embodiment class 53, wherein the ordering is derived from an order of display of members of the first set of target document snippets in the first document display.

121. A system for searching, retrieving, and displaying documents, the system comprising:
- one or more hardware-based processors;
- one or more hardware-based memories storing computer-executable instructions; and
- a user agent comprising one or more of the one or more hardware-based processors, one or more of the one or more hardware-based memories storing computer-executable instructions, and a screen;
- wherein:
  - a set of match schemes has a distinct match property;
  - a set of match scheme subsets, which are disjoint subsets of the set of match schemes, has at least one member;
  - each member of the set of match scheme subsets has at least two member match schemes;
  - each member of the set of match schemes is manually selectable in a display on the screen;
  - a total ordering, which is according to relative fuzziness of member match schemes of a first member of the set of match scheme subsets, is represented in the display.

122. The system of enumerated embodiment class 121, wherein:
- a current set of document snippets is derived from a search string and one or more documents according to a current match scheme, which is a member of the set of match schemes;
- a presentation of at least one member of the current set of document snippets is displayed on the screen;
- a whole number n is no more than ten;
- step (a) below is repeated until all members of the set of match schemes have been selected at step (a); and
- (a) a set of single actions, which comprises no more than n single actions, is received as input, which collectively comprise selection of a new current match scheme from the set of match schemes, and in response:
  - deriving of a new current set of document snippets is performed using the search string and the one or more documents according to the new current match scheme; and a new presentation comprising at least one member of the new current set of document snippets is displayed on the screen.

123. The system of enumerated embodiment class 122, wherein:
the presentation of the at least one member of the current set of document snippets is a snippet eximious presentation of the at least one member of the current set of document snippets; and
the new presentation comprising the at least one member of the new current set of document snippets is a snippet eximious presentation comprising the at least one member of the new current set of document snippets.

124. The system of enumerated embodiment class 122 or 123, further comprising a service that comprises one or more of the one or more hardware-based processors and one or more of the one or more hardware-based memories storing computer-executable instructions, wherein the total ordering, according to relative fuzziness, of member match schemes of the first member of the set of match scheme subsets is indicated in one or more messages transmitted by the service.

125. The system of enumerated embodiment class 124, wherein:
one or more messages from the user agent to the service comprise a datum derived from the search string;
the one or more documents are derived at the service from a corpus of documents and the search string;
the current set of document snippets is derived at the service from the datum derived from the search string and the one or more documents; and
the deriving of the new current set of document snippets is performed at the service.

126. The system of enumerated embodiment class 124, further comprising a service that comprises one or more of the one or more hardware-based processors and one or more of the one or more hardware-based memories storing computer-executable instructions, wherein:
one or more messages from the user agent to the service comprise:
a datum derived from the search string; and
an identification of the current match scheme;
the one or more documents are derived at the service from a corpus of documents and the search string;
the current set of document snippets is derived at the service from the datum derived from the search string, the one or more documents, and the identification of the current match scheme; and
the deriving of the new current set of document snippets is performed at the service.

127. The system of enumerated embodiment class 122 or 123, wherein:
the current set of document snippets is derived at the user agent; and
the deriving of the new current set of document snippets is performed at the user agent.

128. The system of enumerated embodiment class 127, further comprising a service that comprises one or more of the one or more hardware-based processors and one or more of the one or more hardware-based memories storing computer-executable instructions, wherein:
each member of the set of match schemes is manually selectable in a service display on the screen;
the total ordering, which is according to relative fuzziness of member match schemes of the first member of the set of match scheme subsets is represented in the service display;
one or more identifiers of a service current match scheme, which is a member of the set of match schemes, is received by the service;
a service two or more documents are derived at the service from a service corpus of documents and the search string;
a service current set of document snippets is derived at the service from the search string, the service two or more documents, and at least one of the one or more identifiers of the service current match scheme;
a service presentation of at least one member of the service current set of document snippets is displayed on the screen;
step (b) below is repeated until all members of the set of match schemes have been selected at step (b); and
(b) a set of service single actions, which comprises no more than n single actions, is received as input, which collectively comprise selection of a new service current match scheme from the set of match schemes, and in response:
one or more new identifiers of a new service current match scheme, which is a member of the set of match schemes, is received by the service;
deriving of a new service two or more documents is performed at the service using the search string and the service corpus of documents;
deriving of a new service current set of document snippets is performed at the service using the search string, the new service two or more documents, and at least one of the one or more new identifiers of the new service current match scheme; and
a new service presentation comprising at least one member of the new service current set of document snippets is displayed on the screen.

129. The system of enumerated embodiment class 128, wherein:
the service current set of document snippets is derived according to the service current match scheme; and
the deriving of the new service current set of document snippets is performed according to the new service current match scheme.

130. The system of enumerated embodiment class 128 or 129, wherein:
the service two or more documents are derived from at least one of the one or more identifiers of the service current match scheme; and
the new service two or more documents is derived from at least one of the one or more new identifiers of the new service current match scheme.

131. The system of any one of the enumerated embodiment classes 122 to 130, wherein:
the deriving of the new current set of document snippets comprises:
generation of a quality of match value for the search string and each member of the new current set of document snippets according to the new current match scheme; and
selection of the new current set of document snippets from a superset of the current set of document snippets based at least in part on the quality of match value of each member of the new current set of document snippets.

132. The system of any one of enumerated embodiment classes 122 to 131, wherein the first member of the set of match scheme subsets is partially case insensitive.

133. The system of enumerated embodiment class 132, wherein:
- a partially case sensitive subset, which has at least two members, of the set of match schemes is partially case sensitive; and
- the partially case sensitive subset is disjoint from the partially case insensitive subset.

134. The system of the enumerated embodiment class 133, wherein:
- the partially case insensitive subset has at least three members; and
- the partially case sensitive subset has at least three members.

135. The system of the enumerated embodiment class 134, wherein:
- the partially case insensitive subset has at least four members; and
- the partially case sensitive subset has at least four members.

136. The system of any one of enumerated embodiment classes 122 to 135, wherein the whole number n is no more than seven.

137. The system of the enumerated embodiment class 136, wherein the whole number n is no more than five.

138. The system of the enumerated embodiment class 137, wherein the whole number n is no more than four single actions.

139. The system of the enumerated embodiment class 138, wherein the whole number n is no more than three.

140. The system of the enumerated embodiment class 139, wherein the whole number n is no more than two.

141. The system of the enumerated embodiment class 140, wherein the whole number n is no more than one.

142. The system of enumerated embodiment class 121, further comprising a service that comprises one or more of the one or more hardware-based processors and one or more of the one or more hardware-based memories storing computer-executable instructions, wherein:
- one or more identifiers of a current match scheme, which is a member of the set of match schemes, is received by the service;
- two or more documents are derived at the service from a corpus of documents and the search string;
- a current set of document snippets is derived at the service from the search string, the two or more documents, and at least one of the one or more identifiers of the current match scheme;
- a presentation of at least one member of the current set of document snippets is displayed on the screen;
- step (b) below is repeated until all members of the set of match schemes have been selected at step (b); and
- (b) a set of actions is received as input to the user agent, which collectively comprise selection of a new current match scheme from the set of match schemes, and in response:
  - one or more new identifiers of a new current match scheme, which is a member of the set of match schemes, is received by the service;
  - deriving of a new two or more documents is performed at the service using the search string and the corpus of documents;
  - deriving of a new current set of document snippets is performed at the service using the search string, the new two or more documents, and at least one of the one or more new identifiers of the new current match scheme; and
  - a new presentation comprising at least one member of the new current set of document snippets is displayed on the screen.

143. The system of enumerated embodiment class 142, wherein:
- the two or more documents are derived at the service from at least one of the one or more identifiers of the current match scheme; and
- the deriving of the new two or more documents is performed at the service using at least one of the one or more new identifiers of the new current match scheme.

144. The system of enumerated embodiment class 142 or 143, wherein:
- the presentation of the at least one member of the service current set of document snippets is a snippet eximious presentation of the at least one member of the current set of document snippets; and
- the new presentation comprising the at least one member of the new current set of document snippets is a snippet eximious presentation comprising the at least one member of the new current set of document snippets.

145. The system of any one of enumerated embodiment classes 142 to 144, wherein the total ordering, according to relative fuzziness, of member match schemes of the first member of the set of match scheme subsets is indicated in one or more messages transmitted by the service.

146. The system of enumerated embodiment class 121, wherein:
- at one or more search services collectively:
  - two or more documents are derived from the search string; and
  - a current set of document snippets is derived from the search string and the two or more documents;
- a presentation of at least one of the current set of document snippets is derived from at least one quality of match value for a member of the current set of document snippets according to a particular match scheme of the set of match schemes;
- the presentation of the current set of document snippets is displayed on the screen;

147. The system of enumerated embodiment class 146, wherein the presentation of the at least one of the current set of document snippets is derived from quality of match values for each of the current set of document snippets according to the particular match scheme.

148. The system of enumerated embodiment class 147, wherein the presentation of the at least one of the current set of document snippets comprises a reordering of the current set of document snippets.

149. The system of enumerated embodiment class 148, wherein the reordering of the at least one of the current set of document snippets is derived from inter-document search scores for the two or more documents.

150. The system of enumerated embodiment class 149, wherein:
- at least two of the two or more documents are derived from the search string by a particular search service;
- the at least two of the two or more documents are identified in a linear ordering by the particular search service;
- the inter-document search scores are derived from the linear ordering.

151. The system of any one of enumerated embodiment classes 121 to 150, wherein the display provides a written language expression of relative fuzziness between member match schemes of the first member of the set of match scheme subsets.

152. The system of enumerated embodiment class 151, wherein the display provides a written language expression of relative fuzziness between member match schemes of each member of the set of match scheme subsets.

153. The system of any one of enumerated embodiment classes 121 to 152, wherein the display represents relative fuzziness between member match schemes of the first member of the set of match scheme subsets by representing its member match schemes in a sequence of increasing or decreasing fuzziness.

154. The system of enumerated embodiment class 153, wherein the display represents relative fuzziness between member match schemes of each member of the set of match scheme subsets by representing its member match schemes sequentially according to increasing or decreasing fuzziness.

155. The system of any one of enumerated embodiment classes 121 to 154, wherein at least one member match scheme of the first member of the set of match scheme subsets is a visibly realized fuzzy match scheme.

156. The system of enumerated embodiment class 155, wherein at least two member match schemes of the first member of the set of match scheme subsets are visibly realized fuzzy match schemes.

157. The system of any one of enumerated embodiment classes 121 to 154, wherein at least one member match scheme of each member of the set of match scheme subsets is a visibly realized fuzzy match scheme.

158. The system of enumerated embodiment class 157, wherein at least two member match schemes of each member of the set of match scheme subsets are visibly realized fuzzy match schemes.

159. The system of any one of enumerated embodiment classes 121 to 158, wherein the set of match scheme subsets has at least two members.

160. The system of enumerated embodiment class 159, wherein the set of match scheme subsets has at least three members.

161. The system of any one of enumerated embodiment classes 121 to 160, wherein the first member of the set of match scheme subsets has at least three member match schemes.

162. The system of enumerated embodiment class 161, wherein the first member of the set of match scheme subsets has at least four member match schemes.

163. The system of any one of enumerated embodiment classes 121 to 160, wherein each member of the set of match scheme subsets has at least three member match schemes.

164. The system of enumerated embodiment class 163, wherein each member of the set of match scheme subsets has at least four member match schemes.

165. The system of any one of enumerated embodiment classes 121 to 164, wherein the total ordering according to relative fuzziness of the first member of the set of match scheme subsets is the same as the order of an expansion sequence of member match schemes of the first member of the set of match scheme subsets.

166. The system of enumerated embodiment class 165, wherein for each member of the set of match scheme subsets:
the display represents a total ordering according to relative fuzziness between member match schemes of the member of the set of match scheme subsets; and
the total ordering according to relative fuzziness is the same order as the order of an expansion sequence of member match schemes of the member of the set of match scheme subsets.

167. The system of any one of the enumerated embodiment classes 122 to 166, wherein the search string is a pure search string with respect to each match scheme of the set of match schemes.

251. A system for searching, retrieving, and displaying documents, the system comprising:
one or more hardware-based processors;
one or more hardware-based memories storing computer-executable instructions; and
a user agent comprising one or more of the one or more hardware-based processors, one or more of the one or more hardware-based memories storing computer-executable instructions, and a screen;
wherein:
each member of a set of match schemes is manually selectable in a display on the screen;
the set of match schemes has a distinct match property;
at least one of the set of match schemes is a visibly realized fuzzy match scheme;
at the user agent, a current set of document snippets is derived from a search string and a document according to a current match scheme, which is a member of the set of match schemes;
a presentation of at least one member of the current set of document snippets is displayed on the screen;
a whole number n is no more than ten;
step (a) below is repeated until all members of the set of match schemes have been selected at step (a); and
(a) a set of single actions, which comprises no more than n single actions, is received as input, which collectively comprise selection of a new current match scheme from the set of match schemes, and in response:
deriving of a new current set of document snippets is performed at the user agent using the search string and the document according to the new current match scheme; and
a new presentation comprising at least one member of the new current set of document snippets is displayed on the screen.

252. The system of enumerated embodiment class 251, wherein:
the presentation of the at least one member of the current set of document snippets is a snippet eximious presentation of the at least one member of the current set of document snippets; and
the new presentation comprising the at least one member of the new current set of document snippets is a snippet eximious presentation comprising the at least one member of the new current set of document snippets.

252. The system of enumerated embodiment class 251, wherein the whole number n is no more than seven.

253. The system of the enumerated embodiment class 252, wherein the whole number n is no more than five.

254. The system of the enumerated embodiment class 253, wherein the whole number n is no more than four single actions.

255. The system of the enumerated embodiment class 254, wherein the whole number n is no more than three.

256. The system of the enumerated embodiment class 255, wherein the whole number n is no more than two.

257. The system of the enumerated embodiment class 256, wherein the whole number n is no more than one.

258. The system of any one of the enumerated embodiment classes 251 to 257, wherein at least two of the set of match schemes are visibly realized fuzzy match scheme.

259. The system of the enumerated embodiment class 258, wherein at least three of the set of match schemes are visibly realized fuzzy match schemes.

260. The system of the enumerated embodiment class 259, wherein at least four of the set of match schemes are visibly realized fuzzy match schemes.

261. The system of the enumerated embodiment class 260, wherein at least eight of the set of match schemes are visibly realized fuzzy match schemes.

301. A system for displaying documents, the system comprising:
one or more hardware-based processors; and
one or more hardware-based memories storing computer-executable instructions;
a user agent comprising one or more of the one or more hardware-based processors, one or more of the one or more hardware-based memories storing computer-executable instructions, a screen, and an eye tracking device;
wherein:
in a partially distinguishing of a document snippet, the document snippet is partially distinguished in a display of the document on the screen; and
the partially distinguishing of the document snippet is derived from data obtained from the eye tracking device.

302. The system of enumerated embodiment class 301, wherein:
a detecting that an eye of a user has fixated on a visible part of the document snippet is derived from the data obtained from the eye tracking device;
in response to the detecting, the partially distinguishing of the document snippet is modified such that its visual salience is reduced or eliminated.

303. The system of enumerated embodiment class 301 or 302, wherein the eye tracking device comprises a remote camera of a type from the group consisting of: a built-in laptop webcam; a webcam built into a monitor; a stand-alone webcam; and an infrared camera.

304. The system of enumerated embodiment class 301 or 302, wherein the eye tracking device is mounted on a user's head.

401. A system for displaying documents, the system comprising:
one or more hardware-based processors; and
one or more hardware-based memories storing computer-executable instructions;
a user agent comprising one or more of the one or more hardware-based processors, one or more of the one or more hardware-based memories storing computer-executable instructions, and a screen;
wherein:
an identified text snippet is represented in a data structure;
a particular sequence of one or more actions is derived from the identified text snippet and the data structure;
in a display of a document, the user agent executes the sequence of actions;
in response to the executing of the particular sequence of actions, a document snippet that was not viewable in the display of the document becomes viewable in the display of the document;
the snippet component of the document snippet canonically similar to the identified text snippet.

402. The system of enumerated embodiment class 401, wherein the document snippet is automatically scrolled into view in the viewport of the display of the document.

403. The system of enumerated embodiment class 401 or 402, wherein the document snippet is automatically in-place partially distinguished.

404. The system of any one of enumerated embodiment classes 401 to 403, wherein the identified text snippet is derived from a search string and the data structure.

405. The system of any one of enumerated embodiment classes 401 to 403, wherein the identified text snippet is derived from one or more hash values and the data structure.

406. The system of enumerated embodiment class 404, wherein the document snippet is derived from the search string and the document.

407. The system of enumerated embodiment class 405, wherein the document snippet is derived from the one or more hash values and the document.

408. The system of any one of enumerated embodiment classes 401 to 405, wherein the document snippet is derived from the identified text snippet and the document.

409. The system of any one of enumerated embodiment classes 401 to 408, wherein:
the data structure comprises:
one or more action sequences; and
one or more character sequences;
the identified text snippet is comprised by the one or more character sequences;
at least one character of the identified text field is mapped, in the data structure, to the particular sequence of one or more actions.

410. The system of enumerated embodiment class 409, wherein:
the data structure comprises:
a directed acyclic graph of nodes, each of which is associated with a specific action except for a root node; and
a mapping from characters in the one or more character sequences to nodes of the directed acyclic graph;
each node of the directed acyclic graph has a pointer to its parent, except for the root node;
the at least one character of the identified text field is mapped to a particular node of the directed acyclic graph;
a sequence of associated actions, which is a reversed sequence of associated specific actions of nodes on the directed path from the particular node to the root node, is the particular sequence of one or more actions.

411. The system of any one of enumerated embodiment classes 401 to 410, wherein:
the particular sequence of one or more actions are programmatic equivalents of a particular sequence of user actions; and
the particular sequence of user actions, when taken in a context of the document display, causes the document snippet to become viewable in the display of the document.

412. The system of any one of enumerated embodiment classes 401 to 411, wherein:
the document, which is encoded in a variant of HTML, is at the user agent by an undistinguished retrieval of the document across the Internet;
the particular sequence of one or more actions are programmatic equivalents of a particular sequence of user actions;

the particular sequence of user actions, when taken in a context of the document display, causes the document snippet to become viewable in the display of the document.

Definitions

Canonical Form Transform: The Canonical Form Transform of a string can be obtained using the following definite procedure:
1. Transform the text using full case folding, which is a mapping described by the Unicode Consortium as part of the Unicode Standard version 6.2.0, available in machine and human readable form in the document Public/UNIDATA/CaseFolding.txt, found on the Unicode.org web site. This expands some ligatures and ligature-like forms, and converts all characters that have case to lower case.
2. Transform the output of step 1 to the standard NFKD (Normalized Form Compatibility Decomposition) form, as described in the Unicode consortium's "Unicode Standard Annex #15: Unicode Normalization Forms", found in the document reports/tr15, on the Unicode.org web site. This is the standard normalization procedure that expands Unicode ligatures and decomposes various complex characters to their base characters followed by combining characters. It does not convert to lower case, which was done in step 1.
3. The non-starters (also called combining characters by the Unicode Consortium) are removed. These include the combining forms for diacritical marks, all of which were separated out in step 2. The combining characters that are removed are those that are marked "COMBINING" in the Unicode Consortium file found in the document Public/UNIDATA/UnicodeData.txt on the Unicode.org web site.
4. Whitespace and punctuation characters are removed. Specifically, the following Unicode code units and code unit ranges are removed from the sequence: \u0000-\u002f, \u003a-\u0040, \u005b-\u0060, \u007b-\u00bf, \u00d7, \u00f7, \u055a, \u1680, \u180e, \u2000-\u206f, \u2420, \u2422, \u2423, \u3000, \u301c, \u3030, \ufe58, \ufe63, \ufeff, \uff0d, \ufff0-\uffff.

A string is in Canonical Transform Form if the string and a Canonical Form Transform of the string are the same string. Those skilled in the art will appreciate that the same transformation may be achieved by different rules applied in a different order, and also that many different transformations will provide similarly useful results.

Case Sensitive Canonical Form Transform: The Case Sensitive Canonical Form Transform of a string can be obtained by performing the steps of the Canonical Form Transform but with step 1, which is the step of full case folding, removed and not performed.

Canonical Form Transform with Words: The Canonical Form Transform with Words of a string can be obtained using the following definite procedure:
Steps 1. to 3. are identical to the Canonical Form Transform defined above.
4. Contiguous sequences of one or more of the whitespace and punctuation characters that are removed for the Canonical Form Transform above are instead collapsed to a single character that is set to be a standard space (i.e., Unicode \u0020) character, which preserves word boundaries while providing a punctuation-free normal form.

Specifically, sequences of one or more characters of the following Unicode code units and code unit ranges are replaced with a single \u0020 Unicode code unit: \u0000-\u002f, \u003a-\u0040, \u005b-\u0060, \u007b-\u00bf, \u00d7, \u00f7, \u055a, \u1680, \u180e, \u2000-\u206f, \u2420, \u2422, \u2423, \u3000, \u301c, \u3030, \ufe58, \ufe63, \ufeff, \uff0d, \ufff0-\uffff.

Case Sensitive Canonical Form Transform with Words: The Case Sensitive Canonical Form Transform with Words of a string can be obtained by performing the steps of the Canonical Form Transform with Words but with step 1, which is the step of full case folding, removed and not performed.

Canonical Transform with Words form: The statement that a string is in Canonical Transform with Words Form means that the string and a Canonical Form Transform with Words of the string are the same string. The statement that a document snippet is in Canonical Transform with Words Form means that the snippet component of the document snippet is in Canonical Transform with Words Form. The statement that a document is in Canonical Transform with Words Form means that every document snippet of the document is in Canonical Transform with Words Form.

match scheme: A match scheme $\alpha$ is a mapping between a set $S_\alpha$ of ordered pairs, each of which consists of a search string and a document snippet, to a partially ordered set $(Q_\alpha, \leq)$ of quality-of-match values such that $Q_a$ has at least two members; the relationship $\alpha(\theta,\lambda)=k$ can be written as follows: k is the quality of match value for A relative to the search string $\theta$ according to the match scheme $\alpha$. The phrase "searching for a search string in a document according to a match scheme" means performing a computation that comprises a computational evaluation of the match value of at least two snippets of the document relative to the search string according to the match scheme. Whenever a function is provided for a match scheme $\alpha$ that is undefined for a particular search string $\theta$ and a document snippet $\lambda$, then $Q_\alpha$ is expanded by definition to have the special value "undefined" and $\alpha(\theta,\lambda)$ has the value "undefined". If "undefined" is a value of $Q_\alpha$, then for every value k of $Q_\alpha$, "undefined" k. The statement that $\alpha(\theta,\lambda)$ is defined means that $\alpha(\theta,\lambda)$ is not "undefined". The binary statement that a document snippet $\lambda$ matches a search string $\theta$, or that the search string $\theta$ matches the document snippet $\lambda$, according to a match scheme $\alpha$, which maps document snippets and search strings to the partially ordered set $(Q_\alpha, \leq)$, means that there is a value k of $Q_\alpha$ such that k is distinct from $\alpha(\theta,\lambda)$ and $k \leq \alpha(\theta,\lambda)$.

This paragraph is not part of the definition and is provided only to assist readers to understand aspects of the definition. A simple example with only two elements in the partially ordered set (but where document context matters) is a match scheme whereby only whole words are allowed to match; the partially ordered set is ({"no-match", "match"},≤), and "no-match"≤"match"; in such a match scheme no part of a document snippet with a snippet component of "cars" matches the search string "car" and no part of a document snippet with a snippet component of "indestructible" matches the search string "destructible". A document snippet matches a search string, and the search string matches the document snippet according to a match scheme if the match scheme scores the similarity between the search string and the document snippet at some value greater than the minimum score possible for the match scheme.

fuzzy match scheme: The statement that a match scheme $\alpha$, which maps a set $S_\alpha$ to $(Q_\alpha, \leq)$, is a fuzzy match scheme means that there is a search string $\theta$ and a document comprising non-overlapping target document snippets $\lambda_1$, $\lambda_2$, and $\lambda_3$ such that:

the snippet components of $\lambda_1$, $\lambda_2$, and $\lambda_3$ are distinct text strings;

$(\theta,\lambda_1)$, $(\theta,\lambda_2)$, and $(\theta,\lambda_3)$ are members of $S_\alpha$ that are mapped by a to distinct values of $Q_\alpha$; and $\alpha(\theta,\lambda_1) \leq \alpha(\theta,\lambda_2) \leq \alpha(\theta,\lambda_3)$.

This paragraph is not part of the definition and is provided only to assist readers to understand aspects of the definition. The above definition says that a match scheme is a fuzzy match scheme if there is a search string and three document snippets, which are of the same document and no two of which match exactly in their snippet component, such that the three document snippets have distinct and comparable quality of match values relative to the search string. Note that the value of $\alpha(\theta,\lambda_1)$ in the definition could be "undefined", but the other two cannot. Consider for example a circumstance where snippets of a document that perfectly match a search string get a quality of match value (say 100), some of the document snippets are unrelated at all to the search string and get a quality of match value (say 0); if a somewhat related snippet of the document gets a quality of match value that is greater than 0 (say 37), then the match scheme is a fuzzy match scheme. Examples include the Levenshtein distance measure, weighted Levenshtein distance measures, and various other distance measures of differences between strings in which a perfect match is indicated by a value of 0 and less than perfect matches get match values greater than 0; these schemes typically map to totally ordered number sets of non-negative real or whole numbers where the partial ordering relation $\leq$ is the common numerical greater than or equal to relation $\geq$, in which lower match values indicate a better match.

visibly realized: The statement that a fuzzy match scheme $\alpha$, which maps a set $S_\alpha$ to $(Q_\alpha, \leq)$, is visibly realized by an application or a user agent means that there is a search string $\theta$ and a document comprising non-overlapping target document snippets $\lambda_1$, $\lambda_2$, and $\lambda_3$ such that:

the snippet components of $\lambda_1$, $\lambda_2$, and $\lambda_3$ are distinct text strings;

the location of $\lambda_3$ is after the location of $\lambda_2$ in the document;

$(\theta,\lambda_1)$, $(\theta,\lambda_2)$, and $(\theta,\lambda_3)$ are members of $S_\alpha$ that are mapped by a to distinct values of $Q_\alpha$;

$\alpha(\theta,\lambda_1)$ $\alpha(\theta,\lambda_2)$ $\alpha(\theta,\lambda_3)$; and in response to inputs wherein a search in the document is requested for the search string $\theta$ according to the fuzzy match scheme:

the application or the user agent displays $\lambda_2$ and $\lambda_3$ as results of the search; and it is discernable, from the manner in which the application or the user agent visibly sets $\lambda_2$ and $\lambda_3$ apart and without manual examination or interpretation of the snippet components of either $\lambda_2$ or $\lambda_3$, that $\alpha(\theta,\lambda_2)$ $\alpha(\theta,\lambda_3)$.

This paragraph is not part of the definition and is provided only to assist readers to understand aspects of the definition. Regardless of how a match scheme may be computed internally, which might include some kind of multi-valued distance measure like a Levenshtein distance evaluation, the results may in the end be binary and not multi-valued. For example, if there were a Levenshtein distance threshold for word matches of 3 when compared words are longer than 5 characters, then the effectively used result can nevertheless be simply binary, i.e. that it matches or it does not, even though internally the computation of the Levenshtein distance for such word matches could have values from 0 to 3. Regardless of how computed internally, because its use is binary this example is not a fuzzy match scheme; nevertheless, to avoid any possible doubt or confusion e.g. over any such match schemes that feasibly may only have multi-valued internal implementations, this definition of "visibly realized" is provided and used in circumstances wherein the additional clarity of such avoidance seems prudent. The definitional phrase "the manner in which the application or the user agent visibly sets $\lambda_2$ and $\lambda_3$ apart" can apply to any visible manner of showing a qualitative difference between the two snippets; for example, some embodiments provide such differences by one or more of:

by placing $\lambda_3$ before $\lambda_2$ in a display that is ordered by quality of match values;

by presenting quality of match values in association with a display of $\lambda_2$ and $\lambda_3$;

by rendering the text of high-quality matches, where $\lambda_3$ has a quality of match value above a predetermined threshold and $\lambda_2$ does not, in a different color;

by rendering $\lambda_3$, provided it has the highest quality match value of snippets in the document, in a different color than $\lambda_2$; and by automatically distinguishing $\lambda_3$ in context of the document after a search, provided it has the highest quality match value of snippets in the document.

match scheme term search string metadata: The statement that a search string $\theta$ comprises search string metadata with respect to a match scheme $\alpha$ means that the search string $\theta$ comprises characters that are not matches by the match scheme but nevertheless affect whether or how the match scheme $\alpha$ evaluates matches of other characters of the search string $\theta$.

This paragraph is not part of the definition and is provided only to assist readers to understand aspects of the definition. The above definition says that search string metadata are characters in a search string that cause the matching function to alter how or whether the matching function matches other characters of the search string. Such search string metadata is not itself matched in any way but is instead interpreted by a matching function, according to a match scheme, in such a manner as to affect how the matching function matches other characters of the search string. For example, the search string "abrupt AND termination" could be interpreted by a first match scheme to search in documents for only the literal string "abrupt AND termination"; while a second match scheme could match any sentence containing both the terms "abrupt" and "termination", and thus the search string according to the second match scheme would match "Perform an abrupt termination.", "Abrupt application of termination instructions is avoided.", and many other sentences in searched documents. The second match scheme, with the search string "abrupt termination", could match only exactly matching strings—identically to the first match scheme. There are many other examples of search string metadata possible, prominently the "OR" operator for terms whereby either term of "abrupt OR termination" will match. A match scheme could allow designation of Levenshtein (or edit) distance for individual terms of a search string, e.g. a search string of "abrupt:2 termination:3" could indicate to the second match scheme that terms with a Levenshtein distance of up to 2 from "abrupt" and up to 3 from "termination" will match; in which case the strings "abrupt termination", "abruptly terminate", and many others will match. However, in the first match scheme it could be that only the exact literal string "abrupt:2 termination:3" would match. Notice that if characters of a search string are interpreted as metadata, according to a match scheme, then they only affect how other characters and terms are matched by the match scheme and are not matched themselves with characters in the document. Please note that notwithstanding the Levenshtein distance parameters, the second match scheme described in this paragraph need not be a fuzzy match scheme since, as the second match scheme was described, all possible document snippets either match or do not match.

pure search string: The statement that a search string $\theta$ is a pure search string with respect to a match scheme $\alpha$ means that the search string $\theta$ has no search string metadata with respect to the match scheme $\alpha$ and $\theta$ has at least one character (i.e. $\theta$ is not a zero-length string).

Unicode full character: A Unicode full character is a sequence comprising a non-combining Unicode character followed by zero or more combining Unicode characters. The specific Unicode encoding can be any of the standard Unicode encodings, e.g. little-endian UTF16.

word-forming-character: A Unicode full character is a word-forming-character if the Unicode full character represents a word, a visible character of a word, or a numeral (also called a digit) in a language script. An equivalent of a Unicode full character that is a word-forming-character is also a word-forming-character. For example, the Unicode full character Latin "a" and its equivalents in various encodings is a word-forming-character since it is a character of words in English and many other European languages.

word-oblivious-character: A Unicode full character is a word-oblivious-character if the Unicode full character is neither a word-forming-character nor does it break a sequence of word-forming-characters into separate words; for example, some Unicode characters are rendering directives that can direct how display software should render parts of a word; for example, there is a Unicode character that is a directive to begin display of a part of a word (such as a subsequence of Arabic numerals in a product model "number") in a left to right format while rendering a normally right to left language script such a Hebrew. Note that such word-oblivious-characters are explicitly removed in the Canonical Form Transform and related transforms in order to thus ignore them in subsequently used algorithms; also, for clarity of presentation, they are ignored as if they do not exist (or are separately removed) in the descriptions. Note that such characters are only rarely used and the Unicode consortium attempts to make any necessity to use them uncommon. For purposes of identifying word boundaries and comparing character sequences they are ignored; for example, two word-forming-character sequences match exactly even if one has a word-oblivious-character within it and the other does not.

equivalent character: The statement that a first Unicode full character is an equivalent character to a second Unicode full character means that the first character and the second character have identical Unicode NFKD (Normalized Form Compatibility Decomposition) UTF32 encodings. A character of a non-Unicode encoding, which has a standard translation to Unicode encoded characters, is an equivalent character to the Unicode full character to which the standard translates it, and it is transitively an equivalent character to any other character that is equivalent according to the NFKD decomposition as described above. A set of one or more characters are equivalents of a particular Unicode full character if each of the set of one or more characters is an equivalent character to the particular Unicode full character.

equivalent character sequence: The statement that a first character sequence is an equivalent character sequence to a second character sequence means that, after removal of any word-oblivious-characters from both sequences, the two sequences are the same length in Unicode full characters or equivalents, and that positionally corresponding characters of the two sequences are equivalent characters.

snippet eximious presentation: A snippet eximious presentation of a document snippet is one of:
1. a visible display of and partial distinguishing of at least part of the document snippet in a document display of the document component of the document snippet; or
2. an activatable visible display of a substring of the snippet component of the document snippet in an external or added display, which is external to or added to a normal display of the document component of the document snippet, such that activating the activatable visible display of the substring of the snippet component results in a visible display of at least part of the document snippet and partial distinguishing of the document snippet in the document display.

For example, in some embodiments a set of snippet components of document snippets of a document are displayed in an overlay that is added to an otherwise normal display of the document; then, in response to hovering a mouse cursor over an icon adjacent to one of the separately displayed snippet components of a particular document snippet, the overlay disappears while the particular document snippet in the document display is scrolled into view and distinguished by highlighting and added motions. Both the distinguishing and the display of the snippet components in an added overlay are snippet eximious presentations of the particular document snippet. In some embodiments, after the distinguishing described above, if the user moves the mouse cursor away from the previous location (on the screen) of the hovered-over icon, then the overlay reappears with the separately displayed snippet components; thus, in some embodiments a user can, by simple mouse movements alone (e.g., without clicking) switch back and forth repeatedly between the two forms of snippet eximious presentation.

full snippet eximious application: A full snippet eximious application is an application or user agent that provides both forms of snippet eximious presentations in response to searches.

clean word match: The statement that a document snippet $\mu$ is a clean word match of a document snippet $\lambda$ relative to a search string $\theta$ and a match scheme $\alpha$ means that:
  $\mu$ is a document sub snippet of a document snippet comprising only a single word;
  $\mu$ is a document sub snippet of the document snippet $\lambda$;

there is a substring v of a single word of the search string θ and a string v such that:

v comprises no search string metadata;

the length in characters of both v and v is the same;

zero or more changes of individual character case in v results in an equivalent character sequence to the snippet component of μ;

replacing the snippet component of μ with the character string of v does not affect the value of α(θ,λ);

a document snippet λ is the document snippet λ with the snippet component of μ replaced with v';

α(θ, λ') is distinct from α(θ,λ) and α(θ, λ') α(θ,λ);

a search string θ' is the search string θ with the substring v replaced with v'; and α(θ',λ') is the same value as α(θ,λ).

This and subsequent paragraphs are not part of the definition and are provided only to assist readers to understand aspects of the definition. This definition is about isolating, from a search according to a match scheme, a direct match of a sequence of characters between the search string and a document snippet that occur within a single word both in the search string and in the document snippet. This isolation allows to talk about such matches by invoking the phrase "clean word match" even in the presence of matching that is not exact and that may arbitrarily allow for matching of words between a search string word and document words that have some nonzero Levenshtein distance between them. Note that if a Levenshtein distance between two words is small enough relative to the length of the words and the words are long enough, then there must be some common substring of the two words that is a "clean word match". Again, this definition is about capturing a way to succinctly talk about such "clean word matches".

The definition essentially says that a part of a single word in a document snippet is a clean word match in a search string if, after character case changes, it matches exactly to a part of a single word in the search string. However, this is not quite enough because such an exact match could nevertheless be incidental to the quality of match value of the match scheme for the search string and document snippet; thus, the definition also requires that changing the exact match on the document side can reduce the resulting quality of match value and that then making the same change on the search string side restores the quality of match value. This then unambiguously ensures that the clean word match between the document and search string also in fact affects the quality of match value of the containing document snippet.

partially case insensitive match scheme: The statement that a match scheme α, which maps a set $S_\alpha$ to ($Q_\alpha$, is partially case insensitive or is a partially case insensitive match scheme means that there is a search string θ, which is a pure search string relative to α, a document d comprising a document snippet $\lambda_1$, and a document d' comprising a document snippet $\lambda_2$ such that:

the snippet component of $\lambda_1$ is θ, the snippet component of $\lambda_2$ is modified from θ by changing the case of one or more characters of 0, document d' is document d with document snippet $\lambda_1$ replaced with document snippet $\lambda_2$;

α(θ,$\lambda_2$) is the same value of ($Q_\alpha$,≤) as α(θ,$\lambda_1$);

for some document snippet $\lambda_3$:

α(θ,$\lambda_3$) is distinct from α(θ,$\lambda_1$); and

α(θ,$\lambda_3$) α(θ,$\lambda_1$); and no document exists having a document snippet $\lambda_4$ such that:

α(θ,$\lambda_4$) is distinct from α(θ,$\lambda_1$); and

α(θ,$\lambda_1$)≤α(θ,$\lambda_4$).

A set of match schemes is partially case insensitive if each match scheme of the set of match schemes is a partially case insensitive match scheme.

This and subsequent paragraphs are not part of the definition and are provided only to assist readers to understand aspects of the definition. This definition says that a match scheme is partially case insensitive if there is a pure search string (i.e. a search string with no search string metadata) and a document snippet having a snippet component that consists of the pure search string itself, such that:

the document snippet is mapped to the highest quality of match value obtainable from a search using the pure search string;

the highest quality of match value is greater than a value that is mapped to some other document snippet by a search using the pure search string; and changing the case of at least one character in the document snippet does not affect the quality of match value obtained for the document snippet using the pure search string.

Consider a document that consists of the sentence "Fred Schwartz believes the sun is indestructible.", a search string "Fred Schwartz", and a match scheme that simply looks for case insensitive exact matches and maps document snippets to {"no match", "matches"}; then the "Fred Schwartz" snippet of the document meets all of the criteria because 1. it matches (which gives it the highest quality of match value possible, namely "matches"), 2. the document snippet "believes the sun" is mapped by the search to "no match" which is distinct from and less than "matches", and 3. changing Fred Schwartz in the document to "fred schwartz" gives a document snippet with an altered-case character that "matches". Thus, the case insensitive match scheme above is therefore partially case insensitive. Note however, that partial case insensitivity does not imply that a match scheme is entirely case insensitive. Now consider the pure search string "destructible" using the same case-insensitive match scheme; it matches the document snippet "destructible" in the word "indestructible" and thus is not a whole word in the document. Thus, if the match scheme also requires whole words, then there is no match for the match scheme even though the pure search string is matched exactly; so this example helps explain the added requirement in the definition that a matching document snippet also yields the highest quality of match value obtainable for the pure search string.

partially case sensitive match scheme: The statement that a match scheme α, which maps a set $S_\alpha$ to ($Q_\alpha$,≤), is partially case sensitive or is a partially case sensitive match scheme means that if there is a search string θ, which is a pure search string relative to α, a document d comprising document snippet $\lambda_1$, and a document d' comprising document snippet $\lambda_2$ such that:

the snippet component of $\lambda_1$ is θ, the snippet component of $\lambda_2$ is modified from θ by changing the case of one or more characters of θ, document d' is document d with document snippet $\lambda_1$ replaced with document snippet $\lambda_2$;

α(θ,$\lambda_2$) is distinct from α(θ,$\lambda_1$) and α(θ,$\lambda_2$) α(θ,$\lambda_1$); and no document exists having a document snippet $\lambda_3$ such that:
   $\alpha(\theta,\lambda_3)$ is distinct from $\alpha(\theta,\lambda_1)$; and
   $\alpha(\theta,\lambda_1) \leq \alpha(\theta,\lambda_3)$.
A set of match schemes is partially case sensitive if each match scheme of the set of match schemes is a partially case sensitive match scheme.

This paragraph is not part of the definition and is provided only to assist readers to understand aspects of the definition. This definition says that a match scheme is partially case sensitive if there is a pure search string (i.e. a search string with no search string metadata) and a document snippet having a snippet component that consists of the pure search string itself, such that:
   the document snippet is mapped to the highest quality of match value obtainable from a search using the pure search string; and
   changing the case of one or more characters in the document snippet lowers the quality of match value obtained for the document snippet using the pure search string.
Consider a document that consists of the sentence "Fred Schwartz believes the sun is indestructible.", a search string "Fred Schwartz", and a match scheme that simply looks for case sensitive exact matches and maps document snippets to {"no match", "matches"}; then the "Fred Schwartz" snippet of the document meets the criteria because 1. it matches (which gives it the highest quality of match value possible, namely "matches"), 2. changing Fred Schwartz in the document to "fred Schwartz" gives a document snippet with an altered-case character such that the "fred Schwartz" document snippet is mapped to "no match". Thus, the case sensitive match scheme above is therefore partially case sensitive. Note however, that partial case sensitivity does not imply that a match scheme is entirely case sensitive. Now consider the pure search string "destructible" using the same case-sensitive match scheme; it matches the document snippet "destructible", which is not a whole word. Thus, if the match scheme also requires whole words, then there is no match for the search scheme even though the pure search string is matched exactly; so this helps explain the added requirement in the definition that a matching document snippet also yields the highest quality of match value obtainable for the pure search string.

Note that it is possible from the definitions for a partially case insensitive match scheme to also be a partially case sensitive match scheme. However, case insensitive match schemes cannot be partially case sensitive and case sensitive match schemes cannot be partially case insensitive.

case insensitive match scheme: The statement that a match scheme $\alpha$, which maps a set $S_\alpha$ to $(Q_\alpha, \leq)$, is case insensitive or is a case insensitive match scheme means that if:
   d is a document comprising a document snippet $\lambda_1$;
   $\alpha(\theta,\lambda_1)$ is defined for a search string $\theta$;
   d' is a document obtained from d by replacing the document snippet $\lambda_1$ with the document snippet $\lambda_2$; and
   $\lambda_2$ has a modified snippet component obtained by changing the case of one or more characters of the snippet component of $\lambda_1$;
   then:
   $\alpha(\theta',\lambda_2)$ is defined and is the same value of $(Q_\alpha, \leq)$ as $\alpha(\theta,\lambda_1)$.

distinct match property: The statement that a pair of match schemes $\alpha$ and $\beta$, which map sets $S_\alpha$ and $S_\beta$ to $(Q_\alpha, \leq)$ and $(Q_\beta, \leq)$ respectively, have a distinct match property with respect to each other means that there is a search string $\theta$ and a document comprising non-overlapping target document snippets $\lambda_1$ and $\lambda_2$ such that:
   $\alpha(\theta,\lambda_1)$ and $\alpha(\theta,\lambda_2)$ are distinct values of the partially ordered set $(Q_\alpha, \leq)$;
   $\beta(\theta,\lambda_1)$ and $\beta(\theta,\lambda_2)$ are distinct values of the partially ordered set $(Q_\beta, \leq)$;
   $\alpha(\theta,\lambda_1) \leq \alpha(\theta,\lambda_2)$; and
   $\beta(\theta,\lambda_2) \leq \beta(\theta,\lambda_1)$.
The statement that a set of match schemes has a distinct match property means that every pair of match schemes of the set of match schemes have a distinct match property with respect to each other.

This paragraph is not part of the definition and is provided only to assist readers to understand aspects of the definition. The above definition says that a pair of match schemes are distinct from each other (have a distinct match property with respect to each other) if they put a pair of document snippets in opposite order of match quality relative to the same search string.

fuzziness: The statement that a first match scheme has higher or increased fuzziness relative to a second match scheme, which is a relative fuzziness relationship, means that the first match scheme is in general likely to find additional matches relative to the second match scheme for arbitrary or randomly chosen documents and search strings; for example, a case insensitive version of a match scheme would be fuzzier than a useful uncontrived case sensitive counterpart, which holds for both fuzzy match schemes and binary match schemes. Also by example, if a first match scheme is a match scheme expansion (see definition of match scheme expansion) of a second match scheme, then the first match scheme has in general a higher likelihood of finding matches in arbitrary documents and search strings relative to the second match scheme and thus is fuzzier. Note that this is a general relationship taken across arbitrary documents and search strings; greater fuzziness specifically does not guarantee that a search string and a document does not exist or cannot be contrived such that a less fuzzy match scheme evaluated for that search string and document has more matches; in fact, this is not necessarily true even if the less fuzzy match scheme is a match scheme contraction of the fuzzier match scheme. Fuzziness therefore, however it may be explicitly or implicitly expressed to users in applications and in particular regardless of any words that may be used to convey it, is useful for users as a generalization, simplification, and/or abstraction. The statement that a first match scheme has lower or decreased fuzziness relative to a second match scheme means that, in general, the first match scheme is likely to find fewer matches for search strings than the second match scheme; reversed examples for increased fuzziness above work for decreased fuzziness.

word boundary oblivious match scheme: The statement that a match scheme $\alpha$, which maps $S_\alpha$ to $(Q_\alpha$, is a word boundary oblivious match scheme means that for any search string $\theta$ and any document d comprising a document snippet $\lambda$ such that:
   $\alpha(\theta,\lambda)$ is defined; and
   where A is replaced with document snippet $\lambda'$ in d to form document d' where the snippet component of $\lambda'$ is a modified snippet component of $\lambda$ such that:

all word-forming-characters of λ' are in the same order as in λ; and all non-word-forming-characters of λ' are in the same order as in λ;

then:

α(θ,λ') is defined; and

α(θ,λ') is the same value of ($Q_\alpha$,≤) as α(θ,λ).

This paragraph is not part of the definition and is provided only to assist readers to understand aspects of the definition. The above definition says that a fuzzy match scheme is word boundary oblivious if in all cases, sliding word-forming-characters from the beginning of document words to the end of previous document words (or vice versa) results in the same mapping for the resulting document snippets. For example, if a match scheme is word boundary oblivious then changing a document snippet that has a snippet component of "How Now Brown Cow" to "HowNo w Brown Cow", "HowNow BrownCow", or "HowNowBrown Cow" does not affect the mapping of the match scheme for that snippet relative to any search string.

match scheme expansion: The statement that match scheme $\alpha_2$ is a match scheme expansion of match scheme $\alpha_1$ means that there is a mapping $f$ from search strings to whole numbers such that:

if there is a search string θ and a document snippet v, which has a snippet component of length at least $f(\theta)$, that is a clean word match of a document snippet $\lambda_1$ relative to search string θ and match scheme $\alpha_1$;

then v is a clean word match of a document snippet $\lambda_2$ relative to the search string θ and match scheme $\alpha_2$.

The statement that a match scheme $\alpha_1$ is a match scheme contraction of a match scheme $\alpha_2$ means that the match scheme $\alpha_2$ is a match scheme expansion of match scheme $\alpha_1$. That a second match scheme is a match scheme expansion of a first match scheme can be expressed by stating that the second match scheme is an expansion of the first match scheme and the first match scheme is a contraction of the second match scheme.

This and subsequent paragraphs are not part of the definition and are provided only to assist readers to understand aspects of the definition and explore its significance. First observe that this defined relationship captures aspects of relative fuzziness of match schemes and that match schemes need not be 'fuzzy match schemes' to be thus compared and usefully have such a relationship. Recall that from the definition of 'clean word match' the document snippet v: is a word or part of a word of the document; is a sub-snippet of both $\lambda_1$ and $\lambda_2$; and affects the match value relative to the search string of the respective match schemes for snippets $\lambda_1$ and $\lambda_2$. What this says is that such a clean word match for a match scheme implies a clean word match using the same word for any other match scheme that is an expansion of the match scheme. For example, consider the following list of three fuzzy match schemes, the second and third of which are each a match scheme expansion of its predecessor:

1. a somewhat fuzzy match scheme that looks, relative to a search string, for document snippets, which are up to 2|θ| in length, comprising case insensitive matches of whole words, which are at least $\lceil \log_{10}(|\theta|) \rceil$ in length, where |θ| is the length in characters of the search string. It allows intervening words, missing words, and reordering of words;

2. a fuzzier match scheme that looks, relative to a search string, for document snippets, which are up to 2|θ| in length, comprising case insensitive matches of word prefixes, which are at least $\lceil \log_{10}(|\theta|) \rceil$ characters in length, where |θ| is the length in characters of the search string, and also allows intervening words, missing words, and reordering of words;

3. a very fuzzy match scheme, which is a word boundary oblivious match scheme, that looks, relative to a search string, for document snippets, which are up to 2|θ| in length, comprising case insensitive matches of $\lceil \log_{10}(|\theta|) \rceil$ length of character sequences of word-forming-characters, where |θ| is the length in characters of the search string; intervening non-word-forming-characters are ignored (i.e. as stated above word boundary oblivious), that allows intervening character sequences, missing character sequences, and reordering of character sequences.

Each of the three enumerated match schemes maps document snippets, that are limited in length to up to twice the length of the search string, to the number of characters matched in the document snippet.

The mapping $f$ of search strings to whole numbers, which is used according to the definition to establish match scheme expansion relationships for the above match schemes, is the function $f(\theta) = \lceil \log_{10}(\text{Max}(2,|\theta|)) \rceil$, where |θ| is the length in characters of the search string θ; note that since the log of 0 and 1 are undefined and zero respectively, 2 is used in place of the length in the formula for search string lengths less than 2. This function grows logarithmically and ensures combinatorically that, given a document snippet λ and a search string θ such that |λ|≤2|θ|, a string μ can always be found of length $f(\theta)$ such that:

μ is a sequence of English lower-case word-forming-characters; and neither μ nor any changed case version of μ (i.e. with some characters having changed case) is a substring of either θ or λ.

A simple example is now given to illustrate that these enumerated match schemes 2 and 3 above are in fact match scheme expansions of their predecessors. For both consider a document that consists of the sentence "Fred Schwartz believes the sun is indestructible." and a search string "Fred Schwartz". Match scheme 1, 2, and 3 all match in any document snippet comprising the "Fred Schwartz" document snippet, and produce the same quality of match value for all of the document snippets. The basic point to make is that because "Fred Schwartz" is a clean word match in the first scheme then it must also match in the later schemes. The "w" single-character document snippet (in the name Schwartz) works as the required clean word match for all of the match schemes by replacing it in the document with "z", which causes all of the quality of match values to drop because no part of "z" matches anywhere in the search string. Then, for all of the match schemes replacing "w" in the search string with "z" fully restores the quality of match values. This establishes that all the limitations of the definition are met for this example. Since this kind of reasoning works in general for these three match schemes, each of match schemes 2 and 3 is a match scheme expansion of its predecessor in the list. For another example, the search string "Sch" matches for match schemes 2 and 3 but not for match scheme 1, and the search string "war" only matches for search scheme 3. Such a relationship usefully supports user understanding that matches are not lost when the user switches to a match scheme expansion of a current match scheme;

such a switch could be made in one direction because there are none or too few results with a current match scheme and in the other direction when there are too many matches for a user to quickly process or that are of no interest. The speed of the algorithms beneficially allows quick experimentation of this type and in some embodiments changing match schemes up and down such a fuzziness scale requires a single action such as a single click of a button. Thus, according to some embodiments, a user can rapidly move up and down a list of such match schemes and, based on the displayed snippet results, choose to look at a matching snippet in its context in the document or alternately adjust the search string itself (without programming with metadata within the search string) to further limit or expand results. Because of this match scheme expansion property, results from a match scheme expansion (i.e. a fuzzier match scheme) are especially useful for providing information to users that is then potentially used to make changes to search strings that are thereby intended to produce more matches in a match scheme contraction (i.e. a less fuzzy match scheme).

In some embodiments match scheme 2 is altered and can be altered in many ways that do not affect its match scheme expansion relationships above. Some embodiments use modifications of match scheme 2 that themselves have a match scheme expansion relationship with match scheme 2 and with other modifications of match scheme 2. Thus, in some embodiments, a match scheme sequence having a linear expansion property (defined below) is expanded to include more than 3 fuzzy match schemes. The following are example match schemes that are used in some embodiments:

a. in this match scheme, which is modified from match scheme 2., a matching prefix must be in length proportional to the maximum length of the two words found to have matching prefixes; for example, the proportion could be half the maximum length. This match scheme is a match scheme expansion of match scheme 1. Match schemes 2 and 3 are match scheme expansions of this altered match scheme. In some embodiments the length of the search string does not affect whether a match is found, only the length of the word in the searched document is used to establish a minimum length of prefix.

b. in these match schemes, which are modified from match scheme 2. (resp. match scheme α), substrings of words can match whether or not they are prefixes of the matching words. This produces a match scheme expansion of match scheme 2 (resp. match scheme α). In some embodiments, the match scheme is further modified to require a greater proportion of the maximum length of two words when they are found to have matching substrings but not matching prefixes from both words; for example, the proportion in some embodiments for such substrings is ⅝ of the maximum length. All of these modifications result in match scheme contractions of match scheme 3 and at the same time result in match scheme expansions of match scheme 2.

c. in this example match scheme, which is match scheme 1 modified so that words match if:
they have a Clean Word Match of length of at least $\lceil \log_{10}(|\theta|) \rceil$ characters, where $|\theta|$ is the length in characters of the search string; and
between them they exactly match if either of the strings is less than 3 characters in length, have a Levenshtein distance of no more than 1 if either string is 3 to 6 characters in length, have a Levenshtein distance of no more than 2 if either string is 7 to 11 characters in length, and otherwise have a Levenshtein distance of no more than 3.
This is a match scheme expansion of match scheme 1 but is not a contraction of match scheme 2.

d. in this example match scheme, which is match scheme 2 modified so that prefixes of two words match if:
they have a clean word match of length of at least $\lceil \log_{10}(|\theta|) \rceil$ characters, where $|\theta|$ is the length in characters of the search string; and
between them they exactly match if either of the strings is less than 3 characters in length, have a Levenshtein distance of no more than 1 if either string is 3 to 6 characters in length, have a Levenshtein distance of no more than 2 if either string is 7 to 11 characters in length, and otherwise have a Levenshtein distance of no more than 3.
By using $f(\theta) = \lceil \log_{10}(|\theta|) \rceil$, it can be shown that this is an expansion of match scheme c. It is also an expansion of match scheme 2 and a contraction of match scheme 3.

The above match schemes are examples that are used in some embodiments. There are a many sequences of match schemes, just from the examples above, such that each is an expansion of its predecessor (see "linear expansion property" below).

It is not possible for every match scheme that a user might need to either be an expansion or a contraction of every other such match scheme; for example, in some embodiments every match scheme has a case sensitive form and a case insensitive form; and in some embodiments the case sensitive (resp. insensitive) forms are all contractions or expansions of the other case sensitive (resp. insensitive) forms; however, while a case insensitive match scheme can be an expansion of its case sensitive counterpart, a set of two or more case sensitive match schemes, which has a distinct match property, combined with its case insensitive counterparts cannot in general (i.e. for useful, non-trivial, or non-contrived examples) have a linear expansion property. Note that the entire set of examples of match schemes described above, combined with their case sensitive counterparts, has a distinct match property.

Thus, in some embodiments, there is a sequence of buttons and indicators (i.e. screen regions to select by clicking between match schemes that change appearance based on the selection) that proceeds from less fuzzy to fuzzier and a separate button and indicator that indicates whether the whole sequence is case sensitive or not. In this way, switching between one match scheme and another directly by use of match scheme buttons is a selection of a fuzzier or less fuzzy (and often an expansion or a contraction) of the current match scheme, and only two actions in sequence can cause a switch to a match scheme that is neither a contraction nor an expansion of a current match scheme. In this way it is a useful simplification to label a single sequence of buttons and indicators, which switch directly between match schemes, according to their relative fuzziness. For example, in some embodiments there are three such buttons and indicators that, for English users, are labeled "less fuzzy", "fuzzy", and "very fuzzy"; in some such embodiments the labels only appear in tool-tips over the display and appear when hovering over the button. In some embodiments there are four such buttons and indicators that, for English users, are labeled "less fuzzy", "fuzzy", "fuzzier", and "very fuzzy". In some embodiments these relative fuzzy relationships do not change, regardless of other selections; thus, after learning the relative direction of fuzziness in the button sequence, a user can ignore the tool tips and quickly switch match schemes up and down the sequence to efficiently find more or fewer matches.

In some embodiments, pressing a case sensitive/insensitive button results in an immediate search by the new match scheme indicated; for example, if a "less fuzzy" case sensitive match scheme is currently selected, then after pressing the "case sensitive" button the corresponding "less fuzzy" match scheme of a case insensitive match scheme sequence is thereby selected and a search is performed immediately according to the current search string. In some such embodiments, the single-step switch between case sensitive and case insensitive in every case is either a switch to an expansion or contraction of the current match scheme. In some embodiments, all single action switches between match schemes that are not between match schemes in a fuzziness hierarchy are nevertheless a switch to a match scheme expansion or match scheme contraction of the current match scheme and automatically result in performance of the indicated search.

In some embodiments there is a button that switches between a pair of match scheme sequences, where one sequence of match schemes has match schemes that use a Levenshtein distance between words and prefixes, as described in the examples above, and the other that does not; in some embodiments there is a tool-tip label for this button that in English reads "approximate words". Note that this is somewhat orthogonal to the case-sensitive button because all of these fuzzy match schemes can either be case sensitive or case insensitive. In some embodiments, pressing this button results in an immediate search by the new match scheme indicated; for example, if a "less fuzzy" match scheme is currently selected, then after pressing the "approximate words" button the "less fuzzy" match scheme of the new sequence of fuzzy match schemes is selected and a search is then performed according to the current search string with no further input. Thus, in some embodiments pressing this "approximate words" button to toggle between such match schemes, as with case sensitivity, results in a switch between match schemes such that one is an expansion of the other.

In some embodiments users are always presented with the same choices of control buttons, all of which are active at all times (i.e. every such control button can be meaningfully pressed to change match schemes regardless of the currently chosen match scheme), and the user can beneficially know in every case whether to expect more or fewer results from pressing any one of the buttons that switch between members of the set of match schemes. This holds even though the entire set of match schemes thus selectable has a distinct match property. In some embodiments only a hierarchy of fuzziness choices between match schemes is provided with no other choices, such as between case sensitive and case insensitive.

linear expansion property: The statement that a set of match schemes has a linear expansion property means that there is a strict total ordering (also called a strict linear ordering) of the set of match schemes such that if:

$\alpha_1$ and $\alpha_2$ are in the set of fuzzy match schemes; and
$\alpha_1 < \alpha_2$ in the strict total ordering;
then:
$\alpha_2$ is a match scheme expansion of $\alpha_1$.

This paragraph is not part of the definition and is provided only to assist readers to understand aspects of the definition. This definition essentially says that a set of match schemes has a linear expansion property if they can be placed in a sequence such that each is a match scheme expansion of its predecessor in the sequence, except for the first which has no predecessor.

expansion sequence: An expansion sequence of a set of match schemes is a strict total ordering of the set of match schemes that is, according to the definition, the strict total ordering required to establish that the set of match schemes has a linear expansion property.

This paragraph is not part of the definition and is provided only to assist readers to understand aspects of the definition. In some embodiments, there are a case-sensitive button and a 'approximate words' button that together switch between four expansion sequences of match schemes, which are presented to users as a linear hierarchy of fuzziness using the same visible selection elements to select within the hierarchy. In some embodiments, there is no need for users to understand that there are different match schemes per-se selected within a particular expansion sequence because such a sequence can be effectively understood and switched from one to another based on notions of "give me more matches" or "give me fewer matches". This is a simplification for users that results in faster and more effective search activities and fewer instances of resorting to puzzling "advanced find" features. In some embodiments there is no "advanced find" feature, no regular expression or regular expression-like feature, and things like stemming, whole words, exact match, etc. are all folded into simpler and more effective hierarchies of fuzziness.

In some embodiments, the same hierarchies of fuzziness are used and presented to users for search in document corpora, including large document corpora such as the world wide web of documents, as within single documents. In conjunction with making search result snippets into hyperlinks, as disclosed in U.S. Pat. No. 10,430,474, this makes a web browser into a full snippet eximious application (see the definition of full snippet eximious application), over the world wide web corpus of documents, that has a unified search interface and unified search semantics. In some such embodiments, switching between search over a document corpus and search within a single document of the corpus, using the same match scheme, requires a single mouse click.

canonical resulting document: If a URL is used to request a resource, according to a protocol indicated by the URL scheme and a success code is returned with a retrieved document, then the retrieved document is a canonical resulting document of the URL based request. A canonical resulting document of a URL request for a resource is a canonical error document under the following circumstances: 1) a failure code for retrieval is received, regardless of any associated content; 2) there is no result at all of a URL request, as might be the case if network connectivity stopped suddenly during the execution of a request; and 3) no document is otherwise retrieved. Thus, a canonical resulting document is a result of every request to retrieve a document resource using a URL, regardless of whether any document is actually transmitted or received. A canonical resulting document of a request is said to have been retrieved as a result of the request and the request is said to have been made to request retrieval of a canonical resulting document—again, regardless of whether actual transmission or receival of a document occurred. Gerundial phrases have expected meanings; for example, "requesting retrieval of a canonical resulting document" using a URL is the act or acts of sending and receiving messages according to a protocol indicated by the URL scheme to retrieve a resource identified by the URL, and results of the activity determine a canonical resulting document as described above.

Note that many web servers return a success code (e.g., result code 200 for HTTP and HTTPS requests) in circumstances where the intended document cannot be found, along with a document that usually declares somewhere in its text that the retrieval was a failure. This circumstance is not an exception; a retrieved document, which in this case declares itself to be an indication of failure, is a canonical resulting document for that request. Again, regardless of the content of a document retrieved, if a complete document is retrieved with a success code then the document retrieved is a canonical resulting document of the URL based request.

Also note that transient network conditions can cause a canonical resulting document of a request to differ from a canonical resulting document for an identical request made moments later.

In part because of 1) the dynamic and uncertain nature of network retrieval, 2) user agents can display incomplete documents that change over time as retrieval becomes more complete, 3) network requests can be re-issued multiple times after individual failures at various protocol levels, and 4) it takes an unpredictable amount of time to receive a document; it is possible for a canonical resulting document of an individual request to be different than a canonical resulting document for that same request (perhaps still underway) at a later time. For example, when an HTML document is received in parts by a browser and the parts are displayed before all of the document is received, a canonical resulting document for that request is the canonical error document because initially nothing has been received and there is no guarantee possible that anything will be received. It is uncertain that either a success or error code will be transmitted back to the requestor by any entity in the network. A success code may subsequently be received with some content to be displayed, at which time the displayed document (as defined in many cases by the DOM instance for that as-displayed document) becomes a canonical resulting document for that request. Following that, additional content may be received in response to the original and subsequent requests, which would include content that may come as a result of automatic page script action. Thus over time there may be arbitrarily many canonical resulting documents for that request. This can occur hundreds of times with modern browsers, scripts, and web pages. Given modern protocols this process may not entirely halt. Nevertheless, it is typical for this process to halt or complete, in which case the resulting document is then a last canonical resulting document for that request. Even in cases when the process halts, two simultaneously made requests using different user agents can result in different canonical resulting documents.

A timeout can be used to determine a particular canonical resulting document at a particular time for a particular user agent. Such a determining timeout can occur at almost any protocol level, such as network protocol timeouts or at the application level within a user agent. Depending on where a timeout occurs, a user agent could invalidate the results of the request entirely or it may simply continue to display the parts that were already received. It may or may not re-request parts or all of the document and such re-requests could also occur at multiple protocol levels.

A response to user inputs made in context of a rendered display of a canonical resulting document can also result in dynamic changes to the canonical resulting document. This commonly occurs for example when scrolling downward causes retrieval of additional content to display farther down. Another common example is when entering data in a search screen causes search results based on the newly entered data to be displayed. In such cases the canonical resulting document changes dynamically over time.

The article "a" for a canonical resulting document, followed later by the article "the" applying uniquely to that same antecedent canonical resulting document, refers to precisely the same document content. Again, a definite article reference to an antecedent canonical resulting document applies to the same singular content as its antecedent. This holds regardless of the dynamic nature of documents received as described above.

A dynamic canonical resulting document is the same as a canonical resulting document except that the article "a" for a dynamic canonical resulting document followed later by the article "the" applying uniquely to that same antecedent dynamic canonical resulting document, refers to a possibly changing over time canonical resulting document and thus its content is not necessarily the same since the antecedent reference could apply to the document at a different time. Two references to the same antecedent instance may also refer to different content. Again, both a canonical resulting document and a dynamic canonical resulting document may have changed content over time; as described in this paragraph, but they differ in the relationship indicated between antecedent instances and referential instances when referring to those antecedent instances.

canonical similarity: Canonical similarity is a binary relationship that establishes whether a string is canonically similar or canonically dissimilar to a base string. The following definite procedure can be used to establish this relationship.

1) If either the candidate string or the base string is not a UTF-16 Unicode encoding, then convert them to UTF-16 Unicode encodings.
2) The UTF-16 Unicode encodings of the candidate string and the base string are processed according to the Canonical Form Transform to obtain the Canonical Form Transform of the candidate string and the Canonical Form Transform of the base string.
3) The Levenshtein distance d between the Canonical Form Transform of the candidate string and the Canonical Form Transform of the base string is determined.
4) If the Levenshtein distance d is less than 25% of the length of the Canonical Form Transform of the base string in characters, then the candidate string is canonically similar to the base string; otherwise, the candidate string is canonically dissimilar to the base string.

Note that the Levenshtein distance d is zero in step 3 if the Canonical Form Transform of the candidate string and the Canonical Form Transform of the base string are identical.

A candidate string is canonically similar to a set of base strings if it is canonically similar to any member string belonging to the set of base strings; otherwise it is canonically dissimilar to the set of base strings. If a set of base strings has no member string, i.e., the set is empty, then no string is canonically similar to the set.

canonical text-only version: Almost all document formats, including all document formats having a DOM (document object model), provide conversion code for their document formats to text-only versions. Microsoft Word formats (e.g., .doc, .docx) and Portable Document Format (.pdf) editors provide built-in conversions to text-only versions. Most HTML and XHTML editors do the same. The conversion code determines the potentially viewable text and outputs it without the markup—just the potentially viewable text. Such output is generally defined based on the DOM for the format, which can be especially useful in defining the precise character and word order of a text-only version. Since text-only versions of documents can be represented in various character encodings, files containing text-only versions of documents are often preceded by a short indication of the character encoding being used. Thus, even in a file containing a text-only version of a document there may be a small preceding code indicating the character format. While Unicode encodings can be used to represent the text of a text-only version of any document, there are multiple possible Unicode encodings. The canonical text-only version of a document is a little-endian UTF-16 Unicode encoding of a text-only version, where the text-only version is determined by the specification for the document's format, the conversion code for the format, or the DOM for the format. Because only little-endian UTF-16 encodings are used for a canonical text-only version, the format encodings often found at the beginning of files containing a UTF-16 encoded text documents are unnecessary and are not included in a canonical text-only version. Thus, even a text file that uses UTF-16 Unicode may have a canonical text-only version that differs from its common file representation. A canonical text-only version of a document thus contains only a representation of the characters. Logically, a canonical text-only version of a canonical text-only version of a document is the same as the canonical text-only version of the document. A document, which is in a format that can express viewable text, has and is said to have a canonical text-only version of itself; this holds even where the code or specifications for the document format do not define conversion to a canonical text-only version of documents. The canonical error document has a canonical text-only version consisting of the two-byte little-endian encoding of \ud800 followed by the two-byte little-endian encoding \ud800, which together we call the error-character. Note that the error-character is 4 bytes and is not a valid (by the standards) little-endian UTF-16 character or sequence of characters; this canonical text-only version of the canonical error document is the only valid canonical text-only version of any document that is not also a valid little-endian UTF-16 encoding of a sequence of characters.

clicking: The action of selecting the display element under the current cursor location on the device's display screen. Doing so involves moving the cursor to the display element of interest and pressing a mouse button, lightly tapping a touch screen or similar actions.

derives: Processing, computing, copying, translating, transforming, transmitting, and receiving initial data or an initial set of data and in so doing obtaining a resulting datum, output data, or an output set of data, derives the resulting datum, output data, or output set of data from the initial data or initial set of data. A derivation is a distributed computation, which may or may not be local to a single physical CPU and single physical memory, and may be comprised by other distributed computations, and which derives something from something else. Thus, writing that a datum or set of data a is derived from a datum or set of data $\beta$ implies a context of a concrete distributed computation of a distributed procedure, in which a derivation occurs that derives $\alpha$ from $\beta$.

A datum or set of data can span multiple devices in an electronic communication network. The activity of a derivation in an electronic communication network can similarly span many computation devices that communicate with each other; and such a derivation includes the communication activity.

In the absence of a qualifier that allows for a singular empty result, such as for example the qualifier "possibly empty" in the phrase "a possibly empty set of data a is derived from a set of data $\beta$", it is required that something concrete and non-empty can actually be derived; note that without this requirement the thing derived could be e.g. an empty set of data regardless of the values of any input data. Thus a resulting datum or set of data is derived, when used without a qualifier as described above, from a starting datum or set of data if the values of the starting datum or set of data are used in the execution of a distributed computation to arrive at one particular resulting datum or set of data from at least two distinct possible resulting datum or set of data in the context of the distributed computation; i.e. through execution of computer executable instruction sequences of a distributed procedure, which the distributed computation is an execution of, the value or values of the concrete datum or set of data are used to select, generate, or compute the resulting datum or set of data from a set of at least two possible resulting data or sets of data. Because at least two possible outcomes must be distinct, it is a logical necessity that such a distributed procedure maps at least two distinct input values of the starting datum to distinct results in the context of the distributed computation—which is to say by changing only the starting datum. In the absence of a qualifier that allows for a singular empty result as described above, an empty set of data can be at most one of at least two distinct possible derivation results in context of a distributed computation.

Note that the verb 'derived' is not, as a logical necessity, transitive, which is to say e.g. that if $\alpha$, $\beta$, and $\delta$ represent data such that a is derived from $\beta$ and $\beta$ is derived from $\delta$ in context of a distributed computation, then these facts alone do not imply that a is derived from $\delta$ as a matter of logical necessity in context of the distributed computation. To see why this is the case, consider that while a pair of values of $\beta$ will arrive at two distinct values of a in context of the distributed computation; that particular pair of values of $\beta$ might not be obtainable by changing the values of $\delta$ in context of the distributed computation. Similarly, a statement that a datum or set of data α is derived from a datum or set of data β does not logically imply that the datum or set of data β is the only datum or set of data from which a is derived.

The verb 'derived' is active, which is to say e.g. that use of the verb 'derived' in the statement "the datum a is derived from the datum β" signifies more than that the datum a is derived or could be derived from something having the same value as the datum β; it signifies that data in the datum a in fact, through a computation process of a distributed computation, is in some way computed by use of the data in the datum instance β. This typically occurs in a computation activity that moves, copies, combines, selects parts of, selects using a preexisting mapping, transforms, transmits, etc. the data in the datum β. Again, in the context of a particular distributed computation, if a is derived from β then at least some change made to β in that context results in a change in a.

While the statement "the datum a is derived from the datum β" is active in the sense that the specific datum β is actually used in a derivation of a, the statement by itself does not say anything about when the derivation occurred. For example, the statement "in response to actions: the datum A is derived from the datum α and the datum α is derived from the datum β" indicates that the derivation of a occurred in response to (and hence after) at least one of the actions; however, the statement "in response to actions: the datum λ is derived from the datum α; wherein the datum α is derived from the datum β" does not necessarily indicate that a is derived in response to the actions and it may have been derived at any time prior to all of the actions.

The verb 'derived' is reflexive, which is to say e.g. that a datum or set of data α is derived from itself (i.e. α is derived from α) in the context of a distributed computation that accesses or otherwise makes use of α.

A datum is a copy of itself just as it is a derivation of itself. Note that a copy of a copy of a is necessarily a copy of α. However, while a datum α is generically a copy of itself, it can be clear from context that 'a copy of α' references a distinct datum instance; for example, if 'a copy of α' is on a different machine than the datum instance 'α', then 'α' and 'a copy of α' in that context necessarily refer to distinct datum instances. Similarly, if datum instances on two or more different machines are all called a, then a necessarily refers to a shared value of the datum instances or to a set of datum instances having that value. Thus, in circumstances where it is unnecessary to distinguish between instances of a datum having the same value, two or more data instances having a same value or same values may be referred to by the same name.

While context may make clear that a distinct datum instance is indicated, and not simply a value that could be held by any number of datum instances, it can also be made explicit that a particular instance is indicated by using the words 'datum' or 'data' or by using the word 'copy'; for example, the phrases 'a copy of a search string', 'a datum comprising a search string', or 'a datum comprising a copy of a search string' all refer to a singular datum that either consists of or comprises a copy of a value that is a search string.

A statement that a datum or set of data α is not derived from a datum or set of data β in a context of a distributed computation means that the statement that the datum or set of data α is derived from the datum or set of data β is a false statement in the context of the distributed computation.

distinguished: A part of a document display is distinguished if that part, including all of its sub-parts, are set apart visually so that a viewer can see that the part differs from the normal (non-distinguished) form of display. Other forms of the word 'distinguish' derive the expected meanings; for example, to set a part of a document apart visually when displaying the document is to distinguish that part, distinguishing a part of a document is the act of setting it apart visually and that act distinguishes that part; once done that part is distinguished and has been distinguished. If a sub-part of a part is distinguished then the part is partially distinguished, even if not all of its sub-parts are distinguished. For instance, a word is partially distinguished if the first character of the word is highlighted. Verbal and gerundial phrases have the expected meanings; for example, distinguishing partially and partially distinguishing a part are the act or acts of setting that part of a document apart visually when displaying the document.

A visual component may be created and added to a display in order to indicate a border or position in the display; useful examples include the common editing practice of placing a cursor at a position between two characters to indicate where certain user inputs will take effect, or placing a red-line box around a thumbnail image to draw attention to that particular thumbnail. These added display elements may have dynamic behavior such as blinking on and off or changing color. What is distinguished or partially distinguished may be a matter of convention specific to the product that provides such a display. The meaning of a cursor with particular shape added between characters in a span of text could be different than that for a cursor with another shape, and the meaning could be sensitive to context. For example, matched left and right boundary cursors generally have a defined meaning when the left one occurs earlier than the right one in left-to-right text. That might mean that all of the text between them is distinguished and is selected for editing operations. However, the conventions of that particular display determine what is distinguished, would govern the meaning, and would need to be learned by the user.

There are many commonly encountered ways of distinguishing the display of parts of documents, some of which affect the display of the part itself and others that call attention to that part. A visual object may be added that "floats over" the display; this is not part of the display itself in the sense that it does not take up space within the document display, but sets some part of the display apart; e.g., by pointing to it with a finger shaped cursor, with just the end of an acute triangular shape, or with a barbed arrowhead shape. What is distinguished is a matter established between the designers of the system and the users; if the end of such a floating visual object is over a character in a word, it could mean that it distinguishes the whole word, just distinguishes the character, or does something unintuitive and unique to that application, such as distinguishing the word and any word immediately following it. Such a floating object could contain text that clarifies what the pointer indicates, or it could contain an arbitrary annotation.

All of a long laundry list of ways of distinguishing, which were defined previously in U.S. Pat. No. 10,430,474 and related patents that it cross-references, are static; all static ways of distinguishing are indefinitely repetitious in that every display frame contributes to a particular way of distinguishing; ways of distinguishing by flashing involve temporal cycles of changing something on and off indefinitely. When a way of distinguishing is not indefinitely repetitious, i.e. its repetitions are not automatically ending or changing without input that causes ending or changing, then it is a way of transitory distinguishing.

While in U.S. Pat. No. 10,430,474 and related patents, only indefinitely repetitious ways of distinguishing were explicitly disclosed, those disclosures described scrolling a part into view after it had been distinguished. Where the scrolling is smooth it is possible for a user to temporarily perceive motion of the anomaly presented by the indefinitely repetitious way of distinguishing. While it is not defined explicitly in those disclosures as a way or manner of distinguishing, such motion perception nevertheless can occur as an effect of scrolling a part into view as described in the example embodiments. For example, highlighting a part or floating an image above a part are explicitly defined ways of distinguishing in those disclosures, such highlighted parts or floating images above parts can cause a user to perceive motion while smoothly scrolling such an already distinguished part into view.

However, while such perceived motion is relative to a screen it is not relative to a distinguished part or anything else that is scrolling with the distinguished part, which often is the whole of visible parts of the document. Perception of motion is always relative to something, and it is relative motion that, as motion per-se, distinguishes two things or distinguishes a thing from its background. Thus, because the simulated motion disclosed previously is relative to the screen only and not relative to a part that is distinguished, such motion does not have the salience of relative motion to the part that is distinguished and the perceived motion per-se is not what distinguishes the part from similarly scrolling surroundings.

Analogously, imagine a movie scene in space wherein the movie camera pans across a background of asteroids whereby the user has no clue whether it is the camera that is moving or the asteroids; while everything is moving together, no asteroid is distinguished from its neighbors by being in relative motion. An asteroid could stand out because it is anomalously blue in color, but it would only be distinguished from the other asteroids because it is blue and not because it is in motion. Contrast that with a scene whereby one asteroid is in relative motion to all of the others, in such a circumstance a viewer's neuronal motion detection circuitry automatically perceives the one asteroid as uniquely in-motion and by its motion distinguishes it from all the other asteroids. This automatic neuronal relative motion analysis occurs whether the other asteroids are also perceived to be in motion, it is only the camera that is perceived to be in motion with respect to the other asteroids, or some combination of both is occurring.

A part may be distinguished from similarly scrolling surroundings by providing simulated motion relative to the part that is distinguished. Such simulated motion can be indefinitely periodic but can also be transitory, which is to say that it changes over time, does not repeat indefinitely, and could in fact simply halt entirely as a characteristic of a way of distinguishing. Description of transitory distinguishing of a part of a document from its similarly scrolling surroundings requires a description of changing behavior over points in time or intervals in time. While in this disclosure, simulated motions used to distinguish a part of a document are described in temporal terms or with temporal constraints, simulated motion itself is defined in terms of normal human neuronal capability to recognize simulated motion as motion, which includes pure motion as described previously. While the use of simulated motion or flashing to distinguish a part of a document can be indefinitely repetitive, there are advantages to the temporary use of higher-salience transitory distinguishing, which is especially the case for the use of flashing and simulated motion because of the high salience that they can achieve. For example, motion can be used to provide high salience whereby a visible floating object or image exhibits simulated relative motion to distinguish a part of a document, such as for example a word, a character, or an image by smoothly shrinking down in a visually apparent way to a small size or to even disappear entirely by shrinking out of sight directly over the part that is thus distinguished. Such visually apparent simulated relative motion beneficially draws attention to the part and at the same time distinguishes it at least momentarily. More salient transitory distinguishing can be useful in conjunction with less salient indefinitely repetitive (non-transitory) ways of distinguishing.

Another use of simulated motion to distinguish a part of a document, again by way of example, is to first present a floating object or image in a position away from the part and then provide a visually apparent connection between the first presentation and a second presentation whereby the part is distinguished. Such a visually apparent connection draws attention to the part and distinguishes it. It can be provided in various ways and a particularly effective way, from a human brain neuronal functionality perspective, is to make the connection and thereby distinguish the part by simulated motion of the floating object or image toward and eventually to the part and thereby distinguishing the part by relative motion.

For example, a simulated motion of a floating object or image distinguishes a part by moving across the screen and across the document content (perhaps also by scrolling the document under the floating object or image) and then further, with another way of distinguishing of the part of the document, when movement across the screen and content reaches the part. Indefinitely repetitive examples of this include where the object or image has a pointer that points to the part when the movement has stopped and transitory examples include a simulated motion of shrinking the object or image out of sight over the part as previously described. A large multiplicity of combinations of transitory and non-transitory distinguishing may be used together to distinguish parts of documents and some of them include simulated relative motion of a floating object or image that appears to move toward a thereby distinguished part. Another visually apparent way to provide such a connection is to wane away (e.g., by loss of opacity at a visually discernable rate) the floating object or image while simultaneously smoothly waxing into view (e.g., by gaining opacity again at a visually discernable rate) the same image in its final location on the screen. There are many variations on this theme, one is by providing a tether object (such as a thick straight line between the two appearances of the image) that connects the two appearances during the transition. Also, such a tether object can itself wax into view and wane away in various ways: it can have an opacity that is always the minimum of the opacity of the two images, which provides an illusion of material flow between the two images; or the line itself can have a graduating opacity along its length that provides a simulated relative motion illusion of material flow between the two appearances of the floating object or image.

A transitory way of distinguishing occurs over a time period. The time interval itself need not be fixed and can vary depending on various factors including the tracking of a user's eye movements as disclosed elsewhere in this description. If two display frames participate with each other in providing a simulated motion to a user and that simulated motion contributes to a way of distinguishing a part, then those two frames and the frames between them are considered to be frames in which the part is distinguished. This principle extends to all ways of distinguishing. Note that for static ways of distinguishing a frame in effect participates with itself in distinguishing a part since the way of distinguishing is perceivable from a sufficiently repeated display of a single frame.

For example, if flashing is a way of distinguishing a part and the flashing automatically halts, then the display frame on which the flashing ends participates with the immediately previous frame in a final flash and participates in no flashing behavior going forward, so that is the last frame in which the part is distinguished by the transitory distinguishing of flashing and it is distinguished by the flashing in the intervals between the last frame and all previous frames as far back as the flashing has repeated. Because ways of distinguishing can be combined conjunctively and disjunctively (see a more complete description of this in the definition of "distinguishing manner" below), if there is also a simultaneous non-transitory way of distinguishing then the distinguished part remains distinguished by the disjunctive combination after the transitory distinguishing halts.

In another example, where an object is added that shrinks down to nothing over the first character of a character string to distinguish it, if a display frame participates with other frames in the simulated motion illusion of the shrinking object over the distinguished first character, then the first character is distinguished by this transitory way of distinguishing in the final frame that participates in the simulated motion with previous frames and the character string is partially distinguished in those frames and the intervals between them.

Generalizing from the previous example, if one or more simulated motions, flashing, or other transitory way of distinguishing whereby frames participate with each other in a visual effect that distinguishes a part of a document and it halts at a final frame, then that final frame participates with its preceding frames in the one or more simulated motions, flashing, or other transitory way of distinguishing and does not participate in such distinguishing going forward in time. The part is distinguished in the final frame and all preceding frames to the beginning of the one or more simulated motions, flashing, or other transitory way of distinguishing that distinguish the part.

While simulated motions must occur both slow enough and fast enough to create an illusion of motion on the screen, human neuronal motion detection circuitry is adept at sorting out what is and is not motion. Motion perception includes pure motion perception (i.e. motion perception without perception of an object or a thing that is in motion) as defined in "Phi is not beta, and why Wertheimer's discovery launched the Gestalt revolution" (Steinman, R. M.; Pizlo, Z.; Pizlo, F. J. (2000). Vision Research. 40 (17): 2257-2264); which means that motion need not be associated with some perceived object or thing that appears, to a normal human, to exhibit the motion. Similarly, flashing frequency affects salience, the human eye is most sensitive to frequencies of 4-8 Hz (cycles/second). Very slow and very fast flashing is less attention-demanding; if too fast the two images are blurred or combined together perceptually and no involuntary flashing response occurs.

Note that a part of a document can be any subset, and not necessarily only contiguous subsets. Thus, a character taken from one word combined with another character from somewhere else in the document, further combined with an image from yet elsewhere can constitute a part of the document, and if any sub-part of that part is further distinguished then that part is partially distinguished. Nevertheless, documents have a Document Object Model (DOM) or a DOM can be created for them, and the parts of the document have a defined order relative to a document's DOM instance. Given the defined order from a document's DOM, a part of a document is contiguous if it consists of consecutive document sub-parts. More particularly, a part of a document is contiguous if there are left and right boundary positions in a DOM instance for that document and that part includes everything between them in the DOM instance. Highlighting a single character of a document would generally distinguish that character and partially distinguishes the document and any part that includes the highlighted single character; it does not distinguish any part of the document that does not comprise the highlighted single character.

Selecting a part of a document, as is done in a preparatory step for copy and paste operations, generally distinguishes that selected part. Similarly, highlighting a part generally distinguishes that part. The convention for a particular application could be that the distinguished part of a highlighted document is everything that is not highlighted, or it could even be that the distinguished part is a part immediately to the right of the highlighted part. Note that details of a document display could cause user confusion with respect to what is distinguished; e.g., by using a highlighting color that is also the background color. For brevity and clarity in subsequent examples it is assumed that highlighting a part in any color distinguishes that part and that other display alterations distinguish the part or parts having an altered appearance.

There are many other possible techniques for distinguishing the display of a document part; boxing in the part using a thin-line border, or the part's text could be italicized, made bold, or presented using a color that contrasts with the surrounding text. Indenting and enclosing text in quotes are also potentially techniques of distinguishing a document part. Positioning a visual indicator at the beginning of a part, at the end of a part, or at both the beginning and the end of a part, or placing an indication that a position in the document is in the interior of a part may partially distinguish that part. Highlighting every other character or image in a span of text and images within a document distinguishes each such highlighted character and image, and it partially distinguishes each word having a highlighted character as well as partially distinguishing the span. Highlighting only a subset of the words from a span of text distinguishes the highlighted words and partially distinguishes the span of text. Causing a part to flash on and off or change colors dynamically distinguishes it. Highlighting of key words from a search query within a document snippet partially distinguishes the document snippet in addition to distinguishing each highlighted word. Combinations of techniques for distinguishing a document part may be used. For example, highlighting in yellow and red can be used simultaneously. Or highlighting text and having an object pointing to it simultaneously distinguishes that text. Similarly, selections, highlighting, and boxing can be used in concert to distinguish parts of documents.

Moreover, a product could attach different meanings to different techniques of distinguishing parts and use them simultaneously in a display. For example, a display that distinguishes document snippets that are closely related to snippets in a query result could highlight key words from the query in red and the rest of the document snippet in yellow. Such a display would distinguish the document snippets, and the key words in the snippets, but it might not distinguish instances of those key words appearing elsewhere in the document. Even if the key words were highlighted in red wherever they appeared, including outside the document snippets, the document snippets would be visually distinguishable from all other text since they would be highlighted using a different color than that used for the key words. If just the key words were distinguished, but only those instances appearing within the document snippets, then the document snippets would be partially distinguished and any key word appearing outside the document snippets would not be distinguished.

The visible portion of a document can be visually distinguished from the rest of the document by virtue of being visible, and automated scrolling to make a particular part visible can usefully distinguish or partially distinguish that part, along with whatever else becomes visible. Scrolling in this way can be used to particular advantage in combination with other techniques for distinguishing parts of documents. For example, distinguishing a document snippet by highlighting or selecting it and also scrolling to it can be a particularly useful technique of distinguishing snippets.

in-place distinguished: When a part of a document is visible and distinguished in a manner that cannot be duplicated by scrolling a normal display of the document to a particular position and that does not involve motion of the part itself without also involving an added motion relative to the part that is independent of scrolling effects or scrolling motions, then that part is in-place distinguished and distinguished in-place; similarly, that part and all parts that comprise it are in-place partially distinguished and partially distinguished in-place.

For example, if scrolling position alone distinguishes a paragraph, perhaps by scrolling so that the beginning of the paragraph appears at the top of a display window, then that paragraph is not in-place distinguished or in-place partially distinguished. However, also by example, if that same paragraph were highlighted in its entirety or set apart by another visual change to normal display other than scrolling position, and the paragraph is either scrolled as before or at any other position, then the paragraph would be in-place distinguished and any part that comprises the paragraph would be in-place partially distinguished.

In another example, if a highlighted part is scrolled into view, then the highlighting distinguishes the part in-place, but the motion of the highlighted part during the scrolling, while perhaps perceived as motion, does not in-place partially distinguish the part because such pure scrolling effects are excluded from the definition of in-place distinguishing. However, if an added visible object moves to the highlighted part during the scrolling via motions that are independent of scrolling, i.e. are motions that are simultaneously relative both to the part and to the screen, then the motions to the part in-place partially distinguish the part. If the motion to the part halts then the motions would be comprised by an in-place transitory partially distinguishing or an in-place transitory distinguishing.

There are various ways of in-place transitory distinguishing and in-place transitory partially distinguishing, which are by definition also ways of in-place distinguishing and in-place partially distinguishing respectively, that when used in conjunction with in-place non-transitory (also called static) ways, can be particularly useful ways of distinguishing. For example, temporary flashing or temporary simulated motion can be particularly useful ways of in-place transitory distinguishing or in-place transitory partially distinguishing.

The meanings of "in-place distinguishing" and "distinguishing in-place" are the same; similarly, the meanings of "in-place partially distinguishing" and "distinguishing partially in-place" are the same. Also, the meanings of "in-place transitory distinguishing" and "transitory distinguishing in-place" are the same; similarly, the meanings of "in-place transitory partially distinguishing" and "transitory distinguishing partially in-place" are the same.

distinguishing context: A display of a document's contents, including any state affecting what is or is not distinguished, a distinguishing manner, and a set or class of user inputs (called the distinguishing inputs of the distinguishing context) that can cause parts of the document to be distinguished or not distinguished in the display, are together a distinguishing context. If a part of a document is either distinguished or can become distinguished according to the distinguishing manner and by the effects of some sequence of the distinguishing inputs, then that part is distinguished in the distinguishing context. The display of a document's contents is said to have a distinguishing context if it is the display of that distinguished context. A particular display of a document typically has many distinguishing contexts because there are many combinations of different distinguishing inputs and different distinguishing manners.

If a visible part of document content is neither distinguished nor partially distinguished in a distinguishing context, then it is undistinguished in that distinguishing context. Only a part of a document that is visible, or that can become visible by scrolling or some other action to make it visible to a user, can be distinguished or undistinguished; if it is invisible then it is simply not part of the display of contents and is neither distinguished nor undistinguished.

A typical Internet browser display of a typical Internet HTML document has a distinguishing context that distinguishes no part of the document because use of the empty set for the distinguishing inputs results in no part of the display ever being distinguished by the distinguishing manner of highlighting. That same browser display also has another distinguishing context that distinguishes all possible selectable parts of the document because a typical browser has a set of inputs allowing the user to make selections—which distinguishes each of those possible selections if the distinguishing manner of the distinguishing context is the visual indication of selection. Similarly, a typical browser has "find" box functionality, including the ability to enter arbitrary text into the "find" box and "next" and "previous" buttons that cause matches to the text in the "find" box to be located in the document and selected for editing; thus, by including all of these "find" box inputs in the distinguishing inputs, the typical browser display distinguishes the set of all possible strings of the document that can be found using the "find" box functionality.

Note that a display may have state, external to the contents of a document, that affects what parts are distinguished, so the contents of the "find" bar can be fixed in a distinguishing context by not including inputs that change it in the distinguishing inputs. For example, a typical browser could have the string "food bar" in its find-box by some prior automated mechanism, so that pressing the "next" and "previous" buttons causes the display to find a next or previous match to "food bar" and select it for editing; this distinguishes those matching parts of the document without distinguishing, for example, instances of "food in the bar". The external state need not be visible; for example, some external state could comprise the text of one or more snippets from a search query response and if there is an exact match of any such snippet with a textual span from the document, then the display could highlight or select that exact match. The content of the clipboard is external state, and if pasting into the find box is permitted, i.e., it is in the distinguishing inputs, and typing arbitrary text into the find-box is not permitted, then the text in the clipboard can be pasted into the find-box and then instances of that text can be distinguished.

Distinguishing inputs can be provided that allow a user to scroll between one distinguished document snippet and the next. A distinguishing context that distinguishes a set of document snippets can distinguish all of the document snippets simultaneously, some of them simultaneously, or it can distinguish just one of the snippets at a time; for example, it can do this if the distinguishing inputs allow user input to change which of the set of snippets is distinguished. A distinguishing context may provide for user input to cause scrolling in order to make a particular one of a set of snippets visible in the display. Since a user may scroll away from one or more parts of a document that are set apart visually, a display can provide for user input to return, e.g., via scrolling, to one or more distinguished parts of a document. Since some techniques of setting parts of a document apart visually are transient, e.g., simply clicking on a browser display can cause a document snippet that is selected for editing to no longer be selected and hence not set apart visually at that moment, a display can also provide inputs that re-distinguish and re-scroll to one or more distinguished parts of the document.

distinguishing manner: There are many ways to distinguish parts of a document in a display. These include use of different highlight colors, different ways to point to parts, different ways to dynamically draw a user's attention to parts, different ways to draw a box around parts and other ways to surround parts with added elements. Added elements for distinguishing parts may have different appearances and may themselves contain text including quotes from the document or annotations. Such included text could attach different meanings to different distinguished parts. Each such way of distinguishing or combinations of ways, is a distinguishing manner or a manner of distinguishing. In particular, conjunctive, inclusive disjunctive, and exclusive disjunctive simultaneous combinations of multiple distinguishing manners are distinguishing manners. Sequential temporal combinations of multiple distinguishing manners are also distinguishing manners. When a distinguishing manner is combined with another distinguishing manner, whether it be conjunctive, inclusive disjunctive, exclusive disjunctive, sequentially in some kind of time sequence, or any other way then the distinguishing manners that are combined are said to be contributory to the resulting distinguishing manner. In a distinguishing, in which an instance of a contributory distinguishing manner occurs, the instance of the contributory distinguishing is called a contributory distinguishing or the instance is said to contribute to the distinguishing. Note that when a first distinguishing manner is contributory to a second distinguishing manner, it is not necessarily the case that an instance of the second distinguishing manner comprises an instance of the first distinguishing manner; for example, if distinguishing manners A and B are contributory, in an inclusive disjunction, to a resulting distinguishing manner, then an instance of A alone, an instance of B alone, and an instance of A and B simultaneously are all instances of the resulting distinguishing manner. A manner of distinguishing is contributory to itself. If a first manner of distinguishing is contributory to a second manner of distinguishing such that instances of the second manner of distinguishing necessarily comprise at least one instance of the first manner of distinguishing, then the first manner of distinguishing is called an essential contributory manner of distinguishing to the second manner of distinguishing.

Instances of a transitory manner of distinguishing automatically halt, without input causing it to halt, at some point in time. For example, highlighting can be transient if it automatically clears after 10 seconds. Also, by example, flashing as a manner of distinguishing is transient if the flashing or turning on and off halts after 5 seconds.

An instance of a manner of distinguishing can often be described as an instance of a sequence of manners of distinguishing; a trivial example is to break up an instance of a highlighting manner of distinguishing into a sequence of identical highlighting manners of distinguishing. However, there are limits to this because time intervals on a screen are sequences of still frames and some transient manners of distinguishing, such as distinguishing by motion or flashing, do not break down to a distinguishing in single frames. For example, if flashing is off in a particular frame then in that frame nothing may be distinguished if that frame is taken in isolation, while that frame may nevertheless participate with other frames in a distinguishing by flashing.

For example, an instance of distinguishing, which comprises a sequence of simulated motions whereby an added object first moves toward a part that is highlighted, can distinguish that part by the translational motions and by the highlighting simultaneously; if after reaching the part the added object then shrinks out of sight over the part then the part is distinguished by the shrinking motions and the highlighting simultaneously; and if finally the part is distinguished only by the highlighting on a continuous bases; then the entire sequence is an instance of a of an overall manner of distinguishing that is a sequence of three manners of distinguishing, the first two of which are each conjunctive combinations of two other manners of distinguishing. Note that the described overall manner of distinguishing can be described equivalently as a sequence of two manners of distinguishing, with the first itself a sequence of two manners of distinguishing. In general, a combined manner of distinguishing can be described in a multiplicity of ways.

An instance of distinguishing can be an instance of two different non-equivalent manners of distinguishing; for example, a particular instance of a manner of distinguishing that disjunctively combines highlighting and flashing can also be an instance of a manner of distinguishing of highlighting only.

When a part of a document is distinguished, partially distinguished, in-place partially distinguished, etc. by an instance of distinguishing, then that instance of distinguishing is an instance of at least one manner of distinguishing—it is always an instance of a manner of distinguishing described as a manner of distinguishing that comprises the instance of distinguishing itself.

If a part of a document display is distinguished at any time within an interval of time, which is called a distinguishing interval, then there is an overall distinguishing instance of the part over the distinguishing interval such that the overall distinguishing instance comprises all distinguishing of the part over the distinguishing interval; by definition, a distinguishing interval may include one or more sub-intervals in which the part is not distinguished. The modifiers of distinguishing, such as 'in-place' and 'partially', apply similarly to 'overall distinguishing instance'.

visual salience: Visual salience (as opposed e.g. to auditory salience) is an active area of research and has different philosophical as well as experimental meanings to different researchers and experts in various contexts of visual perception; to eliminate doubt or confusion, here it is defined generally as the extent to which visual stimuli automatically and preferentially occupy limited neuronal image processing capacity. Contrast in various "channels", including contrast in their combinations, such as object shape, color, size, flashing, and motion increase the visual salience of a display element; contrast in some channels add to visual salience more than others. While the descriptions thus far are intuitive, they are vulnerable to subjective interpretation and resulting confusion. Therefore, to be definite, the statement that a first set of screen displayed elements or regions has higher visual salience than a second set of screen displayed elements or regions means that, via two element Temporal-Order Judgment (TOJ) tests, which are described in detail in the literature with many examples, where both sets are displayed simultaneously to multiple randomly chosen healthy and normal (i.e. they have eyesight that is not affected e.g. by color blindness, impaired acuity, or impaired motor control) human subjects, the multiple subjects will likely judge the first screen displayed set as having appeared first even though in such tests both sets appear at the same time. While visual salience (as defined here) can be objectively compared by testing with human subjects, in many embodiments such tests are or would be unnecessary because an instance of distinguishing may be by design more visually salient than another instance of distinguishing to which it may be compared, and thus may obviously be more visually salient by virtue of being of higher contrast to its surroundings in luminance, color, size, flashing, motion, or some other dimension or combination of dimensions affecting visual salience.

By definition, an instance of in-place distinguishing or in-place partially distinguishing of a document part has visual salience at all times, including times in which the part is not visible or the part is visible or partially visible but the instance of in-place distinguishing or in-place partially distinguishing is not present or not visible on the screen; typically, at such times when it is not visible, the objective test described above would find such a first instance of distinguishing or partially distinguishing to be less salient than a second instance of distinguishing or partially distinguishing at a second time provided the second instance of distinguishing or partially distinguishing is visible and has any salience at all at the second time.

document server: A device consisting of one or more CPUs, some memory, access to persistent storage, and one or more wired and/or wireless communication devices. It receives requests for document content and transmits responses that include requested document content using an electronic communication network. It can be configured to act alone or in concert with other document servers.

document snippet: A triple consisting of a snippet, a document, and the snippet's location in the document is a document snippet. Since documents can have duplicate content, two document snippets can have the same snippet and document but different locations. A first document snippet that is contained entirely within a second document snippet is a document sub snippet of the second document snippet.

minimal transition: A minimal transition between two images is a linear transformation, definable by a 2×2 square matrix and 1×2 offset, that translates (moves according to a two-dimensional offset), rotates, and expands or contracts a first image so that its centroid, mass (area), and maximum principal axis are the same. A minimal transition does not further morph the first image so a perfect copy of the second image may be obtained by a minimal transition only if it is a linear transformation of the first image. A minimal transition can be divided into equal parts or equal steps by multiplying A and B by equally spaced scalar values between zero and one, where A represents the 2×2 matrix and B the offset for the minimal transition; if x is a point in the first image, then its position at step k of an n step minimal transition is given by the equation $k(Ax+B)/n$. Just as there are steps of the first image, according to the equation, there are steps of every point of the first image according to the equation. A step in a sequence of such steps is adjacent to its successor step and its predecessor step in the sequence.

originating source: A document source is an originating source of a part of a document if, during retrieval, it is the final source of that part of the document. A source can be an originating source of the whole of a document or part of it; for example, text could come from one originating source and images from another. Typically, a service that retrieves content from its own long-term disk storage would be an originating source, whereas a content delivery service that may cache the document on disk would nevertheless not be an originating source. Note that an html document may be modified by adding html markup by a source that may not be an originating source of the document, modifying it on its way to a destination. Typically, a copyright holder would be an originating source for a document, but a node in a communication network between the originating source and its destination is not an originating source of the document.

path tag sequence: In an HTML, XML, or XHTML document, a path tag sequence for a specific element of the document is the ordered sequence of tags of the enclosing elements, starting with the HTML, XML, or XHTML root element and ending with the tag of the specific element being considered. For example, a particular character in a particular word is embedded at some depth in enclosing HTML elements; the path tag sequence for that particular character is the sequence of tags, starting at the root, down to the tag of the last HTML element that contains the character. For an XHTML document the root element tag name is "html" and the next for anything visible is "body" (not all elements in "body" are visible). After that there are a large number of possible tag names such as "div", "span", and "li". Each of those elements in which the character is embedded has a tag name, and together they define a sequence of tag names. The path tag sequence for a character in the document is the sequence of tag names from the root to the innermost element that contains the character. Similarly, a path tag sequence for a specific element node of a DOM instance for an HTML document is the sequence of tags starting from the HTML root element tag, including the tags of all of the ancestor nodes of the specific element node, and ending with the tag of the specific element node. The path tag sequence for a part of the document is the path tag sequence starting at the root and ending with the tag of the innermost element that comprises all of the sub-parts of the part. Thus, the path tag sequence for a word ends with the tag of the innermost element (or lowest level element node in a DOM tree) that comprises all of the characters of the word.

path tag set: The unordered set of tags, without repetition, from a path tag sequence.

pressing: Pushing with a finger or a tool such as a stylus.

response snippet: If a snippet is found in or taken from a search query response, then it is called a response snippet. Response snippets are commonly sequences of text (i.e., strings).

search engine server: A device consisting of one or more CPUs, some memory, access to persistent storage, and one or more wired and/or wireless communication devices. It receives search queries and transmits search results using an electronic communication network. It can be configured to act alone or in concert with other search engine servers as part of a search engine service.

search engine service: One or more search engine servers acting in concert to receive and respond to search queries.

single action: Single actions are acts performed to control or provide useful input to a machine such as a user agent. In general, a single action is not usefully divisible into component single actions. Single actions include clicking a mouse, tapping a screen, pressing two fingers on a touch screen, spreading two fingers previously pressed into a touch screen, swiping a finger over a touch screen, and pressing a key on a keyboard are all single actions. Movement is a bit more complicated, on touch screen devices the point of action is typically established by pressing a finger or stylus, but a cursor is moved around in various ways including mouse cursor movement that comprises many smaller cursor movements so that the progress of the cursor or mouse pointer can be tracked visually. When movement is the effect of a contiguous set of such actions, i.e., that are not punctuated by other non-movement actions, then the overall movement is counted as a single action. When counting single actions of a sequence of single actions to achieve some result, any initial movement is not counted since it is presumably not known where anything is prior to initiation of a sequence of single actions. However, if movement is required after the first non-movement single action, then the movements that occur before the next non-movement single action is counted as one single action of movement.

Hovering, in and of itself, is not counted as a single action; nevertheless, like non-movement single actions hovering punctuates movement. Thus, if a user "hovers" a mouse cursor on a hover location sufficiently long that it causes visible interaction between the user and the machine, which is visibly distinct from responses to movements in general, then the movement to that hover position is punctuated and a subsequent movement from the hover position is counted as a single action. Thus, in a sequence of single actions, initial mouse cursor movement to a hover position and subsequent clicking on that position counts as one single action regardless of how long the cursor "hovers" over the hover position; subsequent movement to a different hover position and then movement to yet another hover position counts as two single actions, which are both of movement, provided that the user "hovers" in those positions long enough for the machine to visibly react to the "hover" in each position and thereby interact with the user.

For people speaking in European languages, voice commands are counted as a single action per word but not less than one single action for every five characters, including spaces, that expresses the sound or sounds in writing; a non-zero remainder is counted as a single action. Audible commands that are not made up of spoken words or spoken sounds, such as clapping, are counted as one single action per gesture made by the user required to create the input sound; for example, a clap of two hands together can be achieved by a single action and two claps in sequence can be achieved by a sequence of three single actions that consists of first bringing the hands forcefully together, second separating them, and third then bringing them forcefully together again.

snippet: a sequence of document parts comprising text. Note that a snippet may include non-character elements such as images. However, search result snippets often comprise a textual character sequence extracted from an original source document, without including intervening non-textual parts.

tapping: Lightly striking a display screen with a finger or a tool such as a stylus.

undistinguished retrieval: When a document is requested from a document source, there is value if the source cannot discern what parts of the document interest the user, what part the user will automatically be directed to, or what parts will automatically be distinguished. (This is discussed in RFC 3986, "Uniform Resource Identifier (URI): Generic Syntax", section "3.5 Fragment".) The source can discern these if the act of making a request (either directly or indirectly) and downloading the content conveys this information to the source. For example, if the source of a document were actively engaged in the process of distinguishing display content, which it could do by altering document content before sending it out, then that request would not be a request for an undistinguished document and would not protect the user's privacy at arbitrary document sources. This information could be conveyed to the source either directly by the user agent or by some intermediary such as a URI Service, Redirect Service or other service that may receive the information. If no such information is conveyed as part of the request and downloading process, either directly from the user agent or indirectly, then the document request and download is called an undistinguished retrieval of the document.

in-place first motion distinguishing property: The statement that a document has an in-place first motion distinguishing property with respect to a triple having the following three components:
a user agent that comprises one or more hardware-based processors, one or more hardware-based memories storing computer-executable instructions, and a screen;
a manner of distinguishing; and
a set of distinguishing inputs;
means that, by use of the user agent, the following limitations can be met:
a first identification datum is derived from a first intended snippet;
a salient distinguishing interval is no more than four seconds in duration, starts at a starting time, and ends at an ending time;
in response to a first one or more selection inputs to the user agent:
  a first document display of a first version of the document is displayed on the screen; and
  a first distinguishing context, which has the manner of distinguishing and which has the set of distinguishing inputs, of the first document display is derived from the first identification datum and the first version of the document;
a first set of target document snippets is non-empty and consists of all of at least partially viewable document snippets that are partially distinguished in the first distinguishing context;
in response to the first one or more selection inputs and zero or more inputs to the user agent that are permitted according to the set of distinguishing inputs:
  a first target snippet, which is canonically similar to the first intended snippet and a member of the first set of target document snippets, is selected;
  one or more added simulated motions are derived; and
  a displaying of the one or more added simulated motions on the screen within the salient distinguishing interval is performed, which partially distinguishes the first target snippet at the starting time and at the ending time;
the displaying of the one or more added simulated motions, during the first one fifth of the salient distinguishing interval and during the last one fifth of the salient distinguishing interval, simulates motion that is simultaneously relative to the display screen and relative to every visible part of the document display that is defined in the first version of the document;
the displaying of the one or more added simulated motions contributes to an overall in-place partially distinguishing, which is an instance of the manner of distinguishing, of the first target snippet;
the visual salience of the overall in-place partially distinguishing, beginning with at least one frame displayed during the salient distinguishing interval, is greater than the visual salience of the overall in-place partially distinguishing beginning with any frame displayed during a subdued distinguishing interval that begins at the ending time, has a duration of at least 500 milliseconds, and has a duration that is no less than the duration of the salient distinguishing interval;
each member of a set of zero or more instances of in-place partially distinguishing, which includes every instance of in-place partially distinguishing of the first target snippet during the subdued distinguishing interval, is contributory to the overall in-place partially distinguishing;
the overall in-place partially distinguishing of the first target snippet is temporally the first partially distinguishing of a document snippet of the first document display that is derived from the first intended snippet;
a second identification datum is derived from a second intended snippet;
in response to a second one or more selection inputs to the user agent:
  a second document display of a second version of the document is displayed on the screen; and
  a second distinguishing context, which has the manner of distinguishing and which has the set of distinguishing inputs, of the second document display is derived from the second identification datum and the second version of the document;
a second set of target document snippets is non-empty and consists of all of at least partially viewable document snippets that are in-place partially distinguished in the second distinguishing context;
a first set of cross matching document snippets, which consists of all at least partially viewable document snippets of the second version of the document that are canonically similar to the first intended snippet, has at least one member that is textually identical to the first intended snippet and its members are undistinguished in the second distinguishing context; and
a second set of cross matching document snippets, which consists of all at least partially viewable document snippets of the first version of the document that are canonically similar to the second intended snippet, has at least one member that is textually identical to the second intended snippet and its members are undistinguished in the first distinguishing context.

in-place long motion distinguishing property: The statement that a document has an in-place long motion distinguishing property with respect to a triple having the following three components:
a user agent that comprises one or more hardware-based processors, one or more hardware-based memories storing computer-executable instructions, and a screen;
a manner of distinguishing; and
a set of distinguishing inputs;

means that, by use of the user agent, the following limitations can be met:
a first identification datum is derived from a first intended snippet;
a salient distinguishing interval is at least 150 milliseconds in duration, is no more than four seconds in duration, starts at a starting time, and ends at an ending time;
in response to a first one or more selection inputs to the user agent:
  a first document display of a first version of the document is displayed on the screen; and
  a first distinguishing context, which has the manner of distinguishing and which has the set of distinguishing inputs, of the first document display is derived from the first identification datum and the first version of the document;
a first set of target document snippets is non-empty and consists of all of at least partially viewable document snippets that are partially distinguished in the first distinguishing context;
in response to the first one or more selection inputs and zero or more inputs to the user agent that are permitted according to the set of distinguishing inputs:
  a first target snippet, which is canonically similar to the first intended snippet and a member of the first set of target document snippets, is selected;
  one or more added simulated motions are derived; and
  a displaying of the one or more added simulated motions on the screen within the salient distinguishing interval is performed, which partially distinguishes the first target snippet at the starting time and at the ending time;
the displaying of the one or more added simulated motions, during the first one fifth of the salient distinguishing interval and during the last one fifth of the salient distinguishing interval, simulates motion that is simultaneously relative to the display screen and relative to every visible part of the document display that is defined in the first version of the document;
the displaying of the one or more added simulated motions contributes to an overall in-place partially distinguishing, which is an instance of the manner of distinguishing, of the first target snippet;
the visual salience of the overall in-place partially distinguishing, beginning with at least one frame displayed during the salient distinguishing interval, is greater than the visual salience of the overall in-place partially distinguishing beginning with any frame displayed during a subdued distinguishing interval that begins at the ending time, has a duration of at least 500 milliseconds, and has a duration that is no less than the duration of the salient distinguishing interval;
each member of a set of zero or more instances of in-place partially distinguishing, which includes every instance of in-place partially distinguishing of the first target snippet that occurs during the subdued distinguishing interval, is contributory to the overall in-place partially distinguishing;
a second identification datum is derived from a second intended snippet;
in response to a second one or more selection inputs to the user agent:
  a second document display of a second version of the document is displayed on the screen; and
  a second distinguishing context, which has the manner of distinguishing and which has the set of distinguishing inputs, of the second document display is derived from the second identification datum and the second version of the document;
a second set of target document snippets is non-empty and consists of all of at least partially viewable document snippets that are in-place partially distinguished in the second distinguishing context;
a first set of cross matching document snippets, which consists of all at least partially viewable document snippets of the second version of the document that are canonically similar to the first intended snippet, has at least one member that is textually identical to the first intended snippet and its members are undistinguished in the second distinguishing context; and
a second set of cross matching document snippets, which consists of all at least partially viewable document snippets of the first version of the document that are canonically similar to the second intended snippet, has at least one member that is textually identical to the second intended snippet and its members are undistinguished in the first distinguishing context.

in-place first transitory distinguishing property: The statement that a document has an in-place first transitory distinguishing property with respect to a triple having the following three components:
a user agent that comprises one or more hardware-based processors, one or more hardware-based memories storing computer-executable instructions, and a screen;
a manner of distinguishing; and
a set of distinguishing inputs;
means that, by use of the user agent, the following limitations can be met:
a first identification datum is derived from a first intended snippet;
a salient distinguishing interval is no more than four seconds in duration, starts at a starting time, and ends at an ending time;
in response to a first one or more selection inputs to the user agent:
  a first document display of a first version of the document is displayed on the screen; and
  a first distinguishing context, which has the manner of distinguishing and which has the set of distinguishing inputs, of the first document display is derived from the first identification datum and the first version of the document;
a first set of target document snippets is non-empty and consists of all of at least partially viewable document snippets that are partially distinguished in the first distinguishing context;
in response to the first one or more selection inputs and zero or more inputs to the user agent that are permitted according to the set of distinguishing inputs:
  a first target snippet, which is canonically similar to the first intended snippet and a member of the first set of target document snippets, is selected;
  an in-place transitory partially distinguishing of the first target snippet is derived; and
  a displaying of the in-place transitory partially distinguishing on the screen within the salient distinguishing interval is performed, which partially distinguishes the first target snippet at the starting time and at the ending time;
the visual salience of the overall in-place partially distinguishing, beginning with at least one frame displayed during the salient distinguishing interval, is greater than the visual salience of the overall in-place partially distinguishing beginning with any frame displayed during a subdued distinguishing interval that begins at the ending time, has a duration of at least 500 milliseconds, and has a duration that is no less than the duration of the salient distinguishing interval;

each member of a set of zero or more instances of in-place partially distinguishing, which includes every instance of in-place partially distinguishing of the first target snippet during the subdued distinguishing interval, is contributory to the overall in-place partially distinguishing;

the overall in-place partially distinguishing of the first target snippet is temporally the first partially distinguishing of a document snippet of the first document display that is derived from the first intended snippet;

a second identification datum is derived from a second intended snippet;

in response to a second one or more selection inputs to the user agent:
  a second document display of a second version of the document is displayed on the screen; and
  a second distinguishing context, which has the manner of distinguishing and which has the set of distinguishing inputs, of the second document display is derived from the second identification datum and the second version of the document;

a second set of target document snippets is non-empty and consists of all of at least partially viewable document snippets that are in-place partially distinguished in the second distinguishing context;

a first set of cross matching document snippets, which consists of all at least partially viewable document snippets of the second version of the document that are canonically similar to the first intended snippet, has at least one member that is textually identical to the first intended snippet and its members are undistinguished in the second distinguishing context; and a second set of cross matching document snippets, which consists of all at least partially viewable document snippets of the first version of the document that are canonically similar to the second intended snippet, has at least one member that is textually identical to the second intended snippet and its members are undistinguished in the first distinguishing context.

in-place long transitory distinguishing property: The statement that a document has an in-place long transitory distinguishing property with respect to a triple having the following three components:
  a user agent that comprises one or more hardware-based processors, one or more hardware-based memories storing computer-executable instructions, and a screen;
  a manner of distinguishing; and
  a set of distinguishing inputs;
means that, by use of the user agent, the following limitations can be met:

a first identification datum is derived from a first intended snippet;

a salient distinguishing interval is at least 150 milliseconds in duration, is no more than four seconds in duration, starts at a starting time, and ends at an ending time;

in response to a first one or more selection inputs to the user agent:
  a first document display of a first version of the document is displayed on the screen; and
  a first distinguishing context, which has the manner of distinguishing and which has the set of distinguishing inputs, of the first document display is derived from the first identification datum and the first version of the document;

a first set of target document snippets is non-empty and consists of all of at least partially viewable document snippets that are partially distinguished in the first distinguishing context;

in response to the first one or more selection inputs and zero or more inputs to the user agent that are permitted according to the set of distinguishing inputs:
  a first target snippet, which is canonically similar to the first intended snippet and a member of the first set of target document snippets, is selected;
  an in-place transitory partially distinguishing of the first target snippet is derived; and
  a displaying of the in-place transitory partially distinguishing on the screen within the salient distinguishing interval is performed, which partially distinguishes the first target snippet at the starting time and at the ending time;

the visual salience of the overall in-place partially distinguishing, beginning with at least one frame displayed during the salient distinguishing interval, is greater than the visual salience of the overall in-place partially distinguishing beginning with any frame displayed during a subdued distinguishing interval that begins at the ending time, has a duration of at least 500 milliseconds, and has a duration that is no less than the duration of the salient distinguishing interval;

each member of a set of zero or more instances of in-place partially distinguishing, which includes every instance of in-place partially distinguishing of the first target snippet during the subdued distinguishing interval, is contributory to the overall in-place partially distinguishing;

a second identification datum is derived from a second intended snippet;

in response to a second one or more selection inputs to the user agent:
  a second document display of a second version of the document is displayed on the screen; and
  a second distinguishing context, which has the manner of distinguishing and which has the set of distinguishing inputs, of the second document display is derived from the second identification datum and the second version of the document;

a second set of target document snippets is non-empty and consists of all of at least partially viewable document snippets that are in-place partially distinguished in the second distinguishing context;

a first set of cross matching document snippets, which consists of all at least partially viewable document snippets of the second version of the document that are canonically similar to the first intended snippet, has at least one member that is textually identical to the first intended snippet and its members are undistinguished in the second distinguishing context; and a second set of cross matching document snippets, which consists of all at least partially viewable document snippets of the first version of the document that are canonically similar to the second intended snippet, has at least one member that is textually identical to the second intended snippet and its members are undistinguished in the first distinguishing context.

The invention claimed is:

1. A system for displaying and reliably drawing attention to identified parts of arbitrary documents by use of in-place transitory distinguishing that stimulates automatic attention capture and stimulates involuntary neuronal interference with other image processing at no more than user-tolerable levels, the system comprising:
    one or more hardware-based processors;
    one or more hardware-based memories storing computer-executable instructions; and
    a user agent comprising one or more of the one or more hardware-based processors, one or more of the one or more hardware-based memories storing computer-executable instructions, and a screen;
    wherein:
        each member of a set of one or more documents has an in-place first transitory distinguishing property with respect to a triple that consists of the user agent, a manner of distinguishing, and a set of distinguishing inputs;
        a first identification datum is derived from a first intended snippet;
        a salient distinguishing interval is no more than four seconds in duration, starts at a starting time, and ends at an ending time;
        in response to a first one or more selection inputs to the user agent:
            a first document display of a first version of a document, which is a member of the set of one or more documents, is displayed on the screen; and
            a first distinguishing context, which has the manner of distinguishing and which has the set of distinguishing inputs, of the first document display is derived from the first identification datum and the first version of the document;
        a first set of target document snippets is non-empty and consists of all of at least partially viewable document snippets that are in-place partially distinguished in the first distinguishing context;
        a distinguishing response, which is in response to the first one or more selection inputs and zero or more inputs to the user agent that are permitted according to the set of distinguishing inputs, comprises:
            a first target snippet, which is canonically similar to the first intended snippet and a member of the first set of target document snippets, is selected;
            deriving of an in-place transitory partially distinguishing of the first target snippet is performed; and
            a displaying of the in-place transitory partially distinguishing on the screen within the salient distinguishing interval is performed, which partially distinguishes the first target snippet at the starting time and at the ending time;
        the displaying of the in-place transitory partially distinguishing contributes to an overall in-place partially distinguishing, which is an instance of the manner of distinguishing, of the first target snippet;
        the visual salience of the overall in-place partially distinguishing, beginning with at least one frame displayed during the salient distinguishing interval, is greater than the visual salience of the overall in-place partially distinguishing beginning with any frame displayed during a subdued distinguishing interval that begins at the ending time, has a duration of at least 500 milliseconds, and has a duration that is no less than the duration of the salient distinguishing interval;
        each member of a set of zero or more instances of in-place partially distinguishing, which includes every instance of in-place partially distinguishing of the first target snippet during the subdued distinguishing interval, is contributory to the overall in-place partially distinguishing;
        the overall in-place partially distinguishing of the first target snippet is temporally the first partially distinguishing of a document snippet of the first document display that is derived from the first intended snippet;
        a second identification datum is derived from a second intended snippet;
        in response to a second one or more selection inputs to the user agent:
            a second document display of a second version of the document is displayed on the screen; and
            a second distinguishing context, which has the manner of distinguishing and which has the set of distinguishing inputs, of the second document display is derived from the second identification datum and the second version of the document;
        a second set of target document snippets is non-empty and consists of all of at least partially viewable document snippets that are in-place partially distinguished in the second distinguishing context;
        a first set of cross matching document snippets, which consists of all at least partially viewable document snippets of the second version of the document that are canonically similar to the first intended snippet, has at least one member that is textually identical to the first intended snippet and its members are undistinguished in the second distinguishing context; and
        a second set of cross matching document snippets, which consists of all at least partially viewable document snippets of the first version of the document that are canonically similar to the second intended snippet, has at least one member that is textually identical to the second intended snippet and its members are undistinguished in the first distinguishing context.

2. A system for displaying and reliably drawing attention to identified parts of arbitrary documents by use of in-place transitory distinguishing that stimulates automatic attention capture and stimulates involuntary neuronal interference with other image processing at no more than user-tolerable levels, the system comprising:
    one or more hardware-based processors;
    one or more hardware-based memories storing computer-executable instructions; and
    a user agent comprising one or more of the one or more hardware-based processors, one or more of the one or more hardware-based memories storing computer-executable instructions, and a screen;
    wherein:
        each member of a set of one or more documents has an in-place long transitory distinguishing property with respect to a triple that consists of the user agent, a manner of distinguishing, and a set of distinguishing inputs;
        a first identification datum is derived from a first intended snippet;
        a salient distinguishing interval is at least 150 milliseconds in duration, is no more than four seconds in duration, starts at a starting time, and ends at an ending time;

in response to a first one or more selection inputs to the user agent:
- a first document display of a first version of a document, which is a member of the set of one or more documents, is displayed on the screen; and
- a first distinguishing context, which has the manner of distinguishing and which has the set of distinguishing inputs, of the first document display is derived from the first identification datum and the first version of the document;

a first set of target document snippets is non-empty and consists of all of at least partially viewable document snippets that are in-place partially distinguished in the first distinguishing context;

a distinguishing response, which is to the first one or more selection inputs and zero or more inputs to the user agent that are permitted according to the set of distinguishing inputs, comprises:
- a first target snippet, which is canonically similar to the first intended snippet and a member of the first set of target document snippets, is selected;
- deriving of an in-place transitory partially distinguishing of the first target snippet is performed; and
- a displaying of the in-place transitory partially distinguishing on the screen within the salient distinguishing interval is performed, which partially distinguishes the first target snippet at the starting time and at the ending time;

the displaying of the in-place transitory partially distinguishing contributes to an overall in-place partially distinguishing, which is an instance of the manner of distinguishing, of the first target snippet;

the visual salience of the overall in-place partially distinguishing, beginning with at least one frame displayed during the salient distinguishing interval, is greater than the visual salience of the overall in-place partially distinguishing beginning with any frame displayed during a subdued distinguishing interval that begins at the ending time, has a duration of at least 500 milliseconds, and has a duration that is no less than the duration of the salient distinguishing interval;

each member of a set of zero or more instances of in-place partially distinguishing, which includes every instance of in-place partially distinguishing of the first target snippet during the subdued distinguishing interval, is contributory to the overall in-place partially distinguishing;

a second identification datum is derived from a second intended snippet;

in response to a second one or more selection inputs to the user agent:
- a second document display of a second version of the document is displayed on the screen; and
- a second distinguishing context, which has the manner of distinguishing and which has the set of distinguishing inputs, of the second document display is derived from the second identification datum and the second version of the document;

a second set of target document snippets is non-empty and consists of all of at least partially viewable document snippets that are in-place partially distinguished in the second distinguishing context;

a first set of cross matching document snippets, which consists of all at least partially viewable document snippets of the second version of the document that are canonically similar to the first intended snippet, has at least one member that is textually identical to the first intended snippet and its members are undistinguished in the second distinguishing context; and a second set of cross matching document snippets, which consists of all at least partially viewable document snippets of the first version of the document that are canonically similar to the second intended snippet, has at least one member that is textually identical to the second intended snippet and its members are undistinguished in the first distinguishing context.

3. The system of claim 1, wherein:

each member of the set of one or more documents has an in-place first motion distinguishing property with respect to the triple that consists of the user agent, the manner of distinguishing, and the set of distinguishing inputs;

the deriving of the in-place transitory partially distinguishing of the first target snippet comprises deriving of one or more added simulated motions;

the displaying of the in-place transitory partially distinguishing comprises a displaying of the one or more added simulated motions on the screen within the salient distinguishing interval, which partially distinguishes the first target snippet at the starting time and at the ending time;

the displaying of the one or more added simulated motions contributes to the overall in-place partially distinguishing of the first target snippet; and the displaying of the one or more added simulated motions, during the first one fifth of the salient distinguishing interval and during the last one fifth of the salient distinguishing interval, simulates motion that is simultaneously relative to the display screen and relative to every visible part of the document display that is defined in the first version of the document.

4. The system of claim 2, wherein:

each member of the set of one or more documents has an in-place long motion distinguishing property with respect to a triple that consists of the user agent, a manner of distinguishing, and a set of distinguishing inputs;

the deriving of the in-place transitory partially distinguishing of the first target snippet comprises deriving of one or more added simulated motions;

the displaying of the in-place transitory partially distinguishing comprises a displaying of the one or more added simulated motions on the screen within the salient distinguishing interval, which partially distinguishes the first target snippet at the starting time and at the ending time;

the displaying of the one or more added simulated motions contributes to the overall in-place partially distinguishing of the first target snippet; and the displaying of the one or more added simulated motions, during the first one fifth of the salient distinguishing interval and during the last one fifth of the salient distinguishing interval, simulates motion that is simultaneously relative to the display screen and relative to every visible part of the document display that is defined in the first version of the document.

5. The system of claim 4, wherein:

the one or more added simulated motions comprise one or more distinguishing translation motions such that a translation object exhibits the one or more distinguishing translation motions and thereby visibly exhibits a simulated motion toward the first target snippet;

at the beginning of the distinguishing translation motions, all parts of the object are at least 5 d from any character of the first target snippet, where d is the average height of visible characters of the first target snippet at the particular time;

according to the manner of distinguishing, the one or more distinguishing translation motions at least in part partially distinguish the first target snippet; and the distinguishing translation object is displayed prior to the first target snippet becoming visible by scrolling into view.

6. The system of claim 5, wherein the first one or more simulated motions comprise simulated motions of the distinguishing translation object of a type selected from the group consisting of:
    simulated rotation;
    simulated expansion;
    simulated contraction; and
    alternating simulated expansion and simulated contraction.

7. The system of claim 5, wherein the distinguishing translation object visually becomes a distinguishing shrinking object that shrinks out of sight into a part of the first target snippet.

8. The system of claim 4, wherein for the first half of the distinguishing interval the one or more added simulated motions simulate motion toward the first target snippet at a distance of more than 2 h away from any visible part of the first target snippet, where h is the average height of characters in the first target snippet.

9. The system of claim 1, wherein the duration of the subdued distinguishing interval is at least 2 seconds.

10. The system of claim 2, wherein the duration of the subdued distinguishing interval is at least 8 seconds.

11. The system of claim 3, wherein the duration of the subdued distinguishing interval is at least 50 seconds.

12. The system of claim 4, wherein the duration of the subdued distinguishing interval is at least 500 seconds.

13. The system of claim 1, wherein the first version of the document and the second version of the document are identical.

14. The system of claim 4, wherein:
    the user agent is situated in an electronic communication network;
    each member of the set of one or more documents can be accessed by the user agent by retrieval across the communication network;
    the first version of the document is obtained by performing an undistinguished retrieval of the document across the communication network;
    the second version of the document is obtained by performing an undistinguished retrieval of the document across the communication network;
    each member of the set of one or more documents is identified by and can be accessed across the communication network by the user agent using a member of a set of network identifiers;
    each member of the set of network identifiers is a URL (Universal Resource Locator) that comprises one and only one DNS (Domain Name System) domain name;
    DNS domain names of members of the set of network identifiers are each unique to a single member of the set of network identifiers;
    each member of the set of network identifiers has a DNS domain name that is registered in the DNS to an entity that is a member of a set of DNS registrant entities;
    members of the set of DNS registrant entities are each unique to a single member of the set of network identifiers;
    wherein no two members of the set of DNS registrant entities have shared ownership, directly or indirectly, of 50 percent or more; and
    the set of one or more documents comprises at least 2 documents.

15. The system of claim 14, wherein the set of one or more documents comprises at least 100000 documents.

16. The system of claim 2, wherein the salient distinguishing interval is at least 160 milliseconds in duration.

17. The system of claim 16, wherein the salient distinguishing interval is at least 1200 milliseconds in duration.

18. The system of claim 3, wherein:
    the user agent further comprises an eye tracking device; and
    data from the eye tracking device is used to derive the in-place transitory partially distinguishing of the first target snippet.

19. The system of claim 18, wherein the length of the salient distinguishing interval is derived from the data from the eye tracking device.

20. The system of claim 18, wherein in response to the data from the eye tracking device, the visual salience of the overall in-place partially distinguishing during the salient distinguishing interval is reduced.

* * * * *